US007768940B2

United States Patent
Mituhasi et al.

(10) Patent No.: US 7,768,940 B2
(45) Date of Patent: Aug. 3, 2010

(54) DATA DELIVERY SYSTEM AND DATA DELIVERY METHOD

(75) Inventors: Akitake Mituhasi, Tokyo (JP); Toshiyasu Nakao, Tokyo (JP); Atsushi Kashitani, Tokyo (JP)

(73) Assignee: NEC Corporation, Tokyo (JP)

( * ) Notice: Subject to any disclaimer, the term of this patent is extended or adjusted under 35 U.S.C. 154(b) by 653 days.

(21) Appl. No.: 11/662,602

(22) PCT Filed: Sep. 14, 2005

(86) PCT No.: PCT/JP2005/016926

§ 371 (c)(1),
(2), (4) Date: Mar. 13, 2007

(87) PCT Pub. No.: WO2006/030821

PCT Pub. Date: Mar. 23, 2006

(65) Prior Publication Data

US 2007/0280279 A1    Dec. 6, 2007

(30) Foreign Application Priority Data

Sep. 14, 2004  (JP) ............................. 2004-267416
Sep. 6, 2005   (JP) ............................. 2005-258143

(51) Int. Cl.
*H04L 12/56* (2006.01)
(52) U.S. Cl. ..................................................... 370/252
(58) Field of Classification Search .................. 370/252
See application file for complete search history.

(56) References Cited

U.S. PATENT DOCUMENTS

2005/0177851 A1 * 8/2005 Murao et al. ................... 725/75

FOREIGN PATENT DOCUMENTS

JP           9-179820        7/1997

(Continued)

OTHER PUBLICATIONS

Digital Image exchange system between CATV stations with IPv6 vol. 2002 No. 120 ISSN 0919-6072, Dec. 2002.

(Continued)

*Primary Examiner*—Melvin Marcelo
(74) *Attorney, Agent, or Firm*—McGinn IP Law Group, PLLC

(57) ABSTRACT

A data delivery method for delivering data that are object of delivery, these data containing observation time and observation results of a prescribed object of observation, to a data-using terminal includes steps of: executing a delivery process when a delivery condition has been met; storing delivery history information that indicates the delivery history of the delivery object data; and, based on the delivery history information, generating packaged delivery information, which is information in which a plurality of delivery destinations to which the same delivery object data are simultaneously delivered are placed in correspondence. In the delivery process, based on the packaged delivery information, all types of delivery object data that have been placed in correspondence with the delivery condition that has been met are delivered to the data-using terminals of all delivery destinations that have been placed in correspondence with the delivery condition.

29 Claims, 39 Drawing Sheets

FOREIGN PATENT DOCUMENTS

| | | |
|---|---|---|
| JP | 2002-149621 | 5/2002 |
| JP | 2002-222138 | 8/2002 |
| JP | 2002-335268 | 11/2002 |
| JP | 2003-87408 | 3/2003 |
| JP | 2003-256310 | 9/2003 |
| JP | 2004-206713 | 7/2004 |
| JP | 2004-240554 | 8/2004 |

OTHER PUBLICATIONS

Hiroshi Suda, et al. "IPv6 wo Riyoshita CATV kan de no Eizo Ryutsu System no Kochiku," Information Process Society of Japan Kenkyu Hokoku, AMV-39-1, vol. 2002, No. 120, IPSJ SIG Notes, Dec. 17, 2002, p. 3, I eft column.

PCT Forms PCT/IB/338 and IPEA/409, May 2007.

* cited by examiner

| Line number | Time-series data identification information | Time-series data delivery condition information | Data delivery destination information | Data-using terminal identification information |
|---|---|---|---|---|
| 1 | Taro:location | Five-minutes intervals | 192.168.1.10 | 192.168.1.10 |
|  | Jiro:location | Five-minutes intervals |  |  |
| 2 | Taro:location | Five-minutes intervals | 192.168.1.13 | 192.168.1.13 |
|  | Jiro:location | Five-minutes intervals |  |  |
| ... | ... | ... | ... | ... |

Time-series data delivery information

FIG. 10

Time information | Name information | Detection information

| 2004/1/14 14:05:03.50 | Taro:location | "Conference room 1" |

Time-series data

FIG. 14

RFID tag identification information

| 3D4EAB9E |

FIG. 15

Data delivery request information input page

Data-using terminal indentification information : [192.168.1.10] 501

Time-series data indentification information : [Taro:location] 502

Time-series data delivery condition information : [5-minute intervals] 503

[Register] 504

FIG. 16

| Line number | Data-using terminal identification information | Time-series data identification information | Time-series data delivery condition information |
|---|---|---|---|
| 1 | 192.168.1.10 | Taro: location | 5-minute intervals |
| 2 | 192.168.1.10 | Hanako: location | 10-minute intervals |
| 3 | 192.168.1.10 | Jiro: location | 5-minute intervals |
| 4 | 192.168.1.11 | Taro: location | Change of value |
| 5 | 192.168.1.12 | Jiro: location | "Conference room 1" or "Conference room 2" |
| 6 | 192.168.1.13 | Taro: location | 5-minute intervals |
| 7 | 192.168.1.13 | Jiro: location | 5-minute intervals |
| ⋮ | ⋮ | ⋮ | ⋮ |

Data delivery request information

A106:
Time series data identification information: Taro:location
Data delivery condition information: 5-minute intervals
Time series data identification information: Jiro:location
Data delivery condition information: 5-minute intervals
Date delivery destination information: 192.168.1.10
Data-using terminal identification information: 192.168.1.10

A105: Data delivery base information

| Line number | Data delivery time information | Data delivery destination information | Data-using terminal identification information | Time-series data identification information | Time-series data delivery condition information | Time-series data delivery detection information |
|---|---|---|---|---|---|---|
| 1 | 2004/1/14 14:05:17.20 | 192.168.1.10 | 192.168.1.10 | Taro: location | 5-minute intervals | Conference room 1 |
| 2 | 2004/1/14 14:05:14.10 | 192.168.1.10 | 192.168.1.10 | Hanako: location | 10-minute intervals | Conference room 1 |
| 3 | 2004/1/14 14:05:17.20 | 192.168.1.10 | 192.168.1.10 | Jiro: location | 5-minute intervals | Conference room 2 |
| 4 | 2004/1/14 14:00:17.20 | 192.168.1.11 | 192.168.1.11 | Taro: location | Change of value | Conference room 1 |
| 5 | 2004/1/14 14:05:17.20 | 192.168.1.12 | 192.168.1.12 | Jiro: location | "Conference room 1" or "Conference room 2" | Conference room 2 |
| 6 | 2004/1/14 14:05:17.20 | 192.168.1.13 | 192.168.1.13 | Taro: location | 5-minute intervals | Conference room 1 |
| 7 | 2004/1/14 14:00:17.20 | 192.168.1.13 | 192.168.1.13 | Jiro: location | 5-minute intervals | Conference room 1 |
| ... | ... | ... | ... | ... | ... | ... |

| Line number | Data delivery time information | Data delivery destination information | Data-using terminal identification information | Time-series data identification information | Time-series data delivery condition information | Time-series data detection information |
|---|---|---|---|---|---|---|
| 1 | 2004/1/14 14:05:17.20 | 192.168.1.10 | 192.168.1.10 | Taro: location | 5-minute intervals | Conference room 1 |
| 2 | 2004/1/14 14:05:17.20 | 192.168.1.11 | 192.168.1.11 | Taro: location | Change of value | Conference room 1 |
| 3 | 2004/1/14 14:05:17.20 | 192.168.1.12 | 192.168.1.12 | Jiro: location | "Conference room 1" or "Conference room 2" | Conference room 2 |
| 4 | 2004/1/14 14:05:17.20 | 192.168.1.13 | 192.168.1.13 | Taro: location | 5-minute intervals | Conference room 2 |
| 5 | 2004/1/14 14:05:14.10 | 192.168.1.10 | 192.168.1.10 | Hanako: location | 10-minute intervals | Conference room 1 |
| 6 | 2004/1/14 14:00:17.20 | 192.168.1.10 | 192.168.1.10 | Jiro: location | 5-minute intervals | Conference room 2 |
| 7 | 2004/1/14 14:00:17.20 | 192.168.1.10 | 192.168.1.10 | Taro: location | 5-minute intervals | Conference room 2 |
| 8 | 2004/1/14 13:59:17.20 | 192.168.1.13 | 192.168.1.13 | Jiro: location | 5-minute intervals | Conference room 1 |
| ... | ... | ... | ... | ... | ... | ... |

FIG. 23

| Line number | Data delivery time information | Data delivery destination information | Data-using terminal identification information | Time-series data identification information | Time-series data delivery condition information | Time-series data detection information |
|---|---|---|---|---|---|---|
| 1 | 2004/1/14 14:05:17.20 | 192.168.1.10 | 192.168.1.10 | Taro: location | 5-minute intervals | Conference room 1 |
| 2 | 2004/1/14 14:05:14.10 | 192.168.1.10 | 192.168.1.10 | Hanako: location | 10-minute intervals | Conference room 1 |
| 3 | 2004/1/14 14:00:17.20 | 192.168.1.10 | 192.168.1.10 | Jiro: location | 5-minute intervals | Conference room 2 |
| 4 | 2004/1/14 14:05:17.20 | 192.168.1.11 | 192.168.1.11 | Taro: location | Change of value | Conference room 1 |
| 5 | 2004/1/14 14:05:17.20 | 192.168.1.12 | 192.168.1.12 | Jiro: location | "Conference room 1" or "Conference room 2" | Conference room 2 |
| 6 | 2004/1/14 14:05:17.20 | 192.168.1.13 | 192.168.1.13 | Taro: location | 5-minute intervals | Conference room 1 |
| 7 | 2004/1/14 14:00:17.20 | 192.168.1.13 | 192.168.1.13 | Jiro: location | 5-minute intervals | Conference room 1 |
| ... | ... | ... | ... | ... | ... | ... |

Data delivery method base information

FIG. 24

| Line number | Allocation time | Time-series data identification information | Data delivery device identification information |
|---|---|---|---|
| 1 | 2004/1/14 14:05:15.20 | Taro: location | 192.168.2.14 |
| 2 | 2004/1/14 14:05:15.20 | Taro: location | 192.168.2.11 |
| 3 | 2004/1/14 14:05:15.20 | Jiro: location | 192.168.2.12 |
| 4 | 2004/1/14 14:05:15.20 | Taro: location | 192.168.2.13 |
| 5 | 2004/1/14 14:05:12.10 | Hanako: location | 192.168.2.10 |
| 6 | 2004/1/14 14:00:15.20 | Jiro: location | 192.168.2.10 |
| 7 | 2004/1/14 14:00:15.20 | Taro: location | 192.168.2.10 |
| 8 | 2004/1/14 13:59:15.20 | Jiro: location | 192.168.2.13 |
| ... | ... | ... | ... |

Data allocation history information

FIG. 36

| Line number | Processing load reduction method name | Reducible in-server process number proportion | Processing load reduction metho processing load model |
|---|---|---|---|
| 1 | Multicast | (Number of delivery processes for same delivery destination) / (Total number of unicast delivery processes) | Number of unicast delivery processes that have been changed to multicast |
| 2 | ... | ... | ... |

FIG. 39

| Line number | Start time | End time | In-server process name |
|---|---|---|---|
| 1 | 2004/1/14 14:05:03.50 | 2004/1/14 14:05:03.60 | Delivery of Taro:location to 192.168.1.10 |
| 2 | 2004/1/14 14:05:03.55 | 2004/1/14 14:05:04.00 | Delivery of Taro:location to 192.168.1.13 |
| 3 | 2004/1/14 14:05:03.60 | 2004/1/14 14:05:04.20 | Delivery of Jiro:location to 192.168.1.15 |
| 4 | ... | ... | ... |

FIG. 40

| Line number | In-server process name | Maximum processing time |
|---|---|---|
| 1 | Deliver Taro:location to all data-using terminals requesting delivery | 0.35 seconds |
| 2 | Deliver Jiro:location to all data-using terminals requesting delivery | 0.1 second |
| 3 | ... | ... |

FIG. 41

| Line number | Non-real-time process name | Start time | End time | Maximum processing time | Simultaneous execution process group |
|---|---|---|---|---|---|
| 1 | Deliver Taro:location to all data-using terminals requesting delivery | 2004/1/14 14:05:03.50 | 2004/1/14 14:05:04.00 | 0.35 seconds | – Delivery of Taro:location to 192.168.1.10<br>– Delivery of Taro:location to 192.168.1.13<br>– Delivery of Jiro:location to 192.168.1.15 |
| 2 | Deliver Jiro:location to all data-using terminals requesting delivery | 2004/1/14 14:06:03.50 | 2004/1/14 14:07:04.50 | 0.1 second | – Delivery of Hanako:location to 192.168.1.12<br>– Delivery of Taro:location to 192.168.1.13<br>... |
| 3 | ... | ... | ... | ... | ... |

FIG. 42

| Line number | Processing load reduction method name | Processing load reduction method application process group |
|---|---|---|
| 1 | Multicast | − Delivery of Taro:location to 192.168.1.10<br>− Delivery of Taro:location to 192.168.1.13 |
| 2 | Multicast | − Delivery of Jiro:location to 192.168.1.15<br>− Delivery of Jiro:location to 192.168.1.14<br>− Delivery of Hanako:location to 192.168.1.12<br>− Delivery of Hanaco:location to 192.168.1.13 |
| 3 | ... | ... |

FIG. 43

DATA DELIVERY SYSTEM AND DATA DELIVERY METHOD

TECHNICAL FIELD

The present invention relates to a data delivery system and to a data delivery method for delivering data that are the object of delivery and that contain the observation times and observation results of a prescribed object of observation to data-using terminals by way of a communication network.

BACKGROUND ART

In the prior art, a data delivery system exists for delivering, by way of a communication network, the detection data of, for example, a position sensor or temperature sensor to data-using terminals that are managed by users of the detection data.

In a data delivery system, detection data by sensors are accumulated in a server that has a data delivery function, and these detection data are then delivered by the server to data-using terminals.

As the data delivery technique in the above-described data delivery system, JP-A-2002-335268 discloses a configuration in which, when there are a large number of data-using terminals, the data delivery process is carried out by distributing the process among a plurality of servers to thereby reduce the processing load placed upon each of servers that has the data delivery function.

Alternatively, JP-A-2003-256310 discloses a configuration in which servers that deliver data are differentiated according to the characteristics of the data that are to be delivered to thereby deliver data by means of servers appropriate to the data that are delivered.

Patent Document 1: JP-A-2002-335268
Patent Document 2: JP-A-2003-256310

DISCLOSURE OF THE INVENTION

Problem to be Solved by the Invention

However, because there is no particular change in the total number instances of executing processes of delivering data in the above-described data delivery techniques of the prior art, the load of the delivery process in the overall data delivery system remains unaffected. In the data delivery technique of the above-described prior art, a multiplicity of servers that perform data delivery must be provided to decentralize the load of the delivery process, and the problem therefore arises that the scale of the system swells with increase in the number of data-using terminals, which are the targets of the delivery of data, or with increase in the types of transmitted data. Further, in the above-described data delivery technique of the prior art, when the processing load rises to a point that exceeds the maximum value of the time interval of delivery processing executed in servers in a real-time system in which a maximum value has been set for the time interval of the delivery processing that is executed in servers that perform data delivery, it was not possible to determine the properties of a load reduction method necessary and sufficient for reducing the time interval of the delivery processing executed in the servers to no more than the maximum value of the delivery processing time interval.

It is an object of the present invention to provide a data delivery method that can solve the above-described problems and mitigate increase in the processing load of the data delivery process that accompanies increase in the number of items that are the objects of data delivery or increase in the types of delivery data.

It is another object of the present invention to provide a data delivery system that can solve the above-described problems and mitigate increase in the processing load of data delivery processing that accompanies increase in the number of items that are the object of data delivery or increase of the types of delivery data.

Means for Solving the Problem

The data delivery system of the present invention is a data delivery system for delivering data that are the object of delivery, these data containing the observation time and observation results of a prescribed object of observation, to a data-using terminal by way of a communication network; the data delivery system being provided with: a delivery request information storage means for storing delivery request information in which a delivery destination, a type of delivery object data that are the object of delivery, and a delivery condition are placed in correspondence; a data delivery means for delivering the delivery object data when the delivery condition is realized; a delivery history information storage means for storing delivery history information indicating the history of delivery of the delivery object data by means of the data delivery means; and a packaged delivery information generation means for, based on the delivery history information, generating packaged delivery information which is any one of: (a) information in which a plurality of delivery destinations to which the same delivery object data are simultaneously delivered are placed in correspondence; (b) information in which a plurality of types of delivery object data that are simultaneously delivered to the same data-using terminal are placed in correspondence; and (c) information in which a plurality of delivery destinations to which the same delivery object data are simultaneously delivered and a plurality of types of delivery object data that are simultaneously delivered to the same data-using terminal are placed in correspondence; wherein the data delivery means, based on the packaged delivery information, delivers all types of delivery object data that have been placed in correspondence with the delivery condition that has been realized to the data-using terminals of all delivery destinations that have been placed in correspondence with the delivery condition that has been realized.

In the present invention, the delivery object data are, for example, time-series data. If the delivery object data are time-series data, the delivery history information is time-series data delivery history information. The delivery request information is, more specifically, data delivery request information.

In the data delivery system of the present invention, the adoption of the above-described configuration enables mitigation of the increase in the processing load of the data delivery processing that accompanies increase in the number of items that are the objects of data delivery or increase in the number of types of delivery object data.

The packaged delivery information is, for example, information in which delivery destinations, the types of delivery object data that are the objects of delivery, and delivery conditions are placed in correspondence; and as a minimum, is information in which a plurality of delivery destinations or a plurality of types of delivery object data are placed in correspondence with the delivery conditions. In the embodiments that are explained hereinbelow, time-series data delivery information is used as the packaged delivery information.

The delivery history information is, for example, information that contains the times of delivery, the types of delivery object data that are delivered, the destinations of delivery, and the delivery conditions when the data are delivered. The packaged delivery information generation means is of a configuration for subjecting this type of delivery history information to the packaged delivery information generation process described hereinbelow. In the packaged delivery information generation process, packaged delivery information may be generated by packaging a plurality of items of delivery history information in which, of the delivery history information, the destinations of delivery and the time of the next delivery time as estimated from the delivery conditions at the time of delivery are the same, and the types of the delivery object data that are delivered are different. Alternatively, in the packaged delivery information generation process, packaged delivery information may be generated by packaging a plurality of items of delivery history information in which, of the delivery history information, the types of delivery object data that are delivered and the time of the next delivery as estimated from the delivery conditions at the time of delivery are the same, and moreover, the destinations of delivery are different. Alternatively, in the packaged delivery information generation process, these two types of packaged delivery information may be generated and the portion of overlap then eliminated to generate the final packaged delivery information. The packaged delivery information generation means may be of a configuration such that, when packaging a plurality of items of delivery history information, a plurality of items of delivery history information for which the difference in times of delivery are within a prescribed time interval are packaged together.

When a plurality of data delivery means are provided in the present invention, the data delivery system may be provided with a delivery selection means for selecting from this plurality of data delivery means a data delivery means for executing the delivery process of the delivery object data; and a delivery object data allocation means for allocating delivery object data and packaged delivery information that has been generated by the packaged delivery information generation means to the data delivery means that has been selected by the delivery selection means; whereby the data delivery means may deliver the delivery object data that have been allocated by the delivery object data allocation means to a plurality of data-using terminals when the delivery conditions are realized. Adopting this type of configuration enables mitigation of increase in processing load of the data delivery process that accompanies increase in the number of items that are the objects of data delivery.

The data delivery system of the present invention may be of a configuration provided with a processing load information acquisition means for acquiring processing load information indicating the processing load of a plurality of data delivery means, whereby the delivery selection means specifies the data delivery means having the lowest processing load based on the processing load information of each of the data delivery means that has been acquired by the processing load information acquisition means, and selects the data delivery means having the lowest processing load as the data delivery means for executing the delivery process of the delivery object data.

In addition, the data delivery method of the present invention is a data delivery method for delivering delivery object data, which contains the observation time and observation results of a prescribed object of observation to, a data-using terminal by way of a communication network, the data delivery method including steps of: storing, in a first storage means, delivery request information in which a delivery destination, a type of delivery object data that are the object of delivery, and a delivery condition are placed in correspondence; executing a delivery process for delivering the delivery object data when the delivery condition is realized; storing, in a second storage means, delivery history information indicating the delivery history of the delivery object data; executing, based on the delivery history information, a packaged delivery information generation process for generating packaged delivery information, which is any one of: (a) information in which a plurality of delivery destinations to which the same delivery object data are simultaneously delivered are placed in correspondence, (b) information in which delivery object data of a plurality of types that are simultaneously delivered to the same data-using terminal are placed in correspondence, and (c) information in which a plurality of delivery destinations to which the same delivery object data are simultaneously delivered and delivery object data of a plurality of types that are simultaneously delivered to the same data-using terminal are placed in correspondence wherein, in the delivery process, based on the packaged delivery information, delivery object data of all types that have been placed in correspondence with delivery condition that has been realized are delivered to the data-using terminals of all delivery destinations that have been placed in correspondence with the realized delivery condition.

In the data delivery method of the present invention, the adoption of the above-described configuration enables mitigation of the increase in processing load of the data delivery process that accompanies increase in the number of items of data that are the objects of delivery or the increase in the number of types of delivered data.

In the method of the present invention, a configuration may be adopted by which, when packaging a plurality of items of delivery history information in the process of generating packaged delivery information, a plurality of items of delivery history information are packaged for which the differences in the times of delivery are within a prescribed time interval.

In the present invention, when the packaged delivery information generation process is executed by a computer, a process may be executed for selecting a combination of delivery processing for applying a processing load reduction method that, when packaging a plurality of items of delivery history information, minimizes the performance demanded of the processing load reduction method that is applied to decrease the load of the delivery processing that exceeds the maximum value of the processing time interval that has been set for each delivery process.

The present invention enables the circumvention of the increase in the processing load of the data delivery process even in the event of increase in the number of items that are the objects of data delivery or increase in the types of delivered data.

In addition, when a processing load reduction method is applied for reducing the delivery processing time interval to no more than a maximum value in a real-time system in which a maximum value has been set for the time interval of the delivery processing that is executed in servers that carry out data delivery, the present invention enables the provision of processing load reduction method performance necessary and sufficient for decreasing the delivery process time interval that exceeds a maximum value to a maximum value or less, and thus enables mitigation of the increase in the processing load of the processing load reduction method that accompanies increase in the number of items of delivered objects of data or increase in the types of delivered data.

BRIEF DESCRIPTION OF THE DRAWINGS

FIG. 10 is a view showing an example of the time-series data delivery information;

FIG. 14 is a view showing an actual example of time-series data;

FIG. 15 is a view showing an example of tag identification information;

FIG. 16 is a view showing an example of the data delivery request information input screen for entering data delivery request information;

FIG. 17 is a view showing an example of data delivery request information;

FIG. 21 is a view for explaining the process of generating time-series data delivery information from data delivery base information;

FIG. 23 is a view showing an example of time-series data delivery history information;

FIG. 24 is a view showing an example of the data delivery method base information;

FIG. 36 is a view showing an example of data allocation history information;

FIG. 39 is a view showing an example of processing time reduction model information in the fifth working example;

FIG. 40 is a view showing an example of in-server process execution history information in the fifth working example;

FIG. 41 is a view showing an example of the real-time condition information in the fifth working example;

FIG. 42 is a view showing an example of non-real-time process information in the fifth working example;

FIG. 43 is a view showing an example of the data delivery method application pattern information in the fifth working example.

Figure 1:
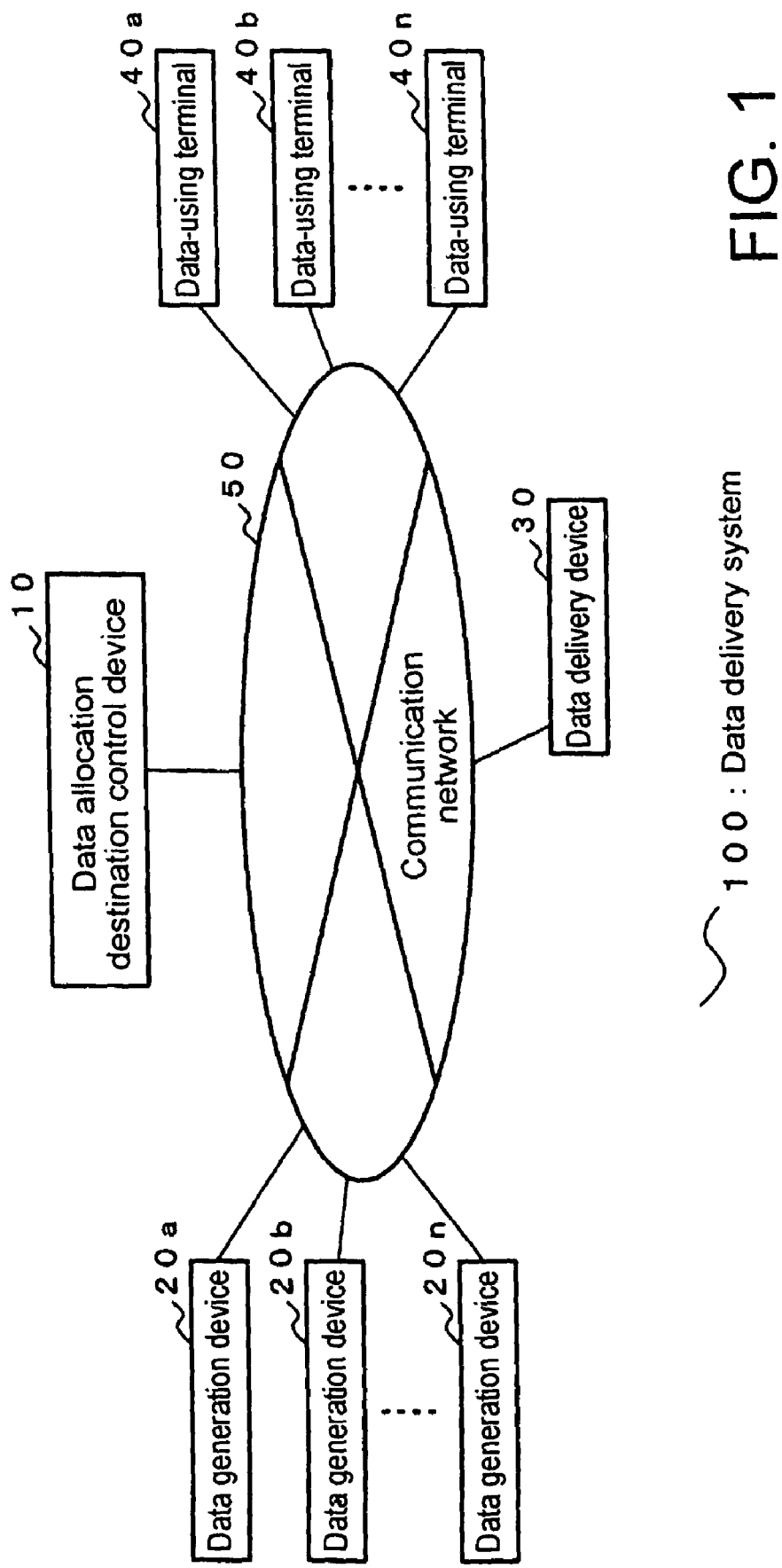
FIG. 1 is a block diagram showing an example of the configuration of a data delivery system in a first embodiment of the present invention.

EXPLANATION OF REFERENCE NUMERALS 10, 210 Data allocation destination control device
11 Data allocator
12 Data delivery information storage unit
13 Data delivery time information acquisition unit
14 Data delivery method determination unit
15 Communication processor
16 Data delivery device load information acquisition unit
20a to 20n Data generation devices
30, 30a to 30n Data delivery devices
31 Data delivery request information acquisition unit
32 Data delivery request information search unit
33 Data delivery information processor
331 Data delivery information search unit
332 Data delivery information acquisition unit
34 Data delivery condition information rating unit
35 Data distributor
36 Time-series data delivery history information storage unit
40a to 40n Data-using terminals
50 Communication network
100, 200 Data delivery system
141 Request processing time reduction model storage unit
142 Real-time condition storage unit
143 Execution log storage unit
144 Load factor identifier
1441 Non-real-time process extractor
1442 In-server queue state analyzer
145 Data delivery method application pattern generator 146 Minimum processing load data delivery method application pattern determination unit

BEST MODE FOR CARRYING OUT THE INVENTION

First Embodiment

FIG. 1 is a block diagram showing an example of the configuration of data delivery system 100 in the first embodiment of the present invention. This data delivery system 100 includes: data allocation destination control device 10, a plurality of data generation devices 20a to 20n, data delivery device 30, and a plurality of data-using terminals 40a to 40n. Data allocation destination control device 10, each of data generation devices 20a to 20n, data delivery device 30, and each of data-using terminals 40a to 40n are interconnected and transmit and receive data with each other by means of communication network 50 such as the Internet. In addition, any number of data generation devices 20a to 20n and any number of data-using terminals 40a to 40n may be provided.

Data allocation destination control device 10 is composed of, for example, an information processor such as a server device and executes various processes such as generating time-series data delivery information to set in data delivery device 30 and transmitting time-series data to data delivery device 30.

"Time-series data" refers to data that indicate the detection times and detection content obtained by various types of sensors such as temperature sensors, i.e., information detection devices. In other words, time-series data are data that can reveal the transition over time of observation results for an object of observation such as "temperature at point A" through the acquisition of a plurality of items of data relating to the same object of observation.

"Time-series data delivery information" is one type of packaged delivery information, these data placing in correspondence the time-series data that are the object of delivery, the delivery destinations of the time-series data, and the delivery conditions for delivering the time-series data; and these data are consulted by data delivery device 30 at the time of the delivery process of the time-series data. More specifically, "time-series data delivery information" are data that include: data delivery destination information, which is the destination of the delivery of the time-series data; data-using terminal identification information for identifying data-using terminals 40a to 40n that request the delivery of time-series data; time-series data identification information for identifying the type of time-series data that are delivered; and time-series data delivery condition information that indicates the delivery conditions for delivering the time-series data. Examples of data delivery destination information include the address of one data-using terminal, or the address of broadcast communication to a plurality of data-using terminals.

Data generation devices 20a to 20n are each composed of an information processor such as a personal computer, and these devices execute such processes as generating time-series data based on data obtained either periodically or when called for from an information detection device such as a position sensor or temperature sensor and transmitting these data to data allocation destination control device 10.

Data delivery device 30, based on time-series data delivery information that has been set by data allocation destination control device 10 and data delivery request information that has been set by data-using terminals 40a to 40n, executes various processes such as reading and delivering time-series data that have been set by data allocation destination control device 10. Data delivery device 30 is composed of, for example, an information processor such as a server device, and transmits one or a plurality of items of time-series data to one or a plurality of data-using terminals 40a to 40n.

Each of data-using terminals 40a to 40n is composed of an information processor such as a personal computer or portable telephone terminal, and is managed by each user that uses the time-series data. Data-using terminals 40a to 40n are each provided with a communication processor such as an Ethernet® device or a radio device. Each of data-using terminals 40a to 40n has the capability to execute various processes such as data transmission or reception by way of communication network 50, and moreover, has the capability to transmit data delivery request information to data delivery device 30.

Figure 2:
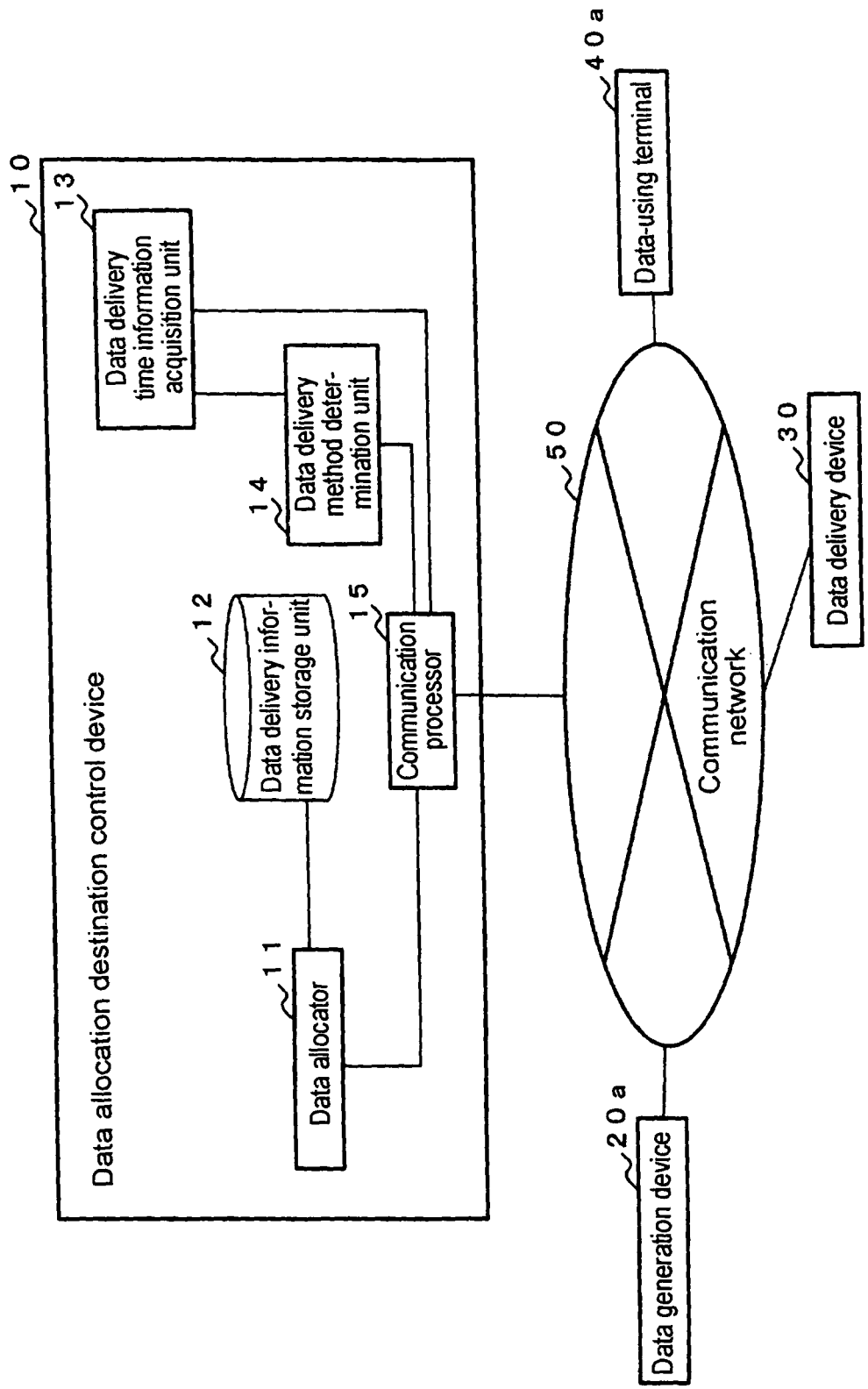
FIG. 2 is a block diagram showing an example of the configuration of a data allocation destination control device.

FIG. 2 shows an example of the configuration of data allocation destination control device 10. In FIG. 2, data generation device 20a is shown as representative of data generation devices 20a to 20n and data-using terminal 40a is shown as representative of data-using terminals 40a to 40n. Data allocation destination control device 10 is provided with data allocator 11, data delivery information storage unit 12, data delivery time information acquisition unit 13, data delivery method determination unit 14, and communication processor 15.

Data allocator 11 performs processes for acquiring time-series data from each data generation devices 20a to 20n by way of communication network 50 and storing in data delivery information storage unit 12.

Data delivery information storage unit 12 is composed of, for example, a database or a file server. Various types of information such as the time-series data delivery information that have been generated by data delivery method determination unit 14 are stored in data delivery information storage unit 12.

Data delivery time information acquisition unit 13 executes various processes such as acquiring delivery history information that shows the past delivery history for each item of time-series data (refer to FIG. 23 described hereinbelow) and, based on the acquired delivery history information, generating data delivery method base information (refer to FIG. 24 described hereinbelow).

Data delivery method determination unit 14 executes various processes such as, based on the data delivery method base information that has been acquired from data delivery time information acquisition unit 13, determining sets of time-series data that are to be delivered simultaneously, or sets of delivery destinations to which data are to be delivered simultaneously, and generating time-series data delivery information.

Communication processor 15 executes a process for transmitting various types of data by way of communication network 50 and a process for receiving various types of data that have been transmitted in by way of communication network 50.

Figure 3:
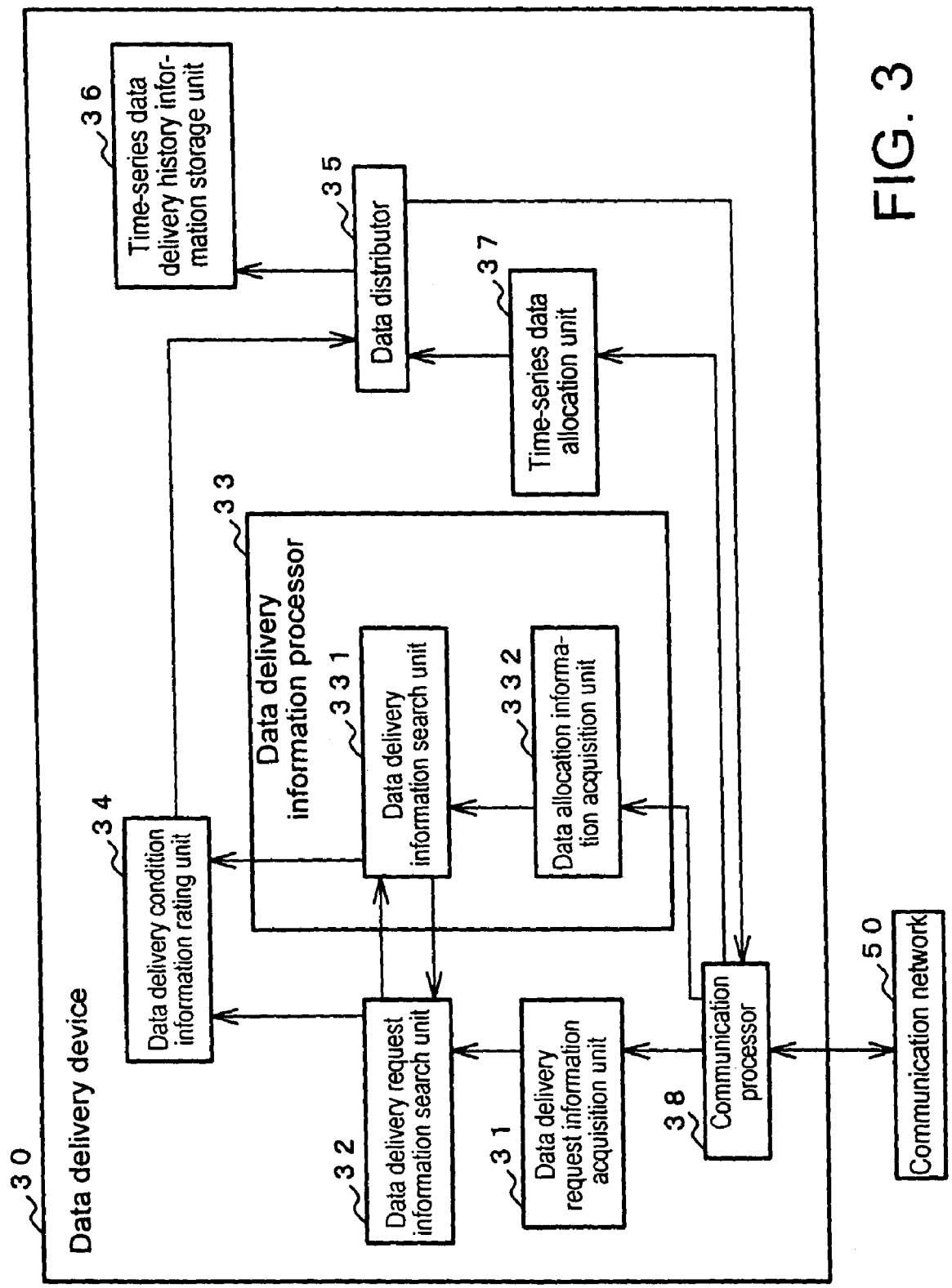
FIG. 3 is a block diagram showing an example of the configuration of a data delivery device.

FIG. 3 shows an example of the configuration of data delivery device 30. Data delivery device 30 is provided with: data delivery request information acquisition unit 31; data delivery request information search unit 32; data delivery information processor 33; data delivery condition information rating unit 34; data distributor 35, time-series data delivery history information storage unit 36; time-series data allocation unit 37; and communication processor 38.

Data delivery request information acquisition unit 31 executes various processes such as acquiring data delivery request information from data-using terminals 40*a* to 40*n* by way of communication network 50 and storing the data delivery request information.

Data delivery request information search unit 32 performs various processes such as a process for searching for data delivery request information that has been stored by data delivery request information acquisition unit 31.

Data delivery information processor 33 includes: data delivery information search unit 331 for searching time-series data delivery information for sets that contains time-series data identification information in any time-series data; and data allocation information acquisition unit 332 for acquiring time-series data delivery information from data allocation destination control device 10.

Data delivery condition information rating unit 34 performs various processes such as a process of determining whether the delivery conditions indicated by the data delivery condition information have been met or not.

Data distributor 35 has the capability to carry out a delivery process of time-series data in accordance with the rating results of data delivery condition information rating unit 34.

Time-series data delivery history information storage unit 36 is composed of, for example, a database device. Various types of information such as time-series data delivery history information are stored in time-series data delivery history information storage unit 36.

Time-series data allocation unit 37 is composed of, for example, a database device. Time-series data that have been allocated by data allocation destination control device 10 are stored in time-series data allocation unit 37.

Figure 4:
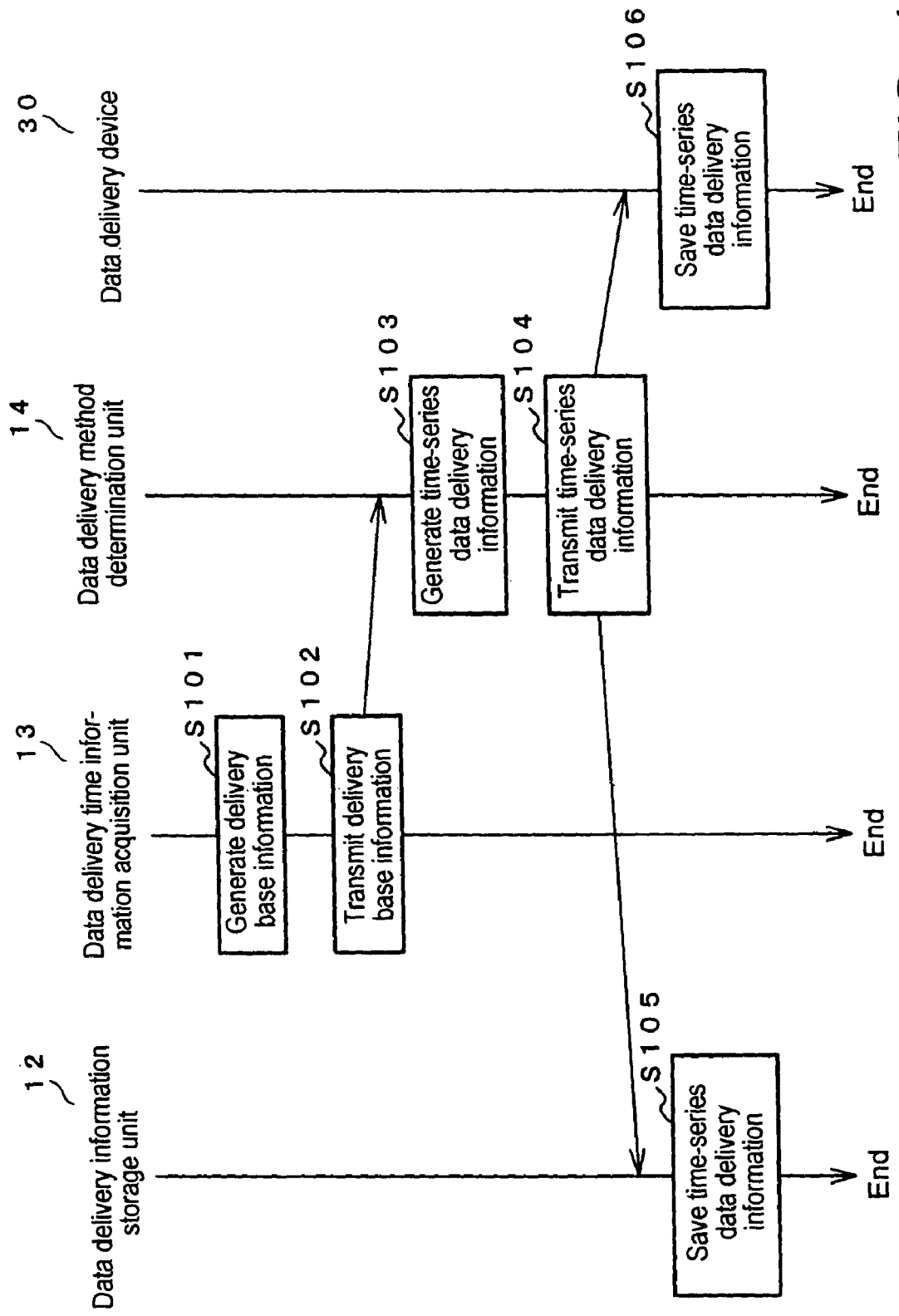
FIG. 4 is a sequence diagram showing an example of the time-series data delivery information setting process.
Figure 5:
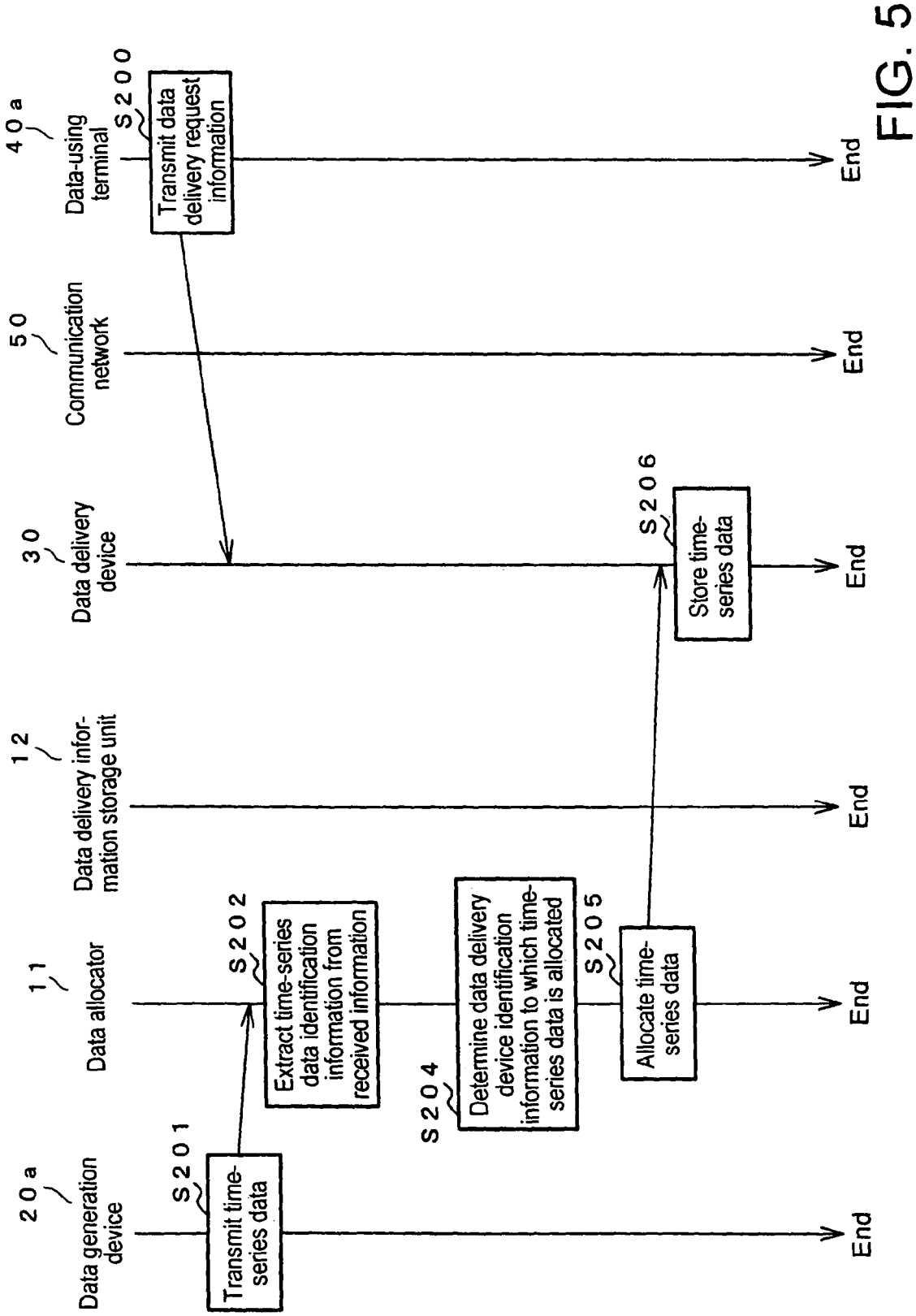
FIG. 5 is a sequence diagram showing an example of the time-series data allocation process.

Explanation next regards the operation of data delivery system 100 of the first embodiment of the present invention. The operations executed by data delivery system 100 are divided between the three operations of: a time-series data delivery information setting process, a time-series data allocation process, and a time-series data delivery process. FIG. 4 shows an example of the time-series data delivery information setting process, and FIG. 5 shows an example of the time-series data allocation process. In addition, FIG. 5 also shows an example of the data delivery request information acquisition process (refer to Step S200).

Explanation first regards the time-series data delivery information setting process using FIG. 4.

In data delivery system 100 of the present embodiment, data delivery time information acquisition unit 13 acquires and saves time-series data delivery history information that contains data delivery time information from data delivery device 30 by way of communication network 50 each time time-series data are delivered by data delivery device 30. Alternatively, data delivery time information acquisition unit 13 may also acquire time-series data delivery history information all together at fixed periods rather than with each delivery of time-series data. The time-series data delivery history information is stored in both data delivery device 30 and data allocation destination control device 10.

Here, the time-series data delivery history information includes: data delivery time information that indicates the times at which the time-series data were delivered; data delivery destination information that indicates the delivery destinations of the time-series data; data-using terminal identification information; time-series data identification information; time-series data delivery condition information; and time-series data detection information. The "data delivery time information" is set by data delivery device 30 when the time-series data are delivered.

In the time-series data delivery information setting process, data delivery time information acquisition unit 13 first, as the data delivery method base information generation process in Step S101, generates data delivery method base information, i.e., delivery base information, based on the time-series data delivery history information that has already been saved. "Data delivery method base information" is information used for generating time-series data delivery information by means of data delivery method determination unit 14. In this data delivery method base information generation process, a process is executed in which, of the plurality of items of time-series data delivery history information that match with the delivery destination, type, and delivery conditions of the time-series data, only time-series data delivery history information in which the time indicated by the data delivery time information is most recent is preserved and all other time-series data delivery history information is eliminated.

When data delivery method base information is generated, data delivery time information acquisition unit 13 transmits the generated data delivery method base information to data delivery method determination unit 14 in Step S102.

Upon receiving the data delivery method base information, data delivery method determination unit 14, based on the received data delivery method base information, determines the set of time-series data that are to be delivered simultaneously, the set of delivery destinations to which data are to be delivered simultaneously, or the set of time-series data that are to be delivered simultaneously and the set of delivery destinations to which data are to be delivered simultaneously and generates the time-series data delivery information in Step S103. Data delivery method determination unit 14 then, in Step S104, both transmits the generated time-series data delivery information to data delivery information storage unit 12 and transmits to data delivery device 30 by way of Internet 50.

In Step S105, data delivery information storage unit 12 saves the time-series data delivery information acquired from data delivery method determination unit 14. In addition, data delivery device 30 saves the time-series data delivery information acquired from data delivery method determination unit 14 in Step S106.

Explanation next regards the time-series data allocation process using FIG. 5.

The time-series data allocation process between data generation device 20*a* and data-using terminal 40*a* is here explained taking as examples data generation device 20*a* of data generation devices 20*a* to 20*c* and data-using terminal 40*a* of data-using terminals 40*a* to 40*e*.

Data delivery request information acquisition unit 31 provided in data delivery device 30 acquires data delivery request information from data-using terminal 40*a* by way of Internet 50, this data delivery request information being required for delivering time-series data to data-using terminal 40*a* in Step S200, and stores this information in the storage unit in data delivery device 30. The data delivery request information acquired in this Step S200 is made up from: data-using terminal identification information for data-using terminal 40*a*, time-series data identification information indicating the type of time-series data for which data-using terminal 40*a* requests delivery, and time-series data delivery condition information.

On the other hand, data generation device 20*a* generates time-series data, and in Step S201, transmits these time-series data to data allocation destination control device 10 by way of communication network 50. Similarly, data generation device 20*b* also generates time-series data, and further, data generation device 20*c* generates time-series data. The time-series data generated in data generation devices 20*b* and 20*c* are similarly transmitted to data allocation destination control device 10 by way of communication network 50.

Upon receiving the time-series data, data allocator 11 that is provided in data allocation destination control device 10 extracts in Step S202 the time-series data identification information in the time-series data that have been received from data generation devices 20a to 20c. Upon extracting the time-series data identification information, data allocator 11 determines the data delivery device to which the time-series data are to be allocated in Step S204. More specifically, data allocator 11 determines the delivery device identification information of data delivery device 30 to which the data are allocated. In the example here described, data delivery system 100 is provided with a single data delivery device 30, and data delivery device 30 is therefore always determined as the data delivery device to which the time-series data are allocated.

In Step S205, data allocator 11 transmits the time-series data to data delivery device 30 that has been determined as the device to which the time-series data are to be allocated, and thus allocates time-series data to data delivery device 30. In Step S206, data delivery device 30 stores the received time-series data in time-series data allocation unit 37. At this time, when data delivery device 30 already stores already existing time-series data having time-series data identification information that is identical to that of the received time-series data, data delivery device 30 deletes the already existing time-series data and stores the received time-series data. In other words, in this example, data delivery device 30 stores the most recent time-series data for each differing item of time-series data identification information.

As described hereinabove, by means of the time-series data allocation process, time-series data are stored in time-series data allocation unit 37 provided in data delivery device 30.

Figure 6:
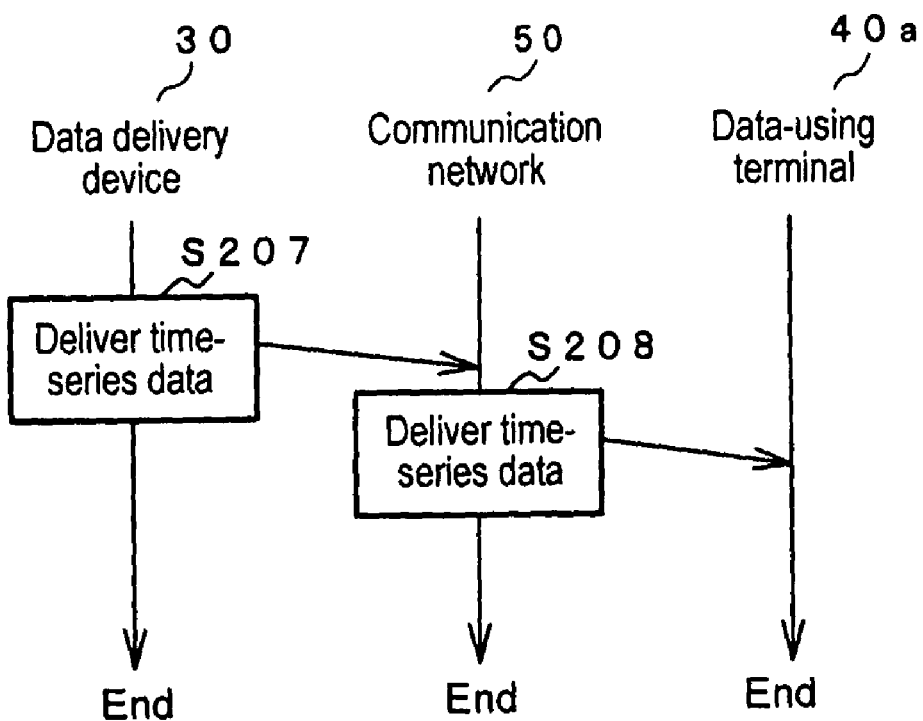
FIG. 6 is a sequence diagram showing an example of the time-series data delivery process.

Explanation next regards the time-series data delivery process. FIG. 6 is a flow chart showing an example of the time-series data delivery process.

In the time-series data delivery process, data delivery device 30 delivers time-series data that have been stored in time-series data allocation unit 37 to data-using terminal 40a by way of communication network 50 as shown in Steps S207 and S208.

Figure 7:
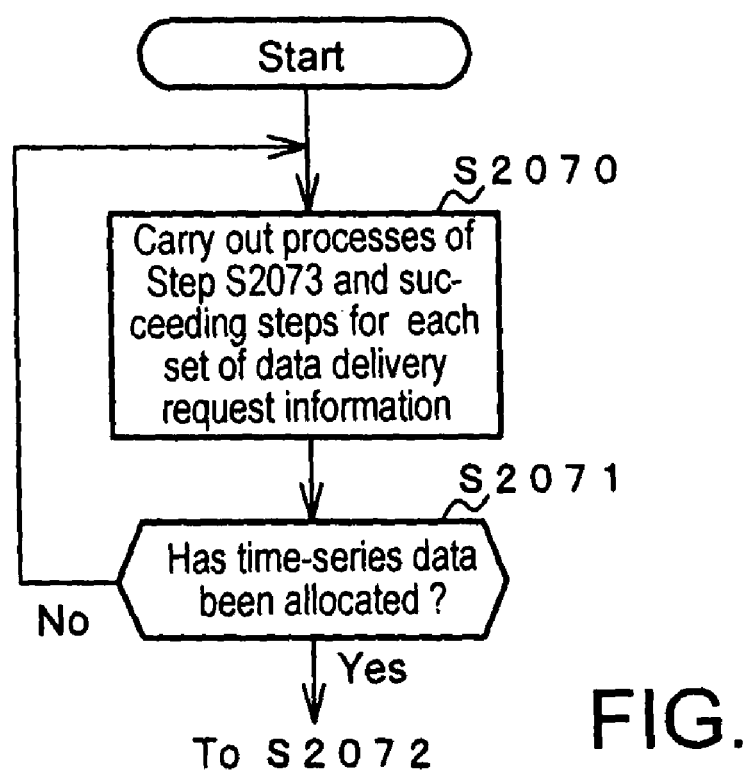
FIG. 7 is a flow chart showing an actual example of the time-series data delivery process.
Figure 8:
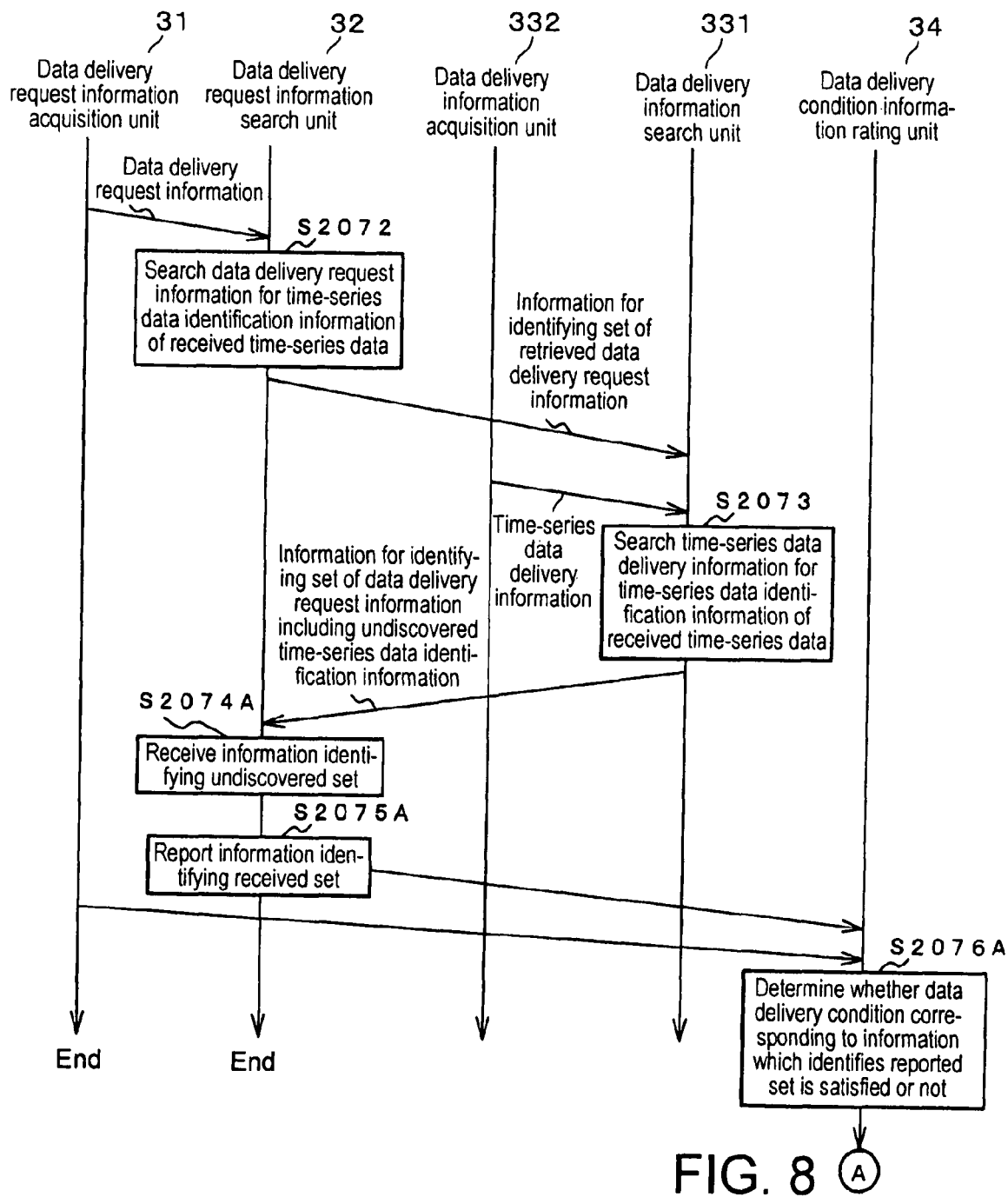
FIG. 8 is a sequence diagram showing an actual example of the time-series data delivery process.
Figure 9:
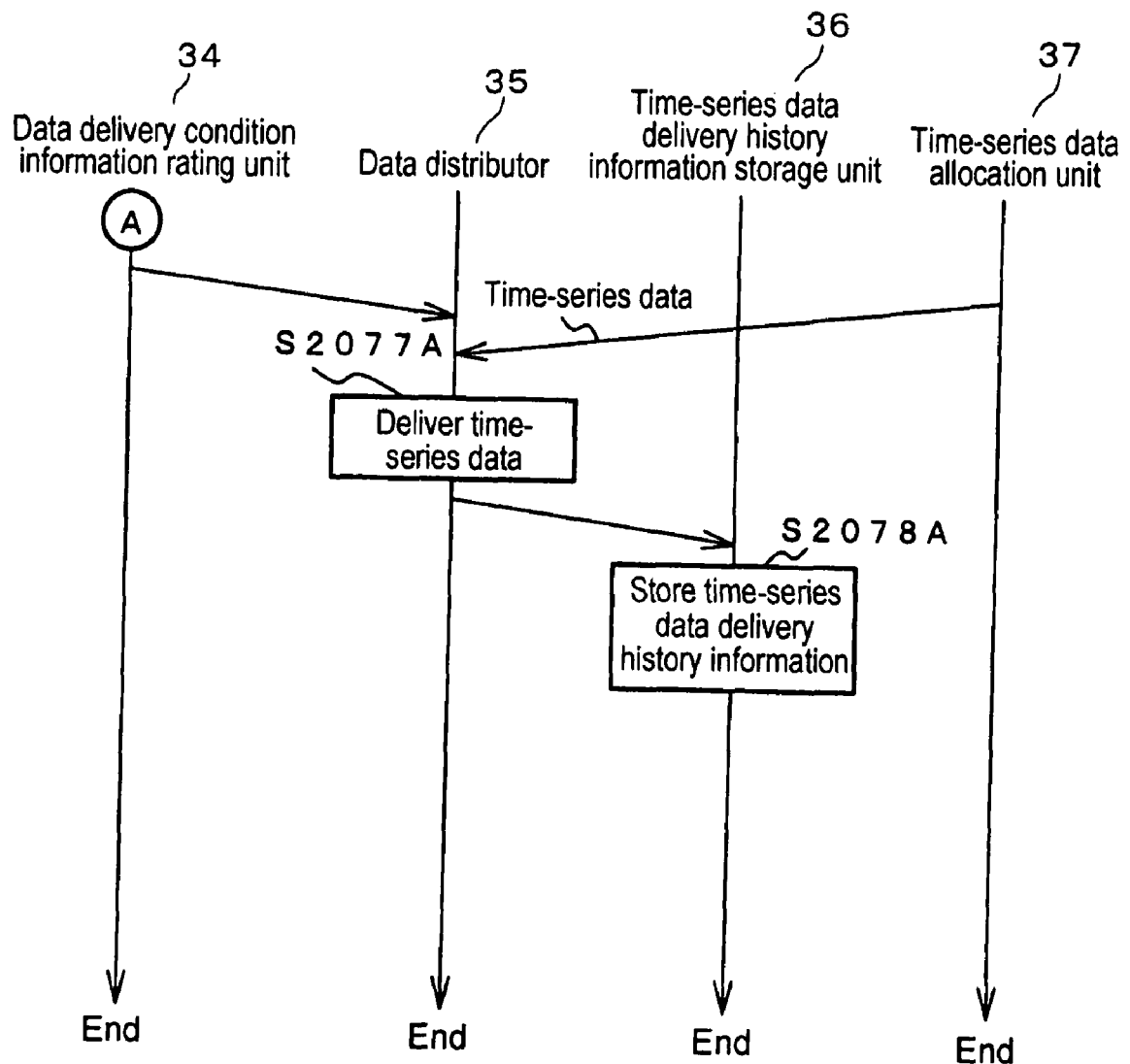
FIG. 9 is a sequence diagram showing an actual example of the time-series data delivery process.

Explanation here regards the details of the time-series data delivery process shown in Steps S207 and S208 by which data delivery device 30 delivers time-series data by way of communication network 50. FIGS. 7, 8 and 9 show a specific example of the time-series data delivery process. FIG. 10 shows an example of time-series data delivery information. In the example shown here, the time-series data are position information of two people named "Taro" and "Jiro." "Taro: location" and "Jiro:location" indicating that the data are position information for "Taro" and "Jiro," respectively, are thus stored in the time-series data identification information, and, for example, "5-minute intervals" indicating that time-series data are delivered at five-minute intervals is stored in the time-series data delivery condition information. The IP (Internet Protocol) address of the data delivery destination is stored as the data delivery destination information, and the IP address of the data-using terminal is stored as the data-using terminal identification information.

In the time-series data delivery process, data delivery device 30 first carries out in Step S2070 the operations of Step S2073 and succeeding steps described hereinbelow for each set of data delivery request information that is registered in data delivery request information acquisition unit 31. Data delivery device 30 then determines in Step S2071 whether time-series data have been newly allocated. If time-series data have not been newly allocated, data delivery device 30 returns to Step S2070 and carries out the operations of Step S2073 and succeeding steps for each set of data delivery request information that is registered in data delivery request information acquisition unit 31.

In other words, data delivery request information search unit 32 in data delivery device 30 selects from among the data delivery request information that is registered in data delivery request information acquisition unit 31 those sets that contain time-series data identification information that is the same as the time-series data identification information of time-series data that are allocated in time-series data allocation unit 37. Data delivery request information search unit 32 next transmits one by one the items of information that identify the sets in the selected data delivery request information to data delivery information processor 33. As an example, when the data delivery request information is assumed to be tabular data and sets are represented on respective lines, the "line numbers" correspond to the information that identifies sets within the selected data delivery request information.

Upon receiving information that identifies sets within the data delivery request information, data delivery information processor 33 searches the time-series data delivery information for time-series data identification information in the data delivery request information that corresponds to the identification information of the received sets (refer to Step S2073). Data delivery device 30 then carries out the operations of Step S2073 and succeeding steps that are described hereinbelow.

Further, upon completion of processing for all sets in Step S2070, data delivery request information search unit 32 repeatedly executes the process of selecting sets that contain the time-series data identification information of the above-described time-series data and transmitting the identification information of sets to data delivery information processor 33.

On the other hand, if it is determined in Step S2071 that time-series data have been newly allocated, data delivery device 30 proceeds to Step S2072 described hereinbelow. In other words, when time-series data have been allocated from data allocation destination control device 10 in the above-described Step S206, data delivery device 30 interrupts the process of Step S2070 and proceeds to the process shown in FIGS. 8 and 9.

When time-series data are allocated, as shown in FIG. 8, data delivery request information search unit 32 conducts a search in Step S2072 in data delivery request information for time-series data identification information in time-series data that has been allocated from data allocation destination control device 10 in Step S206 and transmits information that identifies sets discovered as a result of the search to data delivery information search unit 331. When data delivery request information is not stored in data delivery request information acquisition unit 31 in Step S2072, or when sets are not discovered that contain time-series data identification information that is identical to the received time-series data in the data delivery request information, data delivery device 30 resumes the operation of the above-described Step S2070.

Data delivery information search unit 331 next acquires time-series data delivery information from data allocation information acquisition unit 332 in Step S2073, and searches time-series data delivery information for time-series data identification information that is contained in the data delivery request information transmitted by data delivery request information search unit 32 in Step S2070 or Step S2072.

If, as a result of the search of Step S2073, a relevant set was not discovered, or when time-series data delivery information are not saved in data allocation information acquisition unit 332, data delivery information search unit 331 reports to data delivery request information search unit 32 in Step S2074A the information identifying the set that was not discovered in data delivery request information. Data delivery request information search unit 32 next reports in Step S2075A the identification information of the set that was received in Step S2074A to delivery conditions information rating unit 34.

In the example here described, when a relevant set was not discovered as a result of the search in Step S2073 or when time-series data delivery information is not saved in data allocation information acquisition unit 332, data delivery device 30 carries out the data delivery operation without using time-series data delivery information. The following explanation regards the data delivery operation in which time-series data delivery information is not used.

Upon receiving the identification information of a set transmitted in Step S2075A, data delivery condition information rating unit 34 acquires from data delivery request information acquisition unit 31 the time-series data delivery condition information that is contained in the set of data delivery request information that corresponds to the identification information of the received set. Data delivery condition information rating unit 34 next determines in Step S2076A whether the delivery conditions indicated in the acquired time-series data delivery condition information have been met, and transmits to data distributor 35 information identifying the set in the data delivery request information that contains the time-series data identification information that has been determined to satisfy the data delivery condition information. Data delivery device 30 resumes the operation of the above-described Step S2070 when data delivery condition information rating unit 34 has determined that the delivery conditions indicated by the time-series data delivery condition information are not satisfied for all sets that contain the time-series data identification information that was selected based on the data delivery request information that was searched for in Step S2072.

If it determines that the delivery conditions indicated by the time-series data delivery condition information have been met in Step S2076A, data delivery condition information rating unit 34 transmits to data distributor 35 the identification information of the set in the data delivery request information that was received during the execution of Step S2076A. In Step S2077A, data distributor 35 then acquires from time-series data allocation unit 37 the time-series data identified by the time-series data identification information contained in the set in the data delivery request information that corresponds to the identification information of the acquired set and carries out the delivery process. In the delivery process of Step S2077A, data distributor 35 delivers time-series data to the delivery destinations indicated by the data-using terminal identification information contained in the data delivery request information for which the delivery conditions indicated by the time-series data delivery condition information were determined as satisfied in Step S2076A.

Upon completing the delivery operation of Step S2077A, data distributor 35 then transmits time-series data delivery history information to time-series data delivery history information storage unit 36. In Step S2078A, time-series data delivery history information storage unit 36 stores the received time-series data delivery history information. As the time-series data delivery history information that is stored in Step S2078A, time-series data identification information, data delivery destination information, data-using terminal identification information that indicates the data-using terminal that requests the time-series data, time-series data delivery condition information, and time-series data detection information in the time-series data that have been delivered in the delivered time-series data are stored for each time time-series data are delivered.

Data delivery device 30 further resumes the operation of the above-described Step S2070 after the time-series data delivery history information has been stored.

When, as the result of the search in Step S2073 a relevant set is discovered in the example here described, data delivery device 30 carries out the data delivery operation using the time-series data delivery information. The following explanation regards the data delivery operation using time-series data delivery information.

Figure 25:
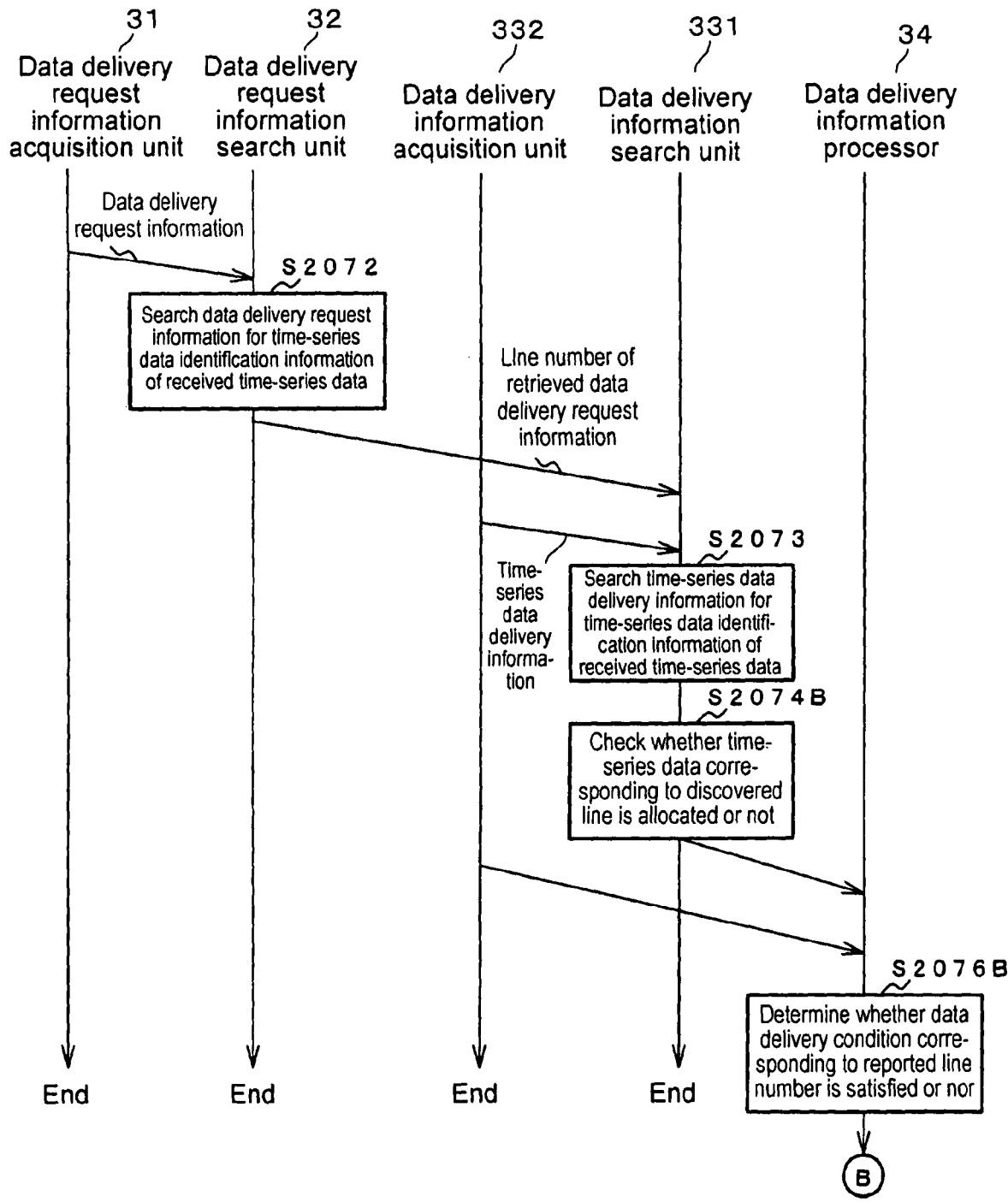
FIG. 25 is a sequence diagram showing an actual example of the time-series data delivery process.
Figure 26:
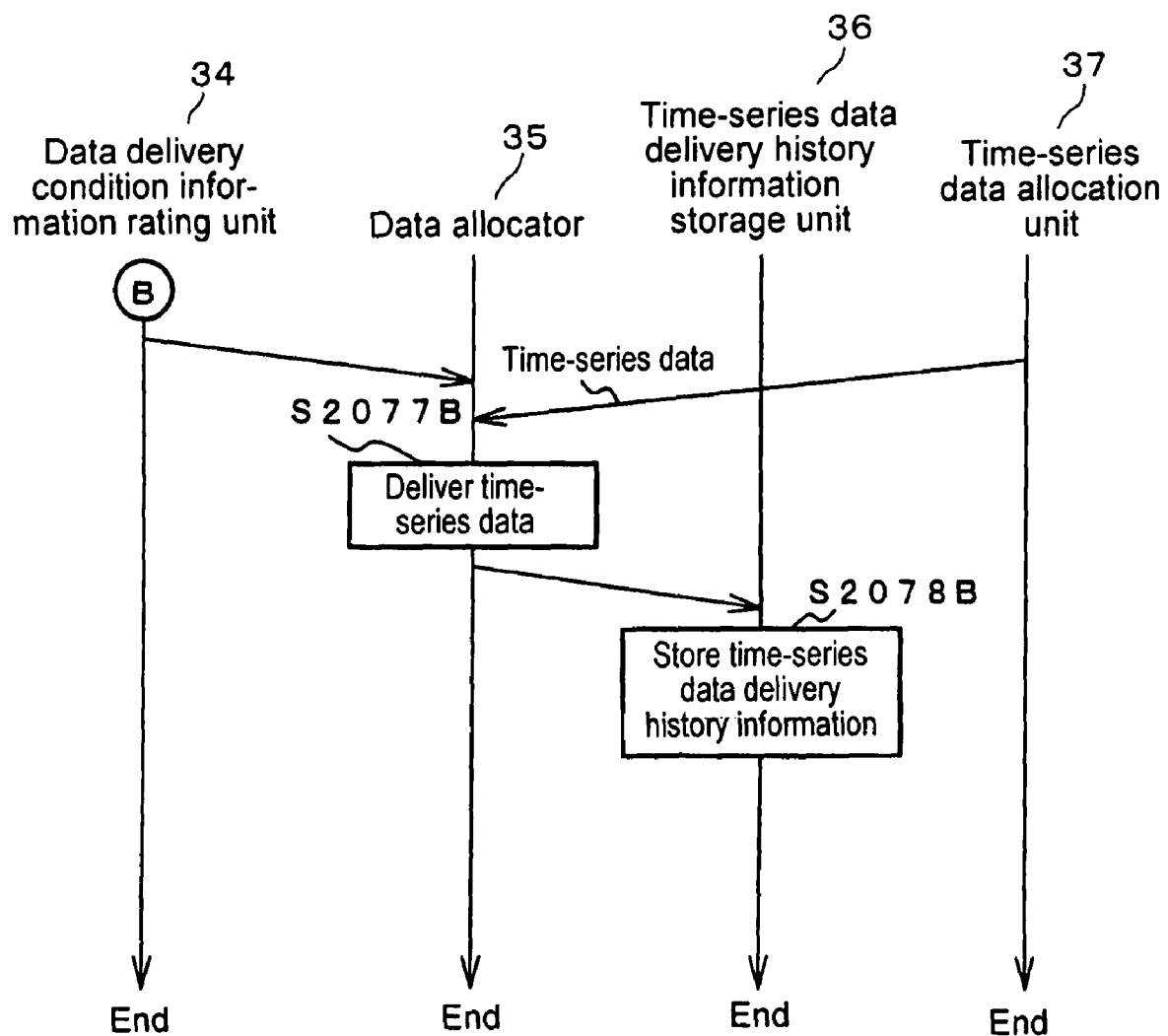
FIG. 26 is a sequence diagram showing an actual example of the time-series data delivery process.

When relevant sets are discovered as the result of the search in Step S2073, data delivery device 30 carries out the time-series data delivery process by carrying out one-by-one the series of operations of Step S2074B to Step S2078B shown below upon the sets in the discovered time-series data delivery information. FIGS. 25 and 26 described hereinbelow show the processing that includes Step S2074B to Step S2078B.

Of the one or more sets discovered in Step S2073, the following Steps S2074B to S2077B are first carried out upon the first set. The set in time-series data delivery information for which Step S2074B to Step S2077B are carried out is represented as the "processing object set." In the following explanation, the time-series data that include time-series data identification information in the time-series data allocated from data allocation destination control device 10 in the above-described Step S206 and the time-series data that include other time-series data identification information that are contained in the set that is the processing object set in the time-series data delivery information are each represented as "delivery candidate time-series data."

In Step S2074B, data delivery information search unit 331 checks whether delivery candidate time-series data have already been allocated in data delivery device 30. In the following explanation, time-series data that have been confirmed as stored in data delivery device 30 in Step S2074B and time-series data that have been allocated from data allocation destination control device 10 in Step S206 are each represented as "delivery object time-series data."

Data delivery information search unit 331 next transmits to data delivery condition information rating unit 34 information that identifies the sets in the time-series data delivery information that include the delivery object time-series data. In Step S2076B, data delivery condition information rating unit 34 determines whether the delivery conditions indicated by the time-series data delivery condition information that is contained in the lines of the time-series data delivery information (refer to FIG. 10) that corresponds to the received set identification information are satisfied, and transmits to data distributor 35 information that identifies the sets in the time-series data delivery information that include the time-series data for which the delivery conditions are determined to have been satisfied. The operation for determining whether the delivery conditions indicated by the time-series data delivery condition information are satisfied in Step S2076B is equivalent to the above-described Step S2076A, and detailed explanation is therefore here omitted. Data delivery device 30 resumes the operation of the above-described Step S2070 when the delivery conditions indicated by time-series data delivery condition information are determined as unsatisfied for all sets that are discovered by data delivery condition information rating unit 34 from time-series data delivery information in Step S2073.

When the delivery conditions indicated by the time-series data delivery condition information are determined to have been satisfied in Step S2076B, data delivery condition information rating unit 34 transmits to data distributor 35 information identifying the sets in the time-series data delivery information that was received when executing Step S2076B. Data distributor 35 then, in Step S2077B, acquires from time-series data allocation unit 37 the time-series data that accord with the time-series data delivery information that corresponds to the identification information of the acquired sets and carries out the delivery process. In the delivery process of Step S2077B, data distributor 35 delivers time-series data to the delivery destinations indicated by the data delivery destination information contained in the time-series data delivery information for which the delivery conditions indicated by the time-series data delivery condition information have been determined as satisfied in Step S2076B.

Upon completion of the delivery operation of Step S2077B, data distributor 35 then transmits time-series data delivery history information to time-series data delivery history information storage unit 36. In Step S2078B, time-series data delivery history information storage unit 36 stores the received time-series data delivery history information.

Data delivery device 30 carries out the operations of Step S2074B to Step S2078B for all sets discovered in Step S2073, and, after having stored the time-series data delivery history information, resumes the above-described operation of Step S2070.

Finally, in the previously described Step S208, communication network 50 communicates the time-series data that were delivered in Step S207 in accordance with the data delivery destination information and thus sends the time-series data to data-using terminal 40a.

In the above-described example, a plurality of items of time-series data are transmitted to data-using terminal 40a in a single process, or one item of time-series data is transmitted to a plurality of data-using terminals in a single process, or a plurality of time-series data are transmitted to a plurality of data-using terminals in a single process. Accordingly, the number of delivery processes in data delivery device 30 can be reduced when compared to the separate delivery of time-series data.

As described in the foregoing explanation, a configuration was adopted in the first embodiment in which increase in the processing load that accompanies increase in the number of items of data that are the object of delivery can be mitigated by, based on delivery history information, generating a plurality of items of time-series data for which simultaneous delivery to prescribed destinations is permitted or time-series data delivery information that includes a plurality of destinations to which the simultaneous delivery of prescribed time-series data is permitted and then using the time-series data delivery information to carry out the time-series data delivery process. In this embodiment, moreover, the increase in processing load that accompanies increase in the number of delivery destinations can be mitigated and the number of delivery processes can be reduced, whereby the process of delivering time-series data can be carried out smoothly.

Second Embodiment

Figure 11:
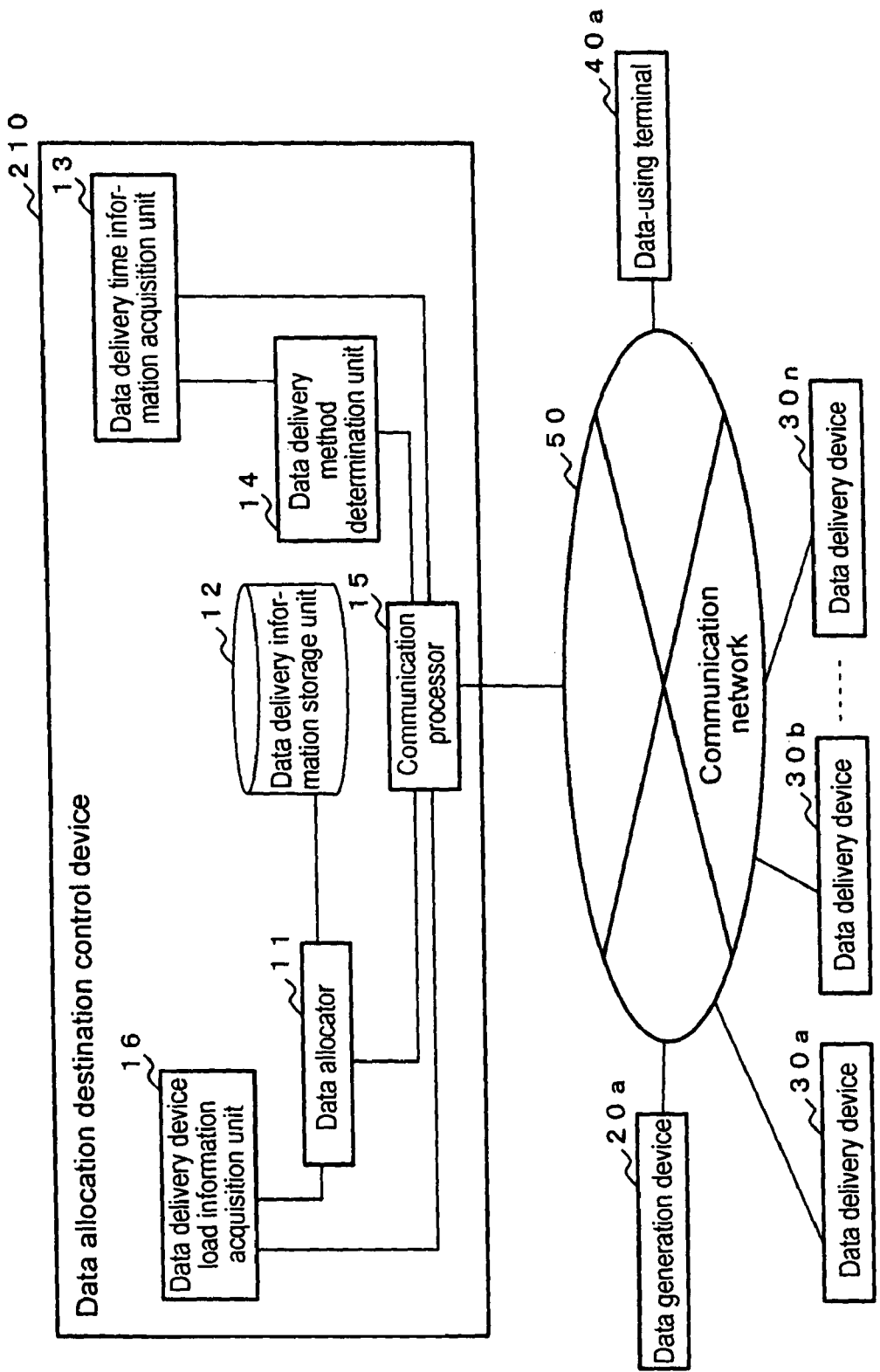
FIG. 11 is a block diagram showing an example of the configuration of the data delivery system in a second embodiment of the present invention.

Explanation next regards the second embodiment of the present invention. FIG. 11 is a block diagram showing an example of the configuration of data delivery system 200 in the second embodiment Elements and parts that perform operations and that have configurations equivalent to the previously described first embodiment are given the same reference numerals, and detailed explanation of these components is omitted.

As shown in FIG. 11, the second embodiment differs from the first embodiment in that a plurality of data delivery devices 30a to 30n are provided, and further, data allocation destination control device 210 is provided with data delivery device load information acquisition unit 16.

Data delivery device load information acquisition unit 16 periodically acquires the load information of data delivery devices 30a to 30n by way of communication network 50 and stores this load information in a storage device in data allocation destination control device 10. The load information of the data delivery devices is information indicating the processing load of the data delivery devices, the degree of processing load being represented by a numerical value/Examples of the load information of a data delivery device include the number of delivery processes and the amount of memory used within a fixed time interval and the number of simultaneous processes in a central processing unit at a particular time. Technology such as SNMP (Simple Network Management Protocol) can be used as the method of acquiring the load information of a calculation device at a remote point.

Explanation next regards the operation of the data delivery system of the present embodiment. The operation of this data delivery system is similar to the operation in the above-described first embodiment. However, the operation in the present embodiment differs from that of the first embodiment in that, in Step S104 (see FIG. 4), data delivery method determination unit 14 transmits time-series data delivery information generated in Step S103 to both data delivery information storage unit 12 and to data delivery devices 30a to 30n by way of communication network 50. The present embodiment further differs from the first embodiment in that, in Step S204 of the time-series data allocation process (see FIG. 5), the data delivery device to which time-series data are allocated from among the plurality of data delivery devices 30a to 30n is determined as described hereinbelow.

In the present embodiment, at the time of the time-series data allocation operation of Step S205 (see FIG. 5), data allocator 11 refers to the time-series data delivery information that is recorded in data delivery information storage unit 12. Data delivery information storage unit 12 next acquires the load information of data delivery devices 30a to 30n that is recorded in data delivery device load information acquisition unit 16.

Figure 12:
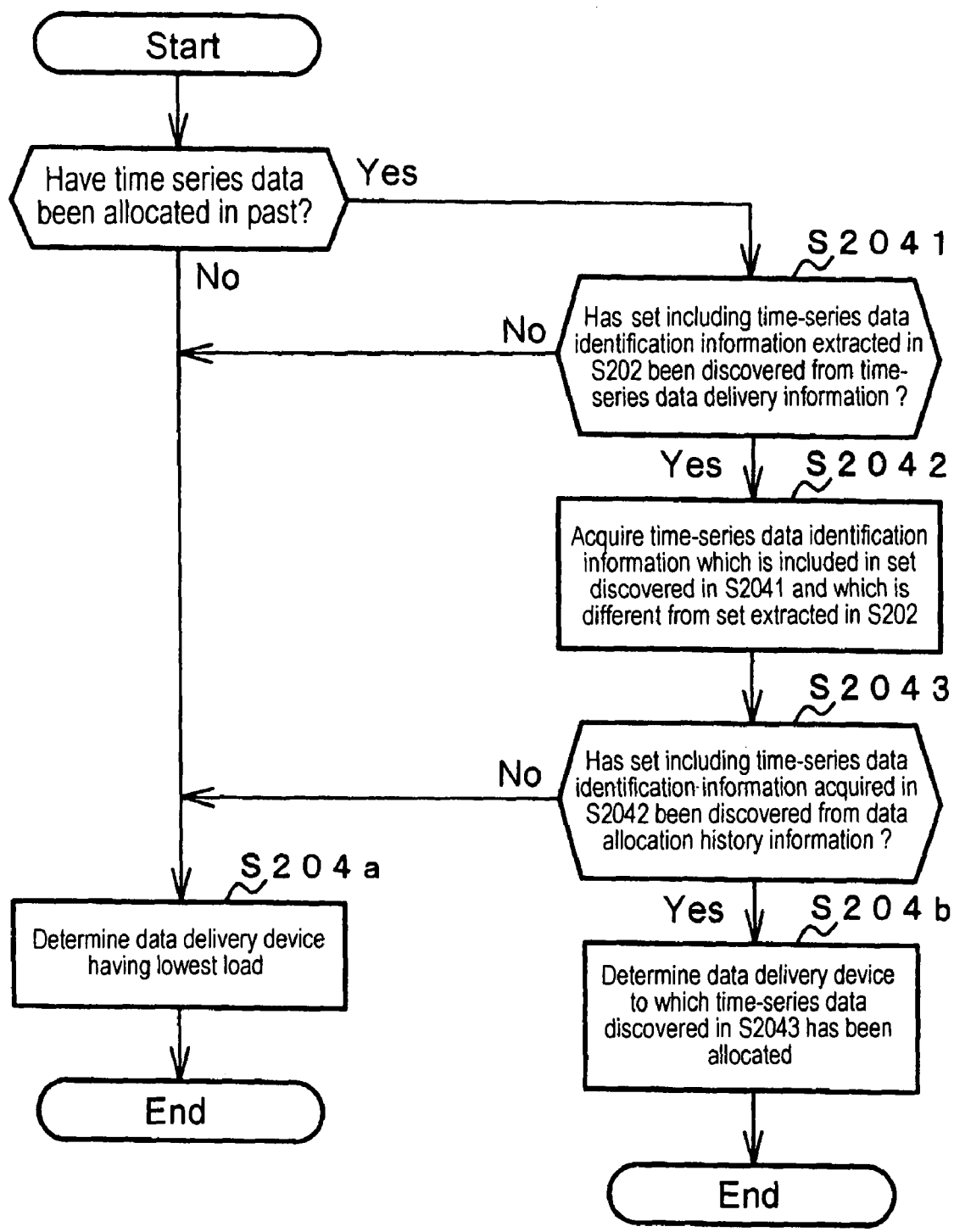
FIG. 12 is a flow chart showing an example of the time-series data allocation process.

As described hereinbelow, data allocator 11 determines, based on the acquired time-series data delivery information and load information of the data delivery devices, the data delivery device that is the delivery destination of the time-series data that correspond to the time-series data identification information that was extracted in Step S202. FIG. 12 is a flow chart showing an example of the process of allocating time-series data in data delivery system 200.

Data allocator 11 first determines whether time-series data have been allocated in the past.

When there is not a single instance of an allocation process of time-series data in the past, data allocator 11 refers to the load information of data delivery devices 30a to 30n in Step S204a and determines the data delivery device having the lowest load.

Data allocator 11 further records, as one set in data delivery information storage unit 12, the time-series data identification information in the allocated time-series data and the data delivery device identification information that indicates the data delivery device to which allocation was made. The above-described set of time-series data identification information that was allocated and data delivery device identification information indicating the data delivery device to which allocation was made is expressed as "data allocation history information."

Explanation next regards a case in which the delivery process of time-series data has already been carried out one or more times. In this case, one or more sets of the time-series data identification information that has been allocated in the past and the data delivery device identification information indicating the data delivery device to which allocation was made have already been recorded. The set of the time-series data identification information and the data delivery device identification information is referred to as the data allocation history information.

Data allocator 11 first refers in Step S2041 to combinations for realizing a delivery method that can reduce the number of time-series data delivery processes in the data delivery device that have been recorded in the time-series data delivery information, and then searches for combinations that contain time-series data identification information that was extracted in Step S202. In Step S2042, data allocator 11 next acquires other time-series data identification information in the combinations discovered as a result of the search. In Step S2043, data allocator 11 then searches from the data allocation history information for a set that includes other time-series data identification information that has been acquired in Step S2042. When a set containing other time-series data identification information can be discovered in Step S2043, data allocator 11 acquires from the set that was discovered in Step S2043 identification information of the data delivery device to which allocation was made, in Step S204*b*.

On the other hand, when the object of search is not discovered in Steps S2041 and S2043, data allocator 11 acquires the identification information of the data delivery device having the lowest load from the load information of data delivery devices in Step S204*a*.

The other constituent elements and operations in the second embodiment are equivalent to the first embodiment and explanation is therefore here omitted.

As described in the foregoing explanation, when the load of the delivery process is distributed among a plurality of data delivery devices 30*a* to 30*n* in the second embodiment, combinations for realizing a delivery method that can reduce the number of time-series data delivery processes in the data delivery devices are allocated to the same data delivery device, and as a result, a greater reduction of the number of delivery processes per data delivery device can be achieved than in a case in which delivery processes of each item of time-series data are simply distributed to a plurality of data delivery devices.

Although not specifically described in each of the above-described embodiments, each process that is executed in data delivery systems 100 and 200 is executed in accordance with a control program, i.e., a data delivery program, which is installed in data delivery system 100 and the like. This control program is, for example, a data delivery program for delivering delivery object data that include the observation time and observation results of a prescribed object of observation to a data-using terminal by way of a communication network, and this control program controls, for example, the operations of the computers which are data allocation destination control device 10 and data delivery device 30 that make up data delivery system 100. As an example, this data delivery program is a data delivery program for causing a computer to execute processes for delivering delivery object data, which include the observation time and observation results of a prescribed object of observation, to a data-using terminal by way of a communication network; and causes the computer to execute:

a process of storing, in a first storage unit, delivery request information in which a delivery destination, a type of delivery object data that are the object of delivery, and a delivery condition are placed in correspondence;

a delivery process for delivering delivery object data when the delivery condition has been realized;

a process of storing, in a second storage unit, delivery history information that indicate the delivery history of the delivery object data; and a packaged delivery information generation process for, based on the delivery history information, generating packaged delivery information, which is any one of: (a) information in which a plurality of delivery destinations to which the same delivery object data are simultaneously delivered are placed in correspondence, (b) information in which a plurality of types of delivery object data that are simultaneously delivered to the same data-using terminal are placed in correspondence, and (c) information in which a plurality of delivery destinations to which the same delivery object data are simultaneously delivered and a plurality of types of delivery object data that are simultaneously delivered to the same data-using terminal are placed in correspondence. This data delivery program causes a computer to execute processes in the delivery process for, based on the packaged delivery information, delivering delivery object data of all types that have been placed in correspondence with delivery conditions that have been realized to the data-using terminals of all delivery destinations that have been placed in correspondence with these delivery conditions that have been realized.

The foregoing explanation regards the data delivery system of the second embodiment of the present invention. In the present invention, a system may be of a configuration in which the above-described first embodiment and second embodiment are combined. In the above-described embodiments, time-series data that include the position information of a person or object were used as an example, but the time-series data may also be other information such as the temperature information of a room or the noise levels of a road. Further, although data allocation destination control devices 10 and 210 and data delivery devices 30 and 30*a* to 30*n* were realized as separate components in each of the above-described embodiments, data allocation destination control devices 10 and 210 and data delivery devices 30 and 30*a* to 30*n* may be realized by, for example, a single server.

WORKING EXAMPLES

Explanation next regards actual working examples of the data delivery system based on each of the above-described embodiments.

First Working Example

Figure 13:
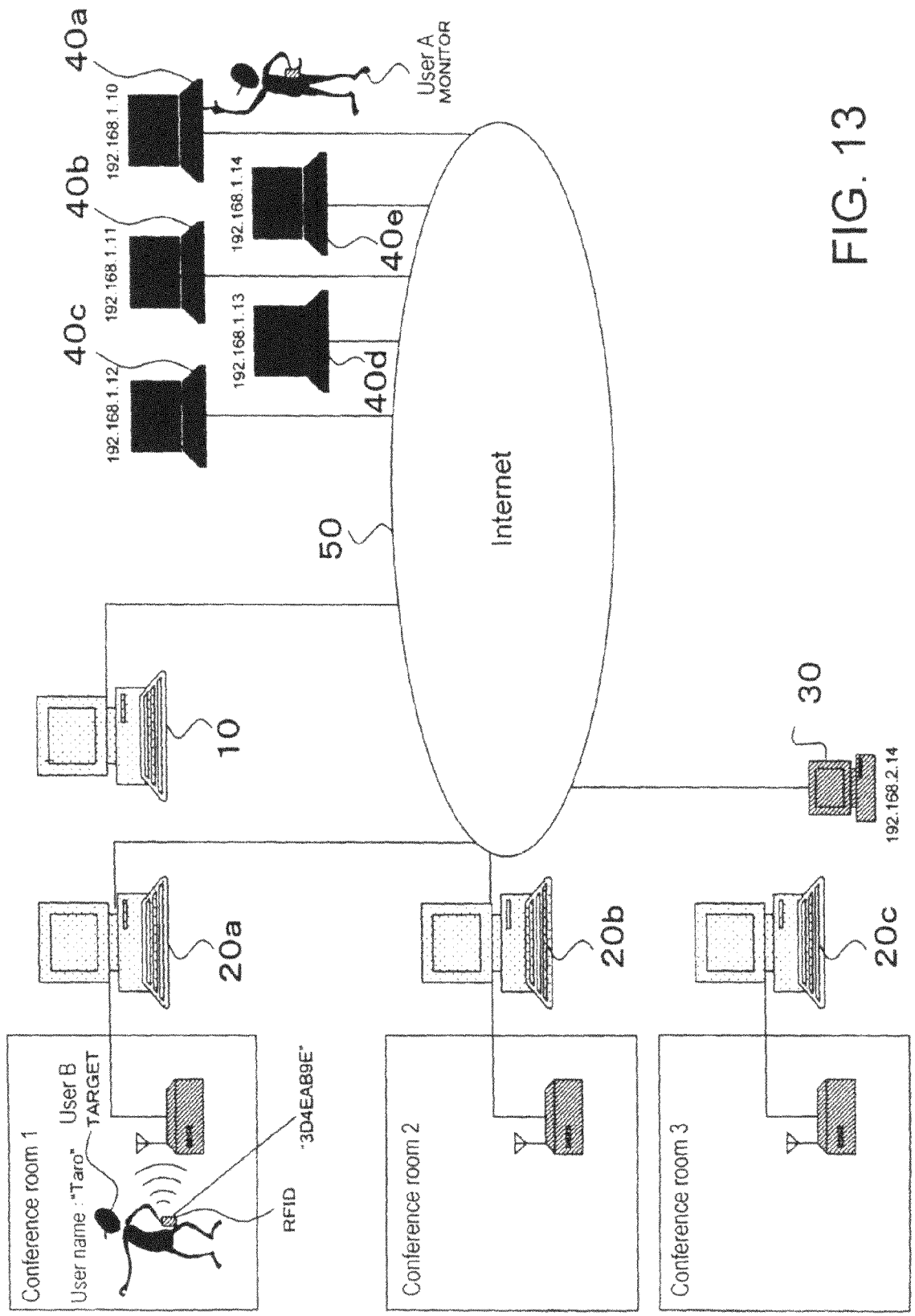
FIG. 13 is a schematic view of the overall composition of the data delivery system in a first working example.

The first working example illustrates an actual example of the time-series data delivery information setting process (see FIG. 4) and the like in the first embodiment. FIG. 13 shows the overall configuration of data delivery system 100 in the first working example. That is, in this working example, processes are executed in data delivery system 100 by which, as shown in FIG. 13, user A that uses data-using terminal 40*a* acquires the position information of a person such as another user B to whom an RFID (Radio Frequency Identification) tag is attached. In FIG. 13, user A is represented as "MONITOR" and user B is represented as "TARGET."

Data delivery system 100 shown in FIG. 13 includes data allocation destination control device 10, data generation devices 20*a* to 20*c*, data delivery device 30, and data-using terminals 40*a* to 40*e*. In FIG. 13, IP addresses are shown that are assigned to each of data delivery device 30 and data-using terminals 40*a* to 40*e*. In this example, RFID tag reading devices are used as information detection devices, and RFID tag reading devices are installed in each of conference rooms 1 to 3.

Data generation devices 20*a* to 20*c* are connected to each of the RFID tag reading devices that are installed in conference rooms 1 to 3, and these data generation devices 20*a* to 20*c* each receive tag identification information from each RFID tag reading device and, based on the tag identification information, generate time-series data. In each of data allocation destination control device 10, data delivery device 30, and data-using terminals 40*a* to 40*e*, personal computers are used that are provided with communication processors such as Ethernet devices and in which software is installed for executing various processes. In addition, the Internet is used as communication network 50, and data allocation destination control device 10, data generation devices 20*a* to 20*c*, data delivery device 30, and data-using terminals 40*a* to 40*e* are all connected to the Internet.

In this example, an RFID tag in which the identification information is "3D4EAB9E" is conferred to user B who has the user name "Taro." The RFID tag can be attached to a user by, for example, attaching the RFID tag to the user's clothing, storing in an RFID tag storage case that belongs to the user, or in any manner that allows sensing by the RFID tag reading device.

FIG. 14 shows an actual example of time-series data that are used in data delivery system 100 shown in FIG. 13. In this case, "time-series data" are assumed to be data that include: name information that indicates a name for specifying the person or thing that is the object of observation, time information that indicates the times of observation of the person or thing that is the object of observation, and detection information indicating the results of observation of the person or thing that is the object of observation. The "name information" in the time-series data is expressed by a character string that represents the name of the person, thing, or place that is the object of observation and a character string that represents the content of the corresponding detection information, these two elements being connected by a colon (:).

The "detection information" in the time-series data is expressed by a character string that represents the observation results. For example, the detection information is expressed by a character string that indicates position information such as "conference room 1" or "first floor lobby" when position is to be obtained as the observation results, or is expressed by a character string that indicates temperature information such as "25° C." when temperature is to be obtained as the observation results.

The "time information" in the time-series data means information for specifying the time at which the detection information was obtained. In the present example, the time indicated by "time information" is assumed to be the time at which data generation devices 20*a* to 20*c* obtain the tag identification information from the RFID tag reading device. The "time information" may be expressed as the date and the time up to the hour, minute and second, or may otherwise be expressed up to the year, month, and date, or up to the hour and minute.

In the example shown in FIG. 14, the "time information" in the time-series data is 14:05:3.5 of Jan. 14, 2004. The "name information" is "Taro:location" in which a character string indicating a specific person, in this case, "Taro" indicating the name of user B, and a character string "location" indicating that the corresponding detection information is position information are joined by a colon (:). The "detection information" is the value "conference room 1" that represents the position as the observation results of the object of observation. Accordingly, the time-series data shown in FIG. 14 means that "Taro" (user B) was in "conference room 1" at 14:05:3.5 on Jan. 14, 2004.

FIG. 15 shows an example of tag identification information that is reported from the RFID tag reading device to data generation devices 20*a* to 20*c*. FIG. 15 shows the tag identification information that RFID tag reading device reports to data generation device 20*a* when the RFID tag reading device installed in conference room 1 detects the RFID tag "3D4EAB9E" that is attached to user B.

FIG. 16 shows an example of the data delivery request information input screen for entering data delivery request information. The data delivery request information input screen is a screen displayed on the display devices provided in each of data-using terminals 40*a* to 40*e* when each of data-using terminals 40*a* to 40*e* accesses the website that is established on data delivery device 30, which is configured as, for example, a www (World Wide Web) server. As shown in FIG. 16, data delivery request information input screen is provided with: data-using terminal identification information input area 501 for entering the data-using terminal identification information for identifying the data-using terminal, for example, data-using terminal 40*a*, that desires delivery of time-series data; time-series data identification information input area 502 for entering time-series data identification information indicating the type of time-series data for which delivery is desired; time-series data delivery condition information input area 503 for entering time-series data delivery condition information indicating the delivery condition of the time-series data; and registration button 504 that is pushed or clicked on when determining that the data delivery request information is to be registered with the content that has been entered in each of input areas 501 to 503.

In the example shown in FIG. 16, the IP address "192.168.1.10" assigned to data-using terminal 40*a* is entered in data-using terminal identification information input area 501, "Taro:location" is entered in time-series data identification information input area 502, and "5-minute intervals" is entered in time-series data delivery condition information input area 503. In other words, the data delivery request information shown in FIG. 16 signifies that user A that controls data-using terminal 40*a* is requesting data delivery device 30 to transmit to data-using terminal 40*a* time-series data that includes position information that indicates the current location of user B at five-minute intervals.

Apart from the example shown in FIG. 16, other information that can specify each of data-using terminals 40*a* to 40*e*, such as MAC (Media Access Control) addresses that are assigned, respectively, to communication processors in data-using terminals 40*a* to 40*e*, may be used as "data-using terminal identification information." In addition, types of time-series data that include information other than position information such as "Room 1:temperature" that indicates the temperature information of a particular room or "Route2:noise" that indicates the noise level of a particular road may be designated as the "time-series data identification information." Still further, the "time-series data delivery condition information" may be set to designate time intervals other than "5-minute intervals"; or may be set to designate "change of value" indicating that time-series data are to be delivered only when time-series data of a value that differs from the value of the preceding delivery time, i.e., the content of the preceding detection information, have been allocated to data delivery device 30, or may be set to designate "'conference room 1' or 'conference room 2'" indicating that time-series data are to be delivered only when the value is "conference room 1" or "conference room 2."

In this example, after manipulating an input device such as a keyboard provided in data-using terminal 40*a* to enter: data-using terminal identification information, which is the identification information of data-using terminal 40*a*; time-series data identification information indicating the type of time-series data for which delivery to data-using terminal 40*a* has been requested; and time-series data delivery condition information into the data delivery request information input screen shown in FIG. 16, user A of data-using terminal 40*a* clicks or presses registration button 504 by an input device such as a mouse that is provided in data-using terminal 40*a*. As a result, the data delivery request information that has been entered into each of input areas 501 to 503 is transmitted by way of communication network 50 to data delivery device 30 and this data delivery request information then registered in data delivery device 30, and more specifically, in data delivery request information acquisition unit 31.

FIG. 17 shows an example of the data delivery request information that is stored in data delivery request information acquisition unit 31. As shown in FIG. 17, the plurality of items of data delivery request information acquired from each of data-using terminals 40*a* to 40*e* are stored in data delivery request information acquisition unit 31. In the table of data delivery request information shown in FIG. 17, the data delivery request information from data-using terminal 40*a* is registered in the lines of line numbers 1 to 3, the data delivery request information from data-using terminal 40*b* is registered in the line of line number 4, the data delivery request information from data-using terminal 40*c* is registered in the line of line number 5, and the data delivery request information from data-using terminal 40*e* is registered in the lines of line number 6 to 7.

The data delivery request information registered in the line of line number 1 indicates that data-using terminal 40*a* has issued a request to data delivery device 30 for the delivery of time-series data that include the position information of "Taro" (user B) at five-minute intervals.

The data delivery request information registered in the line of line number 2 indicates that data-using terminal 40*a* has issued a request to data delivery device 30 for the delivery of time-series data that include position information of "Hanako" at ten-minute intervals. "Hanako" is the name of another user different from "Taro" and "Jiro."

The data delivery request information registered in the line of line number 3 indicates that data-using terminal 40*a* has issued a request to data delivery device 30 for the delivery of time-series data that include the position information of "Jiro" at five-minute intervals.

The data delivery request information registered in the line of line number 4 indicates that data-using terminal 40*b* has issued a request to data delivery device 30 for the delivery of time-series data that include the position information of "Taro" (user B) when a "change in value" occurs, i.e., when the detection information changes.

The data delivery request information registered in the line of line number 5 indicates that data-using terminal 40*c* has issued a request to data delivery device 30 for the delivery of time-series data that include the position information of "Jiro" when the detection information is "conference room 1" or "conference room 2."

The data delivery request information registered in the line of line number 6 indicates that data-using terminal 40*e* has issued a request to data delivery device 30 for the delivery of time-series data that include the position information of "Taro" at five-minute intervals.

The data delivery request information registered in the line of line number 7 indicates that data-using terminal 40*e* has issued a request to data delivery device 30 for the delivery of time-series data that include the position information of "Jiro" at five-minute intervals.

Explanation next regards the operations by which data generation device 20*a* generates time-series data. In this example, data generation device 20*a* generates time-series data in which the detection information is "conference room 1," data generation device 20*b* generates time-series data in which the detection information is "conference room 2," and data generation device 20*c* generates time-series data in which the detection information is "conference room 3." Explanation here regards the operation by which data generation device 20*a* generates time-series data.

Figure 18:
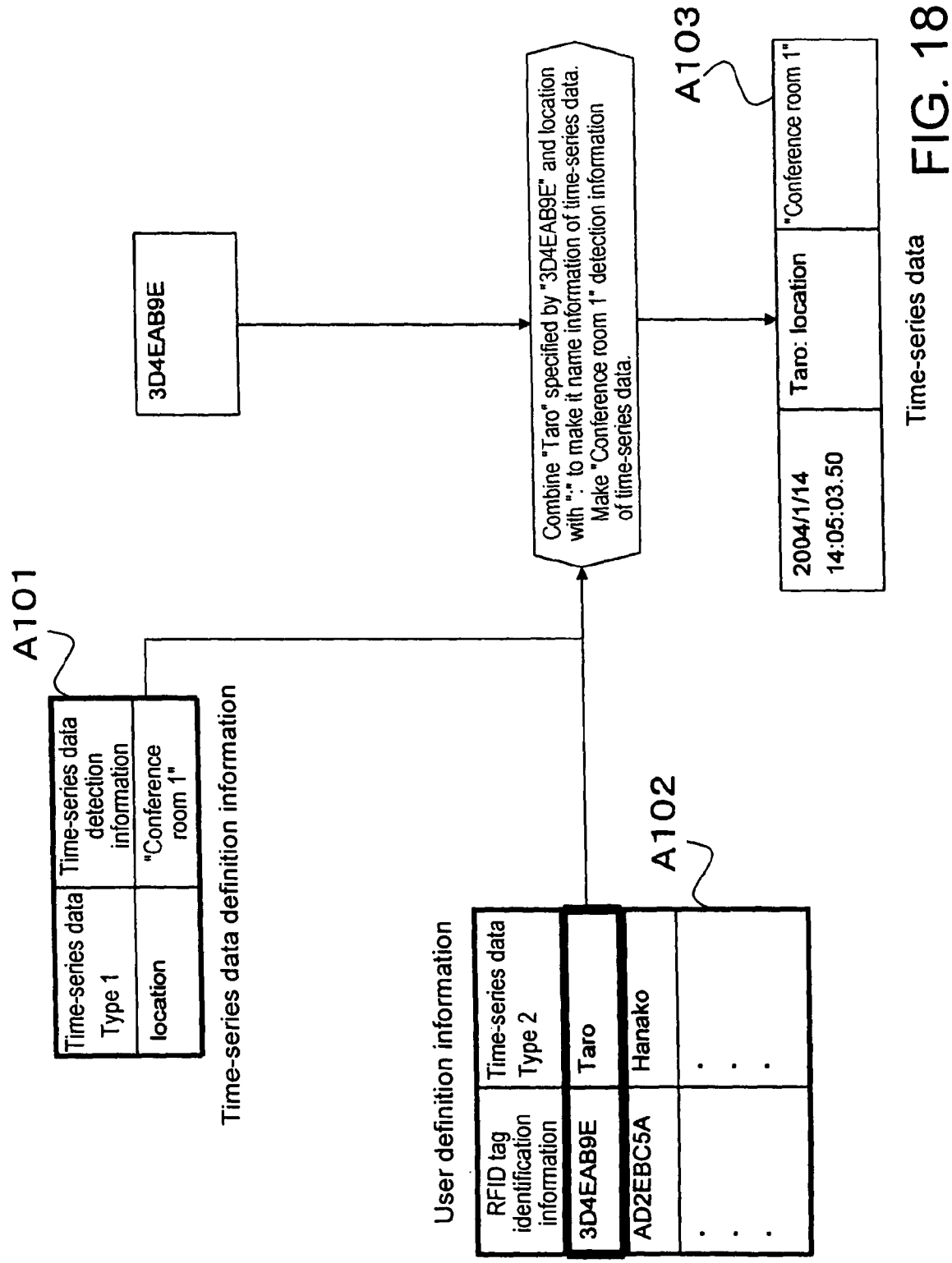
FIG. 18 is a view for explaining the operation for generating time-series data.

FIG. 18 shows the operations by which data generation device 20*a* generates time-series data when, as an example of time-series data, RFID tag identification information such as shown in FIG. 15 is reported from RFID tag reading devices.

First, when the RFID tag that is attached to user B arrives at a location within the range that can be read from an RFID tag reading device, the RFID tag reading device connected to data generation device 20*a* reads the RFID tag identification information (see FIG. 15) that has been uniquely assigned for each RFID tag and reports the RFID tag identification information that has been read to data generation device 20*a*.

As shown in FIG. 18, it is assumed that time-series data definition information A101 and user definition information A102 have been stored in advance in data generation device 20*a*. In this case, time-series data definition information A101 is information in which the character string "location" indicating the type of time-series data that is generated by data generation device 20*a* and the detection information "conference room 1" indicating the detection position in which the RFID tag reading device connected to data generation device 20*a* performs detection have been placed in correspondence. Further, the "time-series data-definition information" is information in which the type of time-series data and the time-series data detection information have been placed in correspondence. User definition information A102 is information in which the RFID tag identification information used in this data delivery system 100 and the character string that indicates a user's name and that is a part of the name information in the time-series data have been placed in correspondence. Still further, the "user definition information" is information in which each user and the RFID tag identification information that is set in the RFID tag that is attached to each user have been placed in correspondence.

Upon receiving notification of the RFID tag identification information that has been read by the RFID tag-reading device, data generation device 20*a* uses time-series data definition information A101 and user definition information A102 to convert the RFID tag identification information acquired from the RFID tag-reading device to time-series data A103. More specifically, data generation device 20*a* first searches user definition information A102 for the user name that corresponds to the RFID tag identification information "3D4EAB9E" that has been acquired, and thus obtains the user name "Taro." Data generation device 20*a* next acquires from time-series data definition information A101 the type "location" of the time-series data and combines the user name and time-series data type by ":" to obtain the time-series data name "Taro:location." Data generation device 20*a* then obtains the time-series data detection information "conference room 1" from time-series data definition information A101. Finally, data generation device 20a sets the time "14:05:3.5 of Jan. 14, 2004" at which the time-series data detection information "conference room 1" was acquired.

Data generation device 20a combines the time-series data name "Taro:location," the time-series data detection information "conference room 1," and the time "14:05:3.5 of Jan. 14, 2004" at which the time-series data detection information was acquired that were obtained as described above to generate one item of time-series data A103. Data generation device 20b similarly generates time-series data in which the time-series data detection information is "conference room 2," and data generation device 20c generates time-series data in which the time-series data detection information is "conference room 3."

Upon receiving time-series data A103, data allocator 11 provided in data allocation destination control device 10 transmits to data delivery information storage unit 12 the time-series data identification information in time-series data A103 that was received from data generation device 20a (see Step S202). For example, data allocator 11 obtains "Taro:location" as the time-series data identification information in time-series data A103. In this example, the IP address "192.168.2.14" (see FIG. 4) that is assigned to data delivery device 30 is then reported as delivery device identification information that indicates data delivery device 30 to data allocator 11.

Explanation next regards a summary of the time-series data delivery information setting operation.

Data delivery method determination unit 13 in data allocation destination control device 10 first determines the combination of a plurality of items of time-series data that are to be delivered simultaneously by data delivery device 30. In this working example, a plurality of times for which the time differences are within a fixed time interval are described as being "simultaneous." For example, when times that are within ten seconds of each other are defined as being simultaneous, the two times "19:30:05 of Jan. 5, 2004" and 19:30:14 of Jan. 5, 2004" have only a nine-second time difference and are therefore simultaneous. In this working example, the time interval for defining "simultaneous" is set in advance to "10 seconds."

After determining the combination of a plurality of items of time-series data that are delivered simultaneously by data delivery device 30, data delivery method determination unit 14 stores the IP addresses that are the delivery destinations of the plurality of items of time-series data that data delivery device 30 is to deliver simultaneously, the IP addresses of the data-using terminals that requested delivery, and the delivery condition information as well as the identification information of the plurality of items of time-series data that are to be delivered simultaneously as the time-series data delivery information in data delivery information storage unit 12 and data delivery device 30.

Figure 19:
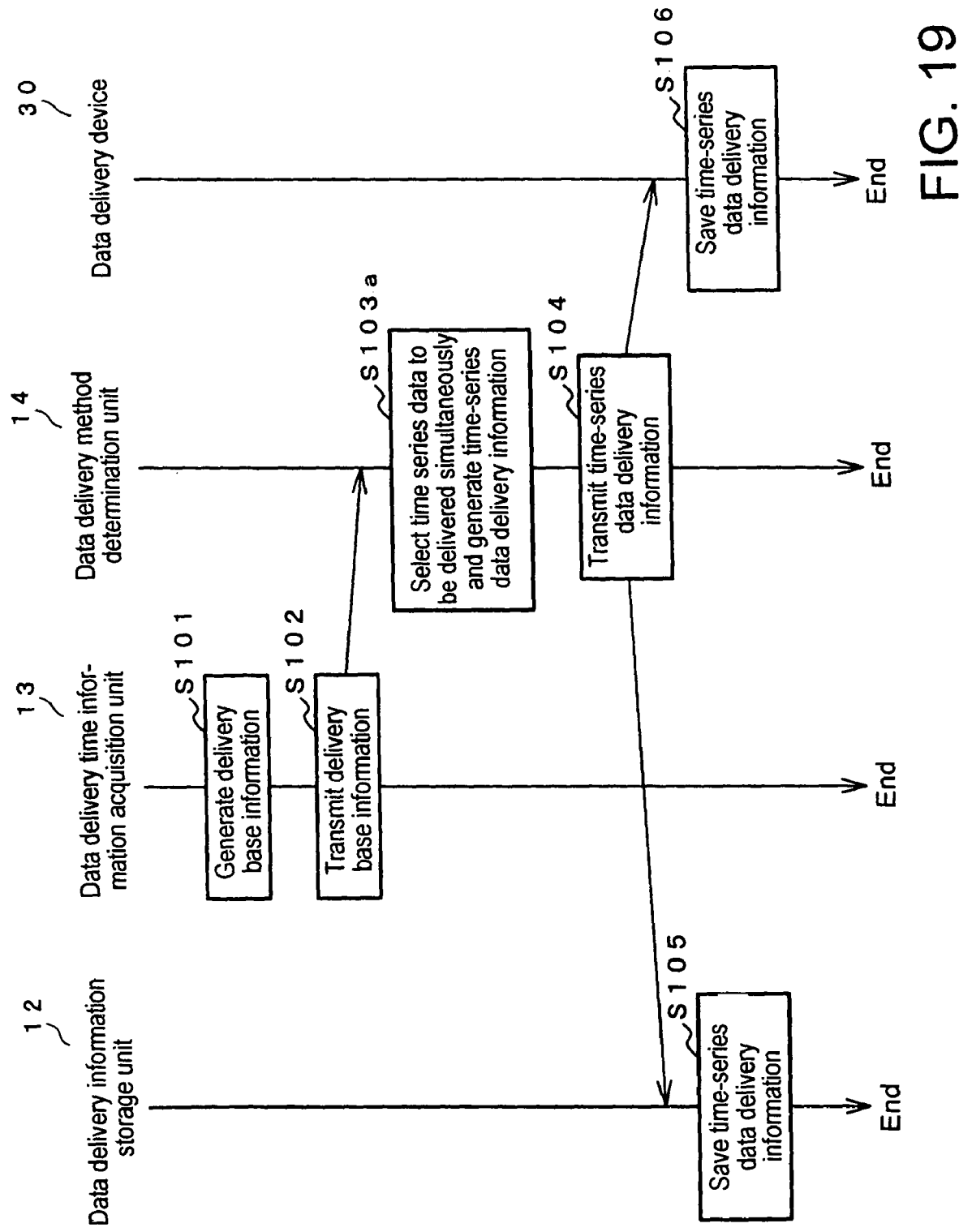
FIG. 19 is a sequence diagram showing the time-series data delivery information setting process in the first working example.
Figure 20:
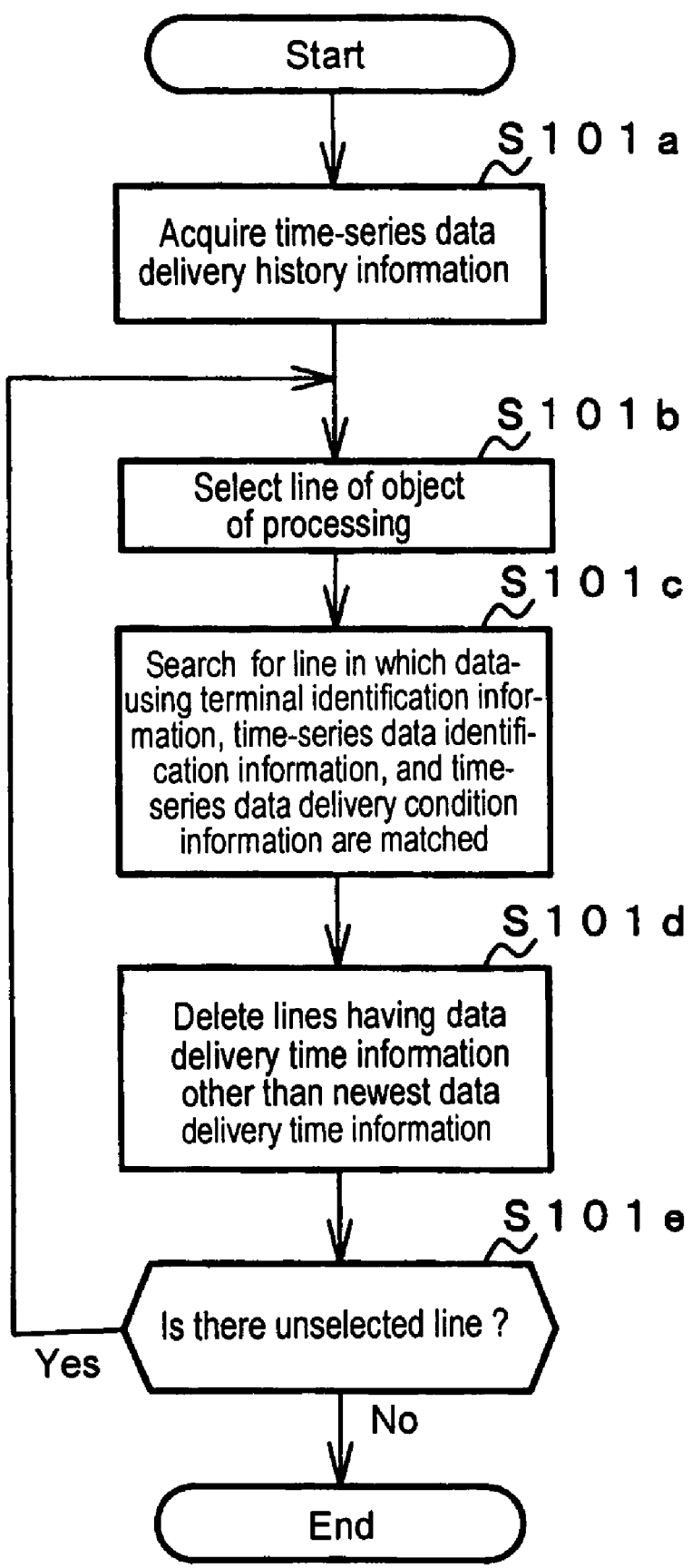
FIG. 20 is a flow chart showing an example of the data delivery method base information generation process.
Figure 22:
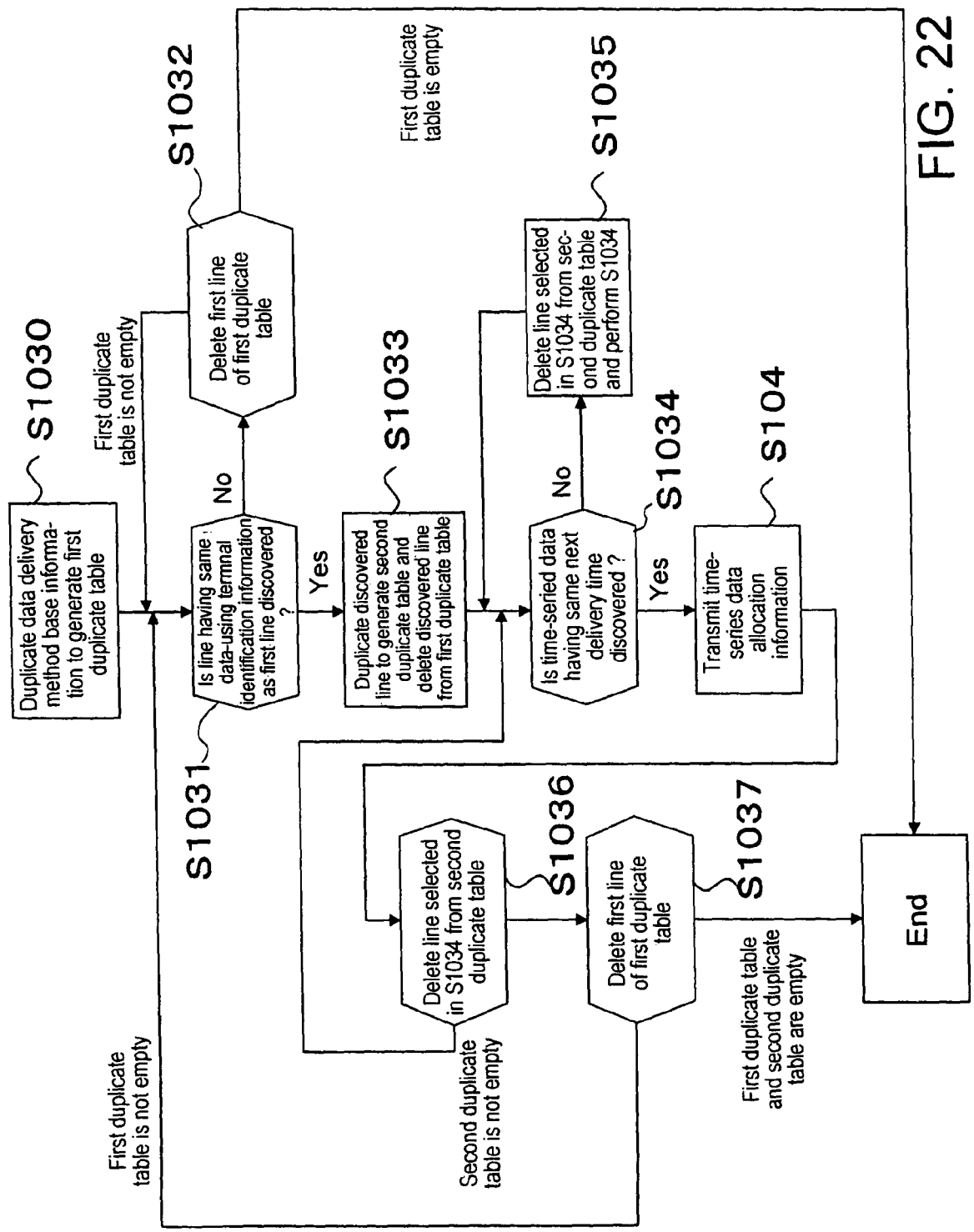
FIG. 22 is a flow chart showing an actual process of the time-series data delivery information setting process.

FIG. 19 shows the time-series data delivery information setting process in this working example, FIG. 20 shows the actual processing of the data delivery method base information generation process (Step S101) in the time-series data delivery information setting process, FIG. 21 shows the processing for generating time-series data delivery information from the data delivery base information, and FIG. 22 shows the actual processing of Step S103a in the time-series data delivery information setting process.

As shown in FIG. 19, in the data delivery method base information generation process of Step S101, data delivery time information acquisition unit 13 first acquires time-series data delivery history information from data delivery device 30 by way of Internet 50 in Step S101a, as shown in FIG. 20.

FIG. 23 shows an example of the time-series data delivery history information that shows the delivery history of time-series data that have been delivered in the past, a table of time-series data delivery history information being shown in this case in which time-series data delivery history information is registered in each line.

In the example shown in FIG. 23, the IP addresses of the data-using terminals that are the delivery destination, for example, data-using terminal 40a are used as "data delivery destination information." In addition, the data delivery request information that was consulted at the time of delivery is used as the "data-using terminal identification information," the "time-series data identification information," and the "time-series data delivery condition information." The "time-series data identification information" matches with the name information of the time-series data that was delivered. Finally, the detection information of the time-series data that was delivered is used as the "time-series data detection information."

In Step S101b, data delivery time information acquisition unit 13 next selects the line of the object of processing in the time-series data delivery history information that was acquired in Step S101a. Of the still unselected lines, lines having the lowest line number are selected in order as the object of processing. In this case, it is assumed that line number "1" is selected in the time-series data delivery history information shown in FIG. 23.

Upon selecting the line that is to be the object of processing, data delivery time information acquisition unit 13 in Step S101c searches for a line in which the "data-using terminal identification information," "time-series data identification information," and "time-series data delivery condition information" all match with the line selected in Step S101b. In other words, a search is performed for other lines in which the portions relevant to the data delivery request information match with line upon which attention is directed as the object of processing. In this case, at least line number "7" is retrieved (see FIG. 23) as another line in which the relevant portions match the data delivery request information in line number "1." In addition, although not shown in FIG. 23, the same search is performed for the ninth and succeeding lines.

When a plurality of lines are discovered in which the portions relevant to the data delivery request information match, in Step S101d data delivery time information acquisition unit 13 preserves, of the plurality of discovered lines, the line in which the time indicated by the data delivery time information is closest to the current time and deletes the other lines from the time-series data delivery history information. In this case, the line in which the time indicated by the data delivery time information is closest to the current time remains and the other lines, for example, lines such as the seventh line, are deleted from the time-series data delivery history information that was acquired in Step S101a. In this case, the time indicated by the data delivery time information that is closest to the current time is "14:05:17.20 of 2004/1/14" contained in the first line of FIG. 23.

By means of the processing of the above-described Steps S101b to S101d, processing is executed by which, of the plurality of rows indicating delivery history that contain processing object lines in which the portions relevant to the data delivery request information match, only those lines indicating the most recent delivery history are left, and the other lines indicating older delivery history are deleted. In other words, a process is executed that leaves only the most recent delivery history of the delivery history that is based on the same data delivery request information.

In Step S101e, data delivery time information acquisition unit 13 next determines whether unselected lines remain in each line in the time-series data delivery history information that was acquired in Step S101a. If a still unselected line exists, the process returns to Step S101b. When the first line was taken as the processing object line, the second line is selected as the processing object line in Step S101b. If there are no unselected lines in Step S101e, data delivery time information acquisition unit 13 terminates the data delivery method base information generation process.

Data delivery method base information is generated by repeatedly deleting lines from the time-series data delivery history information in Step S101d as described in the foregoing explanation.

FIG. 24 shows an example of data delivery method base information that has been generated from the time-series data delivery history information shown in FIG. 23. As shown in FIG. 24, the data delivery method base information is information obtained by deleting the seventh line of the time-series data delivery history information shown in FIG. 23. In this case, after there are no unselected lines in Step S101e, data delivery time information acquisition unit 13 switches the lines such that time-series data delivery history information that includes identical data delivery destination information is arranged before and after, and FIG. 24 shows data delivery method base information after carrying out this switching.

In the time-series data delivery information setting process, data delivery method determination unit 14 acquires data delivery base information A105 from data delivery time information acquisition unit 13 in Step S103a, determines the combination of time-series data that are to be delivered simultaneously as shown hereinbelow, and determines the delivery method of the selected time-series data.

Based on data delivery base information A105, data delivery method determination unit 14 selects lines in which the data-using terminal identification information is the same and for which, based on the time-series data delivery condition information and data delivery time information, the next delivery time can be expected to be the same time. More specifically, as shown in FIG. 22, data delivery method determination unit 14 first duplicates the table of data delivery base information A105 in Step S1030 and stores this information in a storage device in data allocation destination control device 10. In the following explanation, the data delivery base information that was duplicated in Step S1030 is referred to as the "first duplicate table."

Data delivery method determination unit 14 next selects the first line in the first duplicate table in Step S1031 and searches for lines in which the data-using terminal identification information is the same as the selected line. When not even one relevant line is discovered as a result of the search of Step S1031, data delivery method determination unit 14 deletes the line that was selected in Step S1031 from the first duplicate table in Step S1032. If the first duplicate table is not empty as a result of the deletion, the operation of Step S1031 is carried out, but if the table is empty, the operation is terminated.

When one or more relevant lines are discovered in Step S1031, data delivery method determination unit 14 duplicates the discovered lines in Step S1033 and stores the duplicate as a table in a storage device in data allocation destination control device 10. This stored table is referred to as the "second duplicate table." After storing the second duplicate table, data delivery method determination unit 14 deletes the lines that were the basis for the second duplicate table from the first duplicate table.

As described hereinbelow, data delivery method determination unit 14 searches within the second duplicate table for combinations of time-series data for which, based on the data delivery condition information, the next delivery time can be expected to be the same time.

Data delivery method determination unit 14 first selects the line having the lowest line number in the second duplicate table. In Step S1034, data delivery method determination unit 14 next searches for lines that correspond to time-series data for which the next delivery time is expected to be the same time as time-series data that correspond to the selected line.

The next delivery time is found according to the data delivery condition information as described hereinbelow.

As an example, for lines in which the data delivery condition information in the second duplicate table is "N-minute intervals," the next delivery time is estimated as the time obtained by adding N minutes to the data delivery time information that is contained in these lines, where N is any natural number.

For lines in which the data delivery condition information is "change of value" in the second duplicate table, the next delivery time is estimated by selecting lines in the time-series data delivery history information having the same time-series data identification information, the same data delivery destination information, and the same data delivery condition information as lines in which the data delivery condition information in the second duplicate table is "change of value" and then finding the average value of the period of the change in time-series data value. For example, if the average value of the period of change of the time-series data value is assumed to be seven minutes, the next delivery time is estimated as the time obtained by adding seven minutes to the data delivery time information of the time-series data that corresponds to lines for which the data delivery condition information is "change of value" in the second duplicate table.

For lines in which the data delivery condition information is "'conference room 1' or 'conference room'" in the second duplicate table, the next delivery time is estimated by selecting lines having the same time-series data identification information, the same data delivery destination information, and the same data delivery condition information as lines for which the data delivery condition information is "'conference room 1' or 'conference room'" in the second duplicate table, and then finding the average value of the time interval between times of delivery of time-series data for which the time-series data value is "conference room 1" or "conference room 2." For example, if the average value is assumed to be ten minutes, the next delivery time is estimated as the time obtained by adding seven minutes to the data delivery time information of time-series data that correspond to lines for which the data delivery condition information is "'conference room 1' or 'conference room'" in the second duplicate table.

In the example shown in FIG. 21, the line for which the line number is 3 is selected, this line containing the data-using terminal identification information "192.168.1.10" that is contained in the line of line number 1 and having the same next delivery time as estimated from the previous delivery time and the "5-minute interval" of the data delivery condition information.

If not even one relevant line is discovered as a result of the search of Step S1034, data delivery method determination unit 14 deletes the line selected in Step S1034 having the lowest line number from the second duplicate table in Step S1035 and then performs the operation of Step S1034.

If one or more relevant lines are discovered in Step S1034, data delivery method determination unit 14 stores the identification information of data-using terminal 40a, the identification information of the plurality of items of time-series data, and the data delivery condition information that are contained in the discovered lines in data delivery information storage unit 12 as time-series data delivery information A106. Data delivery method determination unit 14 also transmits the time-series data delivery information that was generated to data delivery device 30 in Step S104. Data delivery device 30 next stores the time-series data delivery information received in Step S104.

In the present working example, the data-using terminal identification information that is contained in the lines discovered in Step S1034 is used as time-series data delivery information.

In the example shown in FIG. 21, the identification information "192.168.1.10" of data-using terminal 40a, the identification information "Taro:location" and "Jiro:location" of the time-series data, the data delivery condition information "5-minute intervals," and the data delivery destination information "192.168.1.10" are stored in data delivery information storage unit 12 as time-series data delivery information.

Data delivery method determination unit 14 next deletes the lines that were discovered and the lines that were selected in Step S1034 from the second duplicate table in Step S1036.

If the second duplicate table becomes empty as a result of the deletion of lines in Step S1035 or Step S1036, data delivery method determination unit 14 performs the operation of Step S1031. If the second duplicate table is not empty, data delivery method determination unit 14 performs the operation of Step S1034. If, after Step S1036, the second duplicate table and first duplicate table become empty in Step S1037, data delivery method determination unit 14 terminates the operation.

As a result of executing Steps S1030 to S1037, Step S104, and Step S105, a table of time-series data delivery information is saved in data delivery information storage unit 12. The table of time-series data delivery information that was stored in Step S105 is as shown in the above-described FIG. 10.

Explanation next regards the time-series data allocation process. Explanation here regards an example of the process of allocating time-series data between data generation device 20a among data generation devices 20a to 20c and data-using terminal 40a among data-using terminals 40a to 40e.

Data generation device 20a transmits time-series data A103 that have been generated to data allocation destination control device 10 by way of Internet 50. Data generation device 20b similarly generates time-series data, in which the time-series data detection information is "conference room 2," and time-series data 20c also generates time-series data in which the time-series data detection information is "conference room 3."

Upon receiving time-series data A103, data allocator 11 provided in data allocation destination control device 10 acquires data delivery information from data delivery information storage unit 12 in Step S202 as shown in FIG. 5. Data allocator 11 next refers to the time-series data identification information of the time-series data that have been received from data generation device 20a and the data delivery information that has been acquired from data delivery information storage unit 12 and determines the data delivery device to which the time-series data are to be allocated in Step S204. In this case, only one data delivery device 30 is provided in data delivery system 100, and data delivery device 30 is therefore always determined as the data delivery device to which time-series data A103 are allocated. IP address "192.168.2.14" that is assigned to data delivery device 30 (see FIG. 13) is then reported to data allocator 11 as the delivery device identification information indicating data delivery device 30.

Data allocator 11 acquires the delivery device identification information, and in Step S205, transmits time-series data A103 to data delivery device 30 that is specified by the acquired delivery device identification information and thus allocates the time-series data to data delivery device 30. Data delivery device 30 subsequently stores received time-series data A103 in time-series data allocation unit 37 in Step S206. When data delivery device 30 receives the time-series data, if already existing time-series data are already stored in which the time-series data identification information are identical to the received time-series data, data delivery device 30 deletes the already existing time-series data and stores the received time-series data. In other words, data delivery device 30 stores the most recent time-series data for each differing item of time-series data identification information.

As described in the foregoing explanation, time-series data are stored in time-series data allocation unit 37 provided in data delivery device 30.

Explanation next regards the time-series data delivery process in the present working example using the flow charts of the above-described FIGS. 6 to 9.

As shown in Steps S207 and S208, in the time-series data delivery process, data delivery device 30 delivers time-series data that have been stored in time-series data allocation unit 37 to data-using terminal 40a by way of the Internet 50. Explanation next regards the details of the time-series data delivery process shown in Steps S207 and S208.

In the time-series data delivery process, data delivery device 30 determines whether time-series data have been newly allocated in Step S2071. If time-series data have not been newly allocated, data delivery device 30 performs in Step S2070 the operation of Step S2073 and succeeding steps described hereinbelow for each line of data delivery request information (see FIG. 17) that is registered in data delivery request information acquisition unit 31.

In other words, data delivery request information search unit 32 of data delivery device 30 selects lines that contain the same time-series data identification information as the time-series data identification information of the time-series data allocated in time-series data allocation unit 37 from among the data delivery request information (see FIG. 17) registered in data delivery request information acquisition unit 31. Next, data delivery request information search unit 32 transmits line numbers that correspond to the lines of the selected data delivery request information to data delivery information processor 33 in order from smaller line numbers.

Upon receiving the line numbers of the data delivery request information, data delivery information processor 33 searches the time-series data delivery information for time-series data identification information in the data delivery request information of the received line numbers (see Step S2073), following which data delivery device 30 carries out the operation of Step S2073 and succeeding steps described hereinbelow.

In Step S2070, when the process reaches the line for which the line number has the maximum value, data delivery request information search unit 32 repeats, from line number 1, the process of selecting lines containing the time-series data identification information of the above-described time-series data and the process of transmitting line numbers to data delivery information processor 33.

If time-series data are newly allocated in Step S2071, data delivery device 30 proceeds to Step S2072 described hereinbelow.

In other words, if time-series data are allocated from data allocation destination control device 10 in the above-described Step S206, data delivery device 30 interrupts the process of Step S2070 and proceeds to the process shown in FIGS. 8 and 9.

As shown in FIG. 8, when time-series data are allocated, data delivery request information search unit 32 in Step S2072 searches the data delivery request information for the time-series data identification information "Taro:location" (see FIG. 18) in the time-series data that have been allocated from data allocation destination control device 10 in Step S206, and transmits the line numbers of lines that are discovered as a result of the search to data delivery information search unit 331. If data delivery request information has not been stored in data delivery request information acquisition unit 31 or if lines are not discovered that contain the same time-series data identification information as the time-series data that were received in the data delivery request information, in Step S2072, data delivery device 30 resumes the operation of the above-described Step S2070.

Data delivery information search unit 331 next acquires time-series data delivery information from data allocation information acquisition unit 332 in Step S2073, and then searches time-series data delivery information for the time-series data identification information that is contained in the data delivery request information of lines that correspond to the line numbers that were transmitted by data delivery request information search unit 32 in Step S2070 or in Step S2072.

If relevant lines are not discovered as a result of the search of Step S2073, or if time-series data delivery information is not saved in data allocation information acquisition unit 332, data delivery information search unit 331 reports the line numbers of lines that could not be discovered in the data delivery request information to data delivery request information search unit 32 in Step S2074A. Data delivery request information search unit 32 next reports the line numbers received in Step S2074A to data delivery condition information rating unit 34 in Step S2075A.

In the present example, when relevant lines could not be discovered as a result of the search in Step S2073, or when time-series data delivery information was not saved in data allocation information acquisition unit 332, data delivery device 30 performs the data delivery operation without using the time-series data delivery information. Explanation next regards the data delivery operation in which time-series data delivery information is not used.

Upon receiving the line numbers that were transmitted in Step S2075A, data delivery condition information rating unit 34 acquires time-series data delivery condition information that is contained in the lines of data delivery request information that correspond to the received line numbers from data delivery request information acquisition unit 31. Data delivery condition information rating unit 34 next determines, in Step S2076A, whether the delivery conditions indicated by the acquired time-series data delivery condition information have been met or not, and transmits to data distributor 35 the line numbers of data delivery request information that contains time-series data identification information for which it has been determined that the data delivery condition information has been met.

Explanation here regards the operation by which data delivery condition information rating unit 34 determines whether delivery conditions have been met or not for a case in which the time-series data delivery condition information acquired from data delivery request information acquisition unit 31 is "5-minute intervals."

Data delivery condition information rating unit 34 first selects from time-series data delivery history information (see FIG. 23) lines in which the time indicated by data delivery time information is the most recent among lines that contain data delivery request information that corresponds to the line numbers acquired from data delivery request information search unit 32. When five minutes has elapsed on the clock in data delivery device 30 from the time indicated by the data delivery time information in the line selected from the time-series data delivery history information, data delivery condition information rating unit 34 determines that the delivery conditions shown by the time-series data delivery condition information "five-minute intervals" have been satisfied.

When the time-series data delivery condition information is "change of value," data delivery condition information rating unit 34 determines that the delivery conditions indicated by time-series data delivery condition information have been met if the time-series data detection information in lines that were selected from the time-series data delivery history information differs from the time-series data detection information of, among the time-series data that were allocated to time-series data allocation unit 37, those time-series data that contain time-series data identification information in lines selected from time-series data delivery history information.

When the data delivery condition information is "'conference room 1' or 'conference room 2'" data delivery condition information rating unit 34 determines that the delivery conditions indicated by the time-series data delivery condition information have been satisfied if "conference room 1" or "conference room 2" is the time-series data detection information of, among the time-series data that have been allocated to time-series data allocation unit 37, those time-series data that contain time-series data identification information in lines that were selected from the time-series data delivery history information.

It is assumed that the line numbers of data delivery request information that include the time-series data identification information "Taro: location," i.e., line number 1 in FIG. 17, are retrieved in the above-described Step S2072, and that in Step S2076A the delivery conditions indicated by the time-series data delivery condition information "5-minute intervals" contained in the line of the retrieved line number have been satisfied.

In this case, data distributor 35 transmits the time-series data for which the time-series data identification information is "Taro:location" to the IP address "192.168.1.10," which is the data-using terminal identification information contained in the line of the retrieved line number, i.e., line number 1 in FIG. 17.

FIGS. 25 and 26 show an actual example of the time-series data delivery process. It is here assumed that the time-series data delivery information shown in FIG. 10 is used, and that the lines of line number 1 and line number 2 have been discovered in the time-series data delivery information as the result of the search in Step S2073.

The delivery candidate time-series data in line number 1 of the time-series data delivery information (see FIG. 10) that is discovered by the search process in Step S2073 are time-series data that contain the time-series data identification information "Taro:location" and time-series data that contain the time-series data identification information "Jiro:location."

When the delivery candidate time-series data are obtained from the first line of the table of time-series data delivery information (see FIG. 10), the object of verification in Step S2074B is the time-series data that contain the time-series data identification information "Taro:location" and the time-series data that contain the time-series data identification information "Jiro:location." For example, when it is determined in Step S2076B that the data delivery condition information has been satisfied for time-series data that contain "Taro:location" and time-series data that contain "Jiro:location," these time-series data being the time-series data that are the objects of delivery, data distributor 35 transmits to the data-using terminal for which the data-using terminal identification information indicates the IP address "192.168.1.10" time-series data in which the time-series data identification information is "Taro:location" and time-series data in which the time-series data identification information is "Jiro:location."

Of the data delivery operations described hereinabove, data delivery operations that do not use time-series data delivery information realized by constituent elements other than data delivery information processor 33 can be realized by the methods already described and can also be realized by using the data delivery mode SIMPLE (SIP for Instant Messaging and Presence Leveraging Extensions) as stipulated by SIP (Session Initiation Protocol).

Detailed information regarding SIMPLE has been placed on the Internet at the address: http://www.ietf.org/html.charters/simple-charter.html In this example, time-series data that include the time-series data identification information "Taro:location" and time-series data that include the time-series data identification information "Jiro:location" are transmitted by a single process to data-using terminal 40*a* to which IP address "192.168.1.10" has been assigned.

Figure 27:
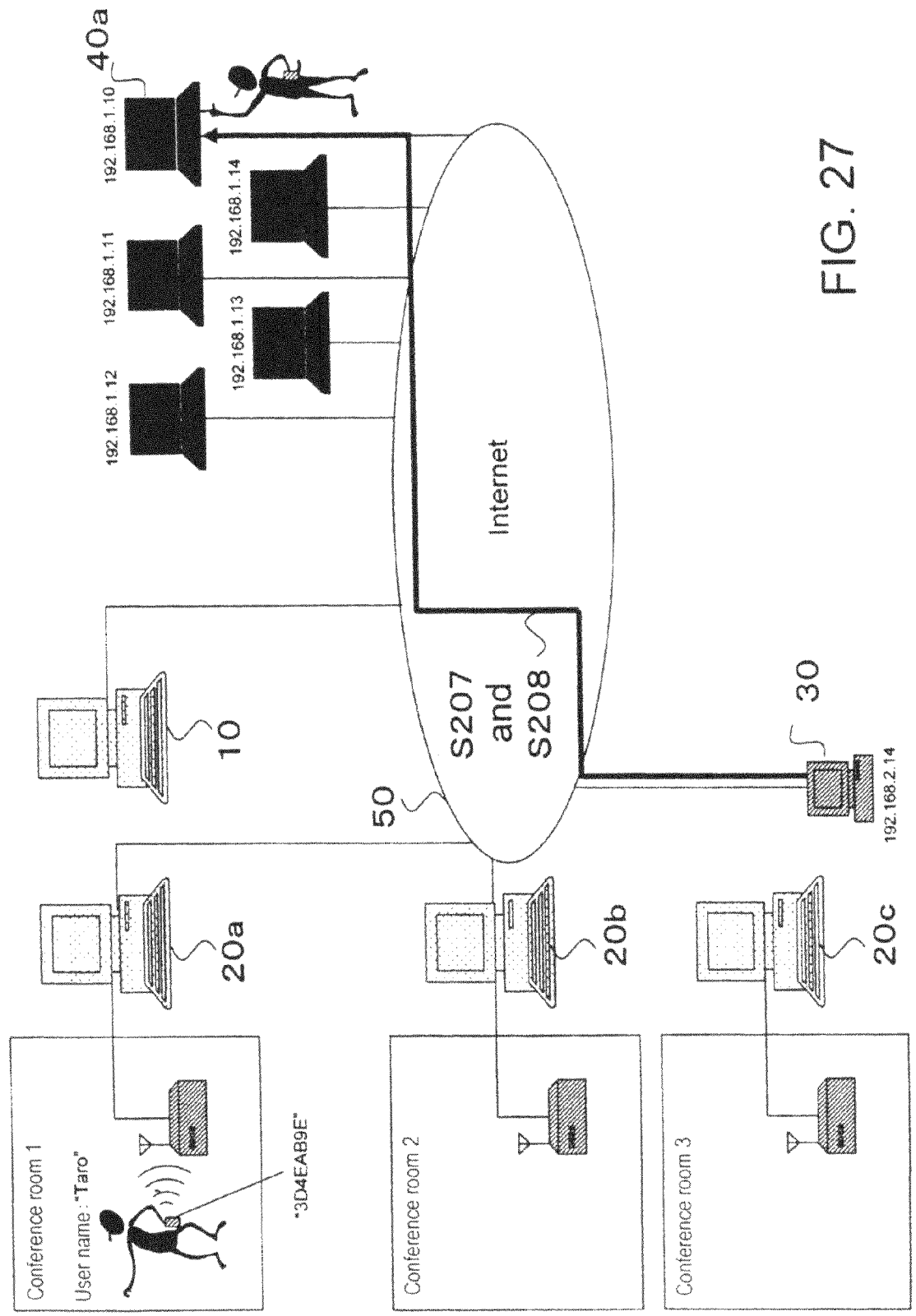
FIG. 27 is a view for explaining the delivery of time-series data.

FIG. 27 is a view for explaining the delivery of time-series data by adding the flow of data in the above-described Steps S207 and S208 to FIG. 13.

As shown in FIG. 27, in the present working example, time-series data are delivered to data-using terminal 40*a* in a single process, whereby the number of delivery processes in data delivery device 30 can be reduced compared to a case of separate delivering of the time-series data.

As described hereinabove, in the present working example, based on the delivery history information, time-series data delivery information (for example, see FIG. 10) is generated in which a plurality of items of time-series data that allow simultaneous delivery to prescribed destinations are packaged together, and the time-series data delivery information is used to carry out the process of delivering the time-series data to enable the delivery of a plurality of items of time-series data in one operation. As a result, increase in processing load that accompanies increase in the number of items of data that are the object of delivery can be mitigated, and the number of delivery processes can be reduced, whereby the process delivering time-series data can be facilitated.

In addition, although communication network 50 was made up by the Internet in the above-described example, communication network 50 may also be formed by a communication cable that employs an interface such as USB (Universal Serial Bus) or IEEE 1394.

Second Working Example

Explanation next regards the second working example of the present invention. This working example is another actual example of the time-series data delivery information setting process (see FIG. 4) in the first embodiment.

The second working example differs from the first working example described above in that: in the operations of selecting one or more items of time-series data that are to be delivered simultaneously and then determining the method for delivering the time-series data that have been selected (see Step S103), only one item of time-series data is selected and multicast to a plurality of data-using terminals 40*a* to 40*n* is used as the delivery method; in the operation of setting the delivery of time-series data (see Step S104), communication network 50 is set for multicast delivery; and in the operation for delivering time-series data to data-using terminals 40*a* to 40*n* (see Steps S207 and S208), multicast is used. In the following explanation, "multicast" means the simultaneous transmission in a single transmission process of the same data to a plurality of nodes that have been determined in advance in communication network 50.

Figure 28:
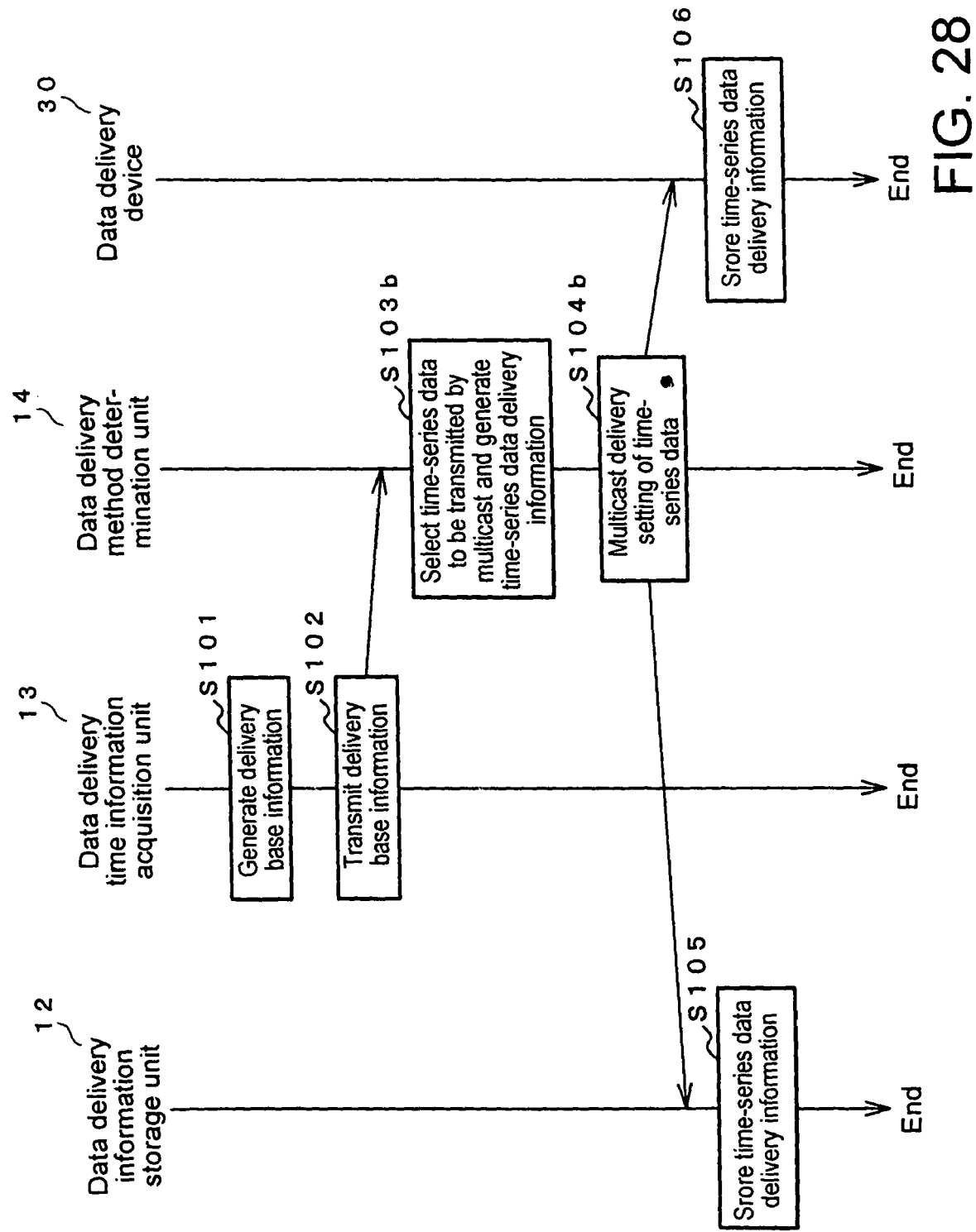
FIG. 28 is a sequence diagram showing the time-series data delivery information setting process in a second working example.
Figure 29:
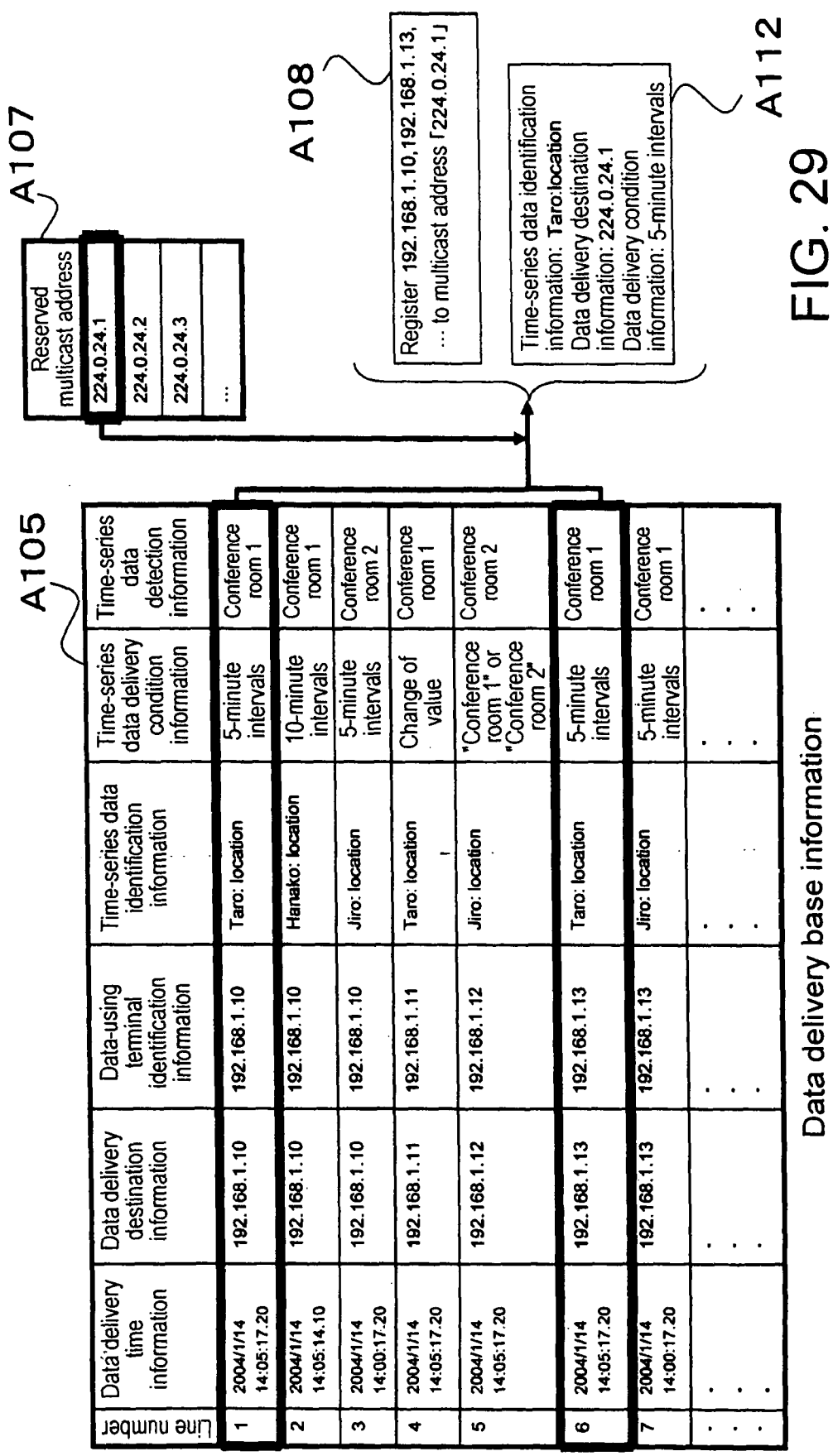
FIG. 29 is a view for explaining the process for generating time-series data delivery information from data delivery base information.

FIG. 28 shows the time-series data delivery information setting process in the present working example. FIG. 29 shows the process for generating time-series data delivery information from data delivery base information (see FIG. 24).

First, data delivery method determination unit 14 acquires data delivery base information A105 that was transmitted in Step S102. In Step S103*b*, data delivery method determination unit 14 next selects from data delivery method base information A105 lines for which the time-series data identification information is identical and for which the next delivery time can be predicted to be the same based on the data delivery condition information and the data delivery time information.

In the example shown in FIG. 29, data delivery method determination unit 14 selects the lines having line number 1 and line number 6 in which the time-series data identification information is "Taro:location" for both and for which the next delivery time is predicted to be the same based on the previous delivery time and the data delivery condition information "5-minute intervals."

Data delivery method determination unit 14 next sets communication network 50 in Step S104*b* such that the time-series data that were selected in Step S103*b* are delivered to a plurality of data-using terminals in a single multicast. Explanation here regards a case in which multicast is realized by IP multicast. "IP multicast" is a technique for placing in correspondence specific addresses with a plurality of partners, duplicating packets directed to these specific addresses by each router within the network, and delivering the packets to the corresponding communication partners. The specific addresses are here referred to as "multicast addresses."

The delivery setting operation when using IP multicast is carried out as follows. Multicast addresses that are to be used are prepared beforehand as shown by multicast address definition information A107 shown in FIG. 29, and one multicast address is selected from this group. Information is next generated that is necessary for registering in the selected multicast address group the identification information of the data-using terminals, which are the delivery destinations of the time-series data that were selected in Step S103*b*.

In the example shown in FIG. 29, information is generated for registering "192.168.1.10" and "192.168.1.13" in the multicast address group "224.0.24.1," i.e., multicast setting information A108.

In the present working example, registration to the multicast address group is carried out as follows. First, data-using terminals 40*a* to 40*e* are registered in the multicast address group for setting updates. Data delivery method determination unit 14 transmits multicast setting information A108 to the multicast address for setting updates.

The multicast setting unit (not shown) in data-using terminal 40*a* receives multicast setting information A108, and when an IP address assigned to data-using terminal 40*a* is contained in multicast setting information A108 that has been received, carries out a registration process to the multicast address group that is noted in received multicast setting information A108.

A protocol such as IGMP (Internet Group Management Protocol) can be used in this registration process. The details of IGMP are noted in, for example, RFC3376 that can be obtained from the FTP server on the Internet: ftp://ftp.rfc-editor.org/in-notes/rfc3376.txt.

Alternatively, in Step S104b, the multicast address that is set in multicast setting information A108 and the multicast address, which is the delivery destination, and the identification information of the plurality of items of time-series data selected in Step S103b may be stored as one set in data delivery information storage unit 12.

Time-series data delivery information A112 shown in FIG. 29 shows an example of the information that is stored in data delivery information storage unit 12 in Step S105.

The operation of selecting lines in which the time-series data identification information are identical and for which the next delivery time is predicted to be the same based on the data delivery condition information and data delivery time information; the operation of setting communication network 50 such that the selected time-series data are delivered by one multicast to a plurality of data-using terminals, for example, data-using terminals 40a to 40n; and the operation for storing the plurality of selected items of time-series data and the multicast addresses, which are the delivery destinations, as one set in data delivery information storage unit 12 are carried out for all lines of data delivery time information and data delivery request information A105 shown in FIG. 29.

Explanation next regards the operation for delivering time-series data in the present working example.

In the above-described Steps S207 and S208, data delivery device 400 that has been assigned the IP address "192.168.2.14" and network 600, which is the Internet, deliver the time-series data identified by "Taro:location" to the multicast address "224.0.24.1".

Figure 30:
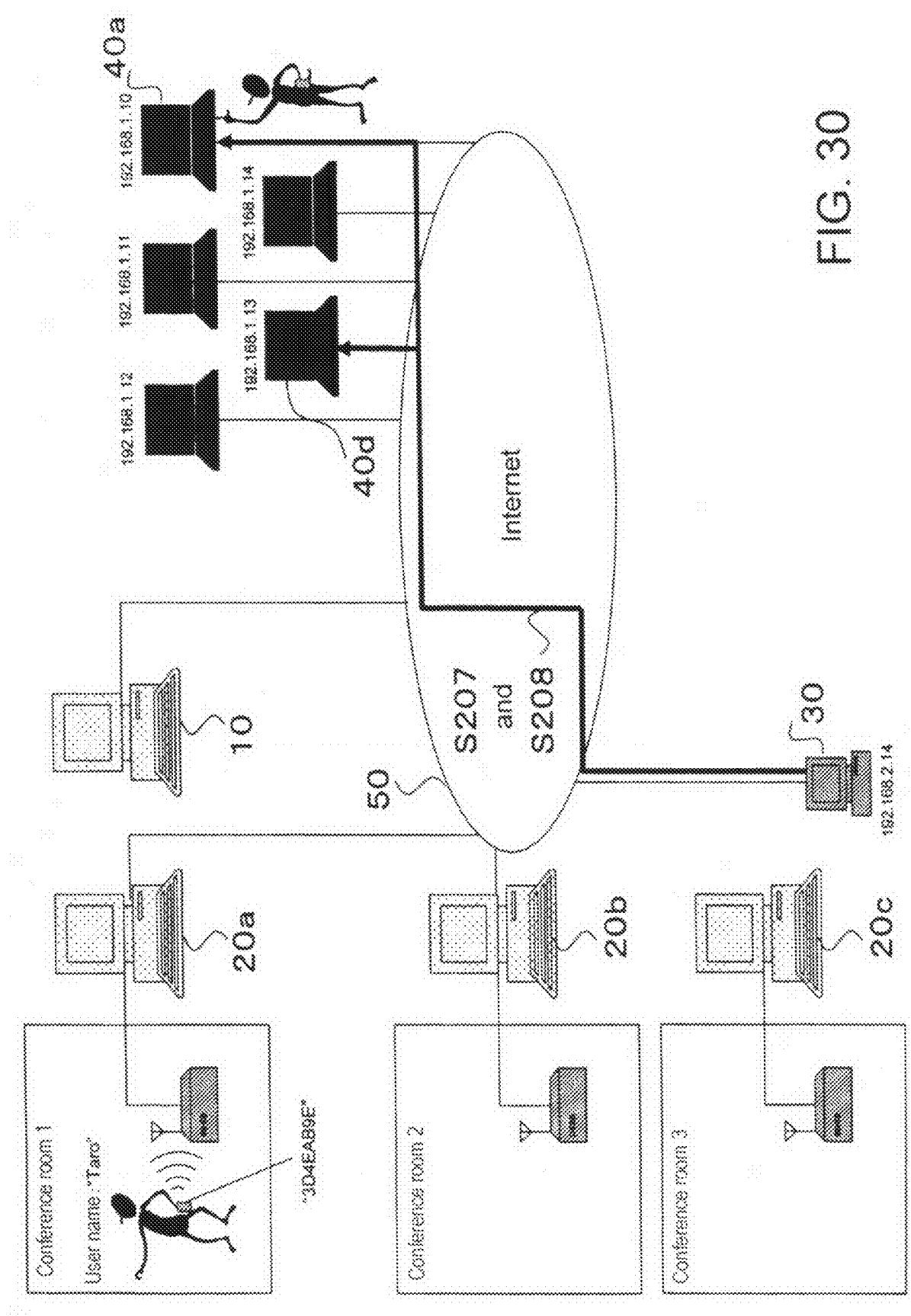
FIG. 30 is a view for explaining the delivery of time-series data.

FIG. 30 shows the delivery of the time-series data by adding Steps S207 and S208 to FIG. 13. As shown in FIG. 30, the time-series data identified by "Taro:location" can be delivered by a single multicast to data-using terminal 40a that has been assigned the IP address "192.168.1.10" and data-using terminal 40d that has been assigned the IP address "192.168.1.13". As a result, the present working example enables a reduction of the number of delivery processes in data delivery device 30 compared to a case of delivering time-series data to each data-using terminal.

As described in the foregoing explanation, based on the delivery history information, generating time-series data delivery information in which a plurality of destinations to which the simultaneous delivery of prescribed time-series data is allowed is packaged and carrying out a process in which the time-series data delivery information is used to deliver the time-series data enables a single delivery of prescribed time-series data to a plurality of destinations. The time-series data delivery information in this case is, for example, time-series data delivery information in which one item of time-series data identification information is set in each line in FIG. 10 and a plurality of items of data-using terminal identification information are set. Accordingly, the present working example can ease the increase in processing load that accompanies increase in the number of delivery destinations and can reduce the number of delivery processes, and can therefore facilitate the process of delivering time-series data.

In the present working example, explanation regarded a case in which IP multicast was used as the method of realizing multicast, but multicast may also be realized by other multicast method such as XCAST (see the Internet site: http://www.xcast.jp/).

In addition, the operations of steps other than Steps S103b, S104b, S207, and S208 in the present working example are equivalent to the above-described first working example, and detailed explanation regarding these operations is therefore here omitted.

Third Working Example

Explanation next regards the third working example of the present invention. This working example presents yet another actual example of the process of setting time-series data delivery information (see FIG. 4) in the first embodiment.

The third working example differs from the above-described first working example in that: in the operations of selecting one or more items of time-series data that are to be delivered simultaneously and determining the method of delivering the selected time-series data (see Step S103), a plurality of items of time-series data is selected and multicast is used as the delivery method to a plurality of data-using terminals such as data-using terminals 40a to 40n; in the operation of setting the delivery of time-series data (see Step S104), communication network 50 is set for multicast delivery; and in the operation of delivering time-series data to data-using terminals 40a to 40n (see Steps S207 and S208), multicast is used.

Figure 31:
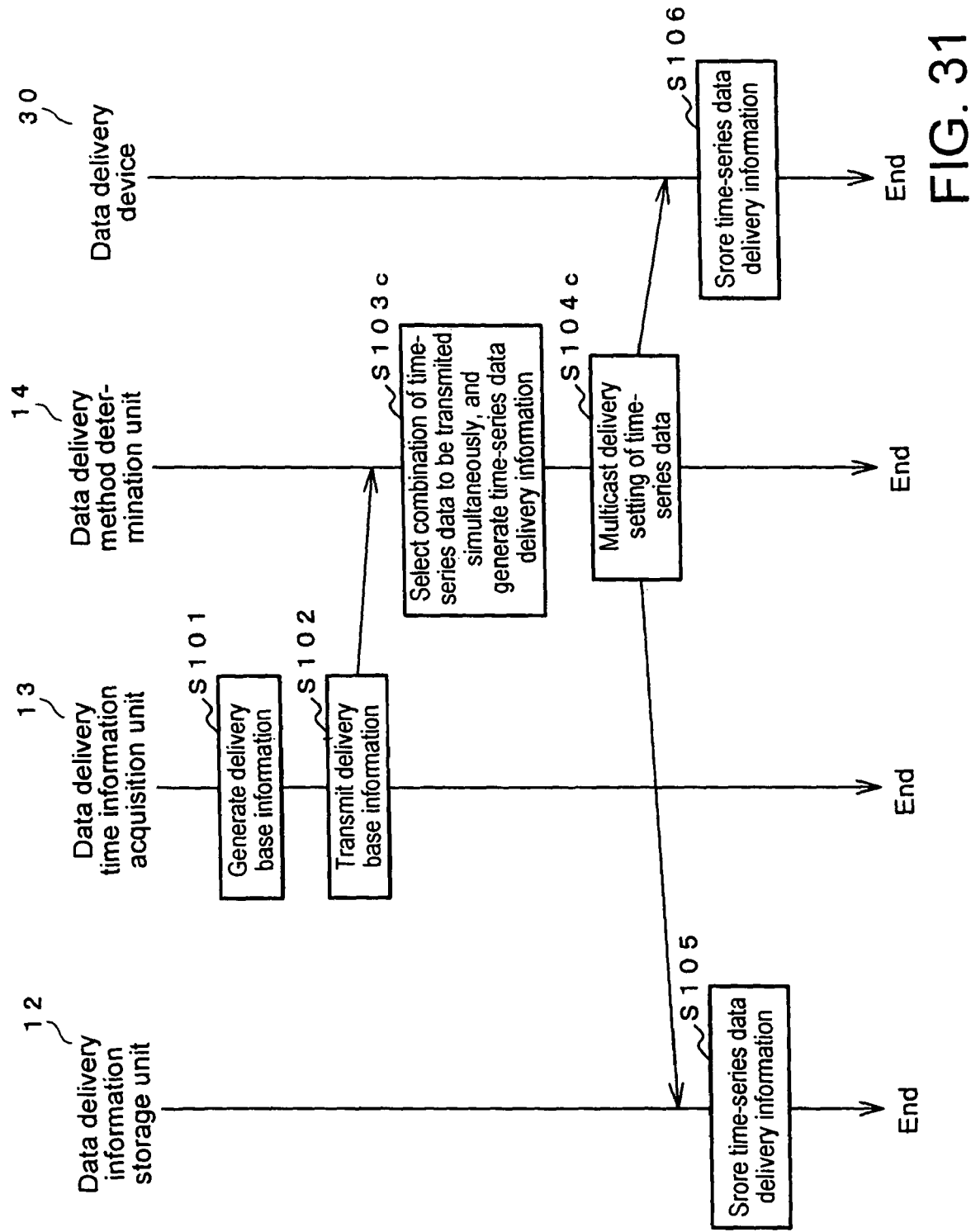
FIG. 31 is a sequence diagram showing the time-series data delivery information setting process in a third working example.
Figure 32:
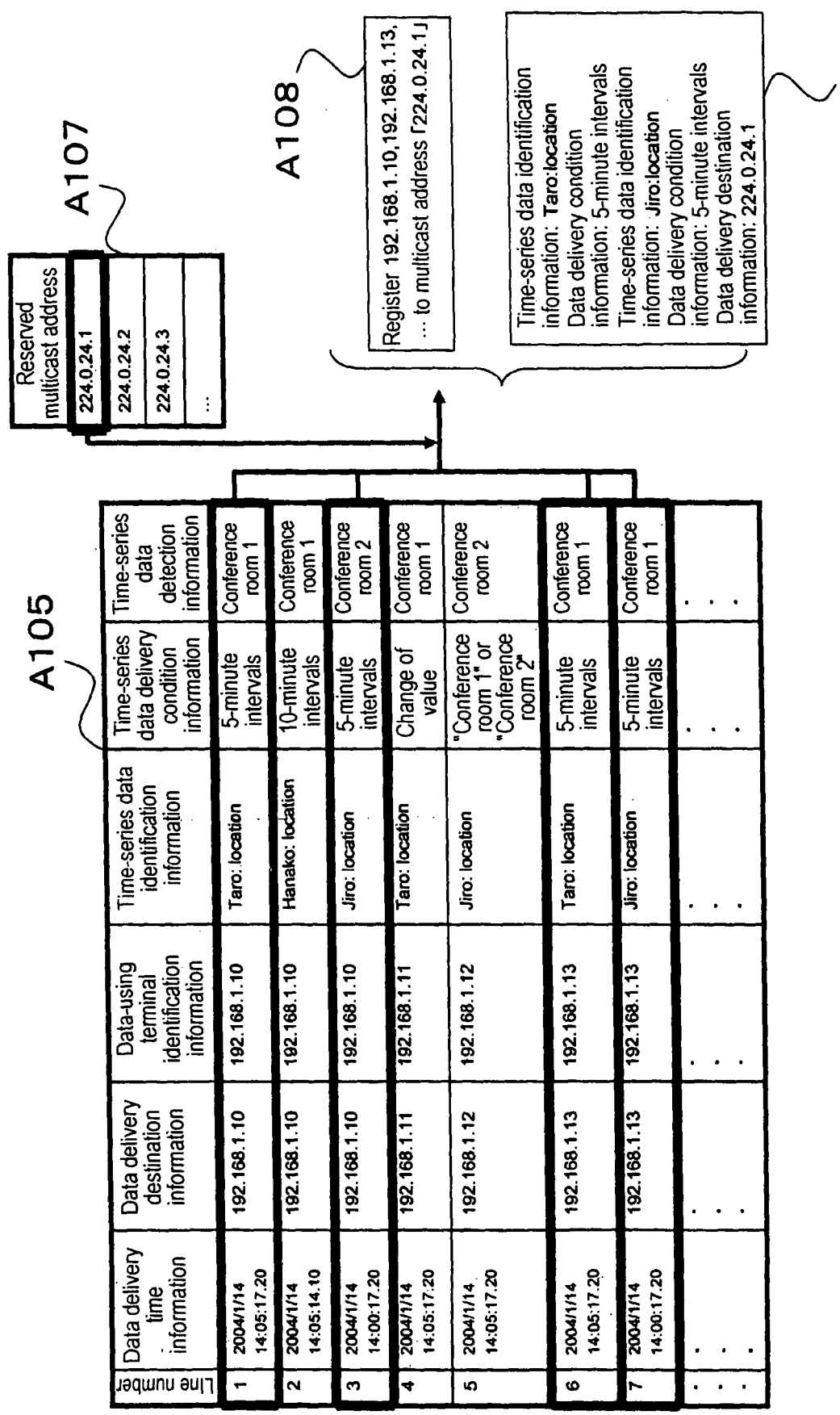
FIG. 32 is a view for explaining the process of generating time-series data delivery information from data delivery base information.

FIG. 31 shows the time-series data delivery information setting process in the present working example. FIG. 32 shows the process for generating time-series data delivery information based on the data delivery base information (see FIG. 24).

First, data delivery method determination unit 14 acquires data delivery base information A105 that has been transmitted in Step S102. In Step S103c, data delivery method determination unit 14 next selects lines for which the next delivery time is predicted to be the same based on the data delivery condition information and data delivery time information in data delivery base information A105. In the example shown in FIG. 32, the lines of line numbers 1, 3, 6, and 7 are selected.

In Step S104c, data delivery method determination unit 14 next sets communication network 50 such that the combination of the plurality of items of time-series data selected in Step S103c is delivered by a single multicast to a plurality of data-using terminals such as data-using terminals 40a to 40n.

Explanation next regards the operation of setting the multicast in the third working example. The multicast addresses that are to be used are first prepared as in multicast address definition information A107 shown in FIG. 32, and one of these is selected. Information is next generated that is necessary for registering in the group of selected multicast addresses the identification information of data-using terminal 500 that is stored in the lines selected in Step S103c. In the example shown in FIG. 32, information required for registering "192.168.1.10" and "192.168.1.13" into the multicast address group "224.0.24.1" is generated as multicast setting information A108.

The process of registering to the multicast address group is carried out as follows. Data delivery method determination unit 14 transmits multicast setting information A108 to the multicast addresses for setting update with data-using terminals 40a to 40n registered to the multicast address group for setting update. The multicast setting unit (not shown) in data-using terminal 40a receives multicast setting information A108, and when the IP address assigned to data-using terminal 40a is contained in multicast setting information A108 that has been received, carries out the process of registering to the multicast address group that is listed in received multicast setting information A108. A protocol such as IGMP can be used in this registration process.

When the multicast setting operation is carried out in this way, the multicast addresses that have been set in multicast setting information A108, the plurality of items of time-series data that are stored in the lines selected in Step S103c, and the multicast addresses that are the delivery destinations are taken as one set, and this set is stored as time-series data delivery information A113 in data delivery information storage unit 12.

In the example shown in FIG. 32, the plurality of items of time-series data "Taro:location" and "Jiro:location" and the multicast address "224.0.24.1" are stored as a single set.

As described above, all lines for the data delivery time information and data delivery condition information in data delivery base information A105 are subjected to: the operation of selecting lines for which the next delivery time is predicted to be the same based on the data delivery condition information and the data delivery time information, the operation of setting communication network 50 such that the selected time-series data are delivered by a single multicast to a plurality of data-using terminals 40a to 40e, and the operation for storing the selected plurality of items of time-series data and multicast addresses, which are the delivery destinations, as one set in data delivery information storage unit 12.

Explanation next-regards the details of the time-series data delivery operation in the present working example.

In the above-described Steps S207 and S208, data delivery device 400 that has been assigned the IP address "192.168.2.14" and network 600, which is the Internet, deliver the time-series data identified by "Taro:location" and "Jiro:location" to the multicast address "224.0.24.1".

Figure 33:
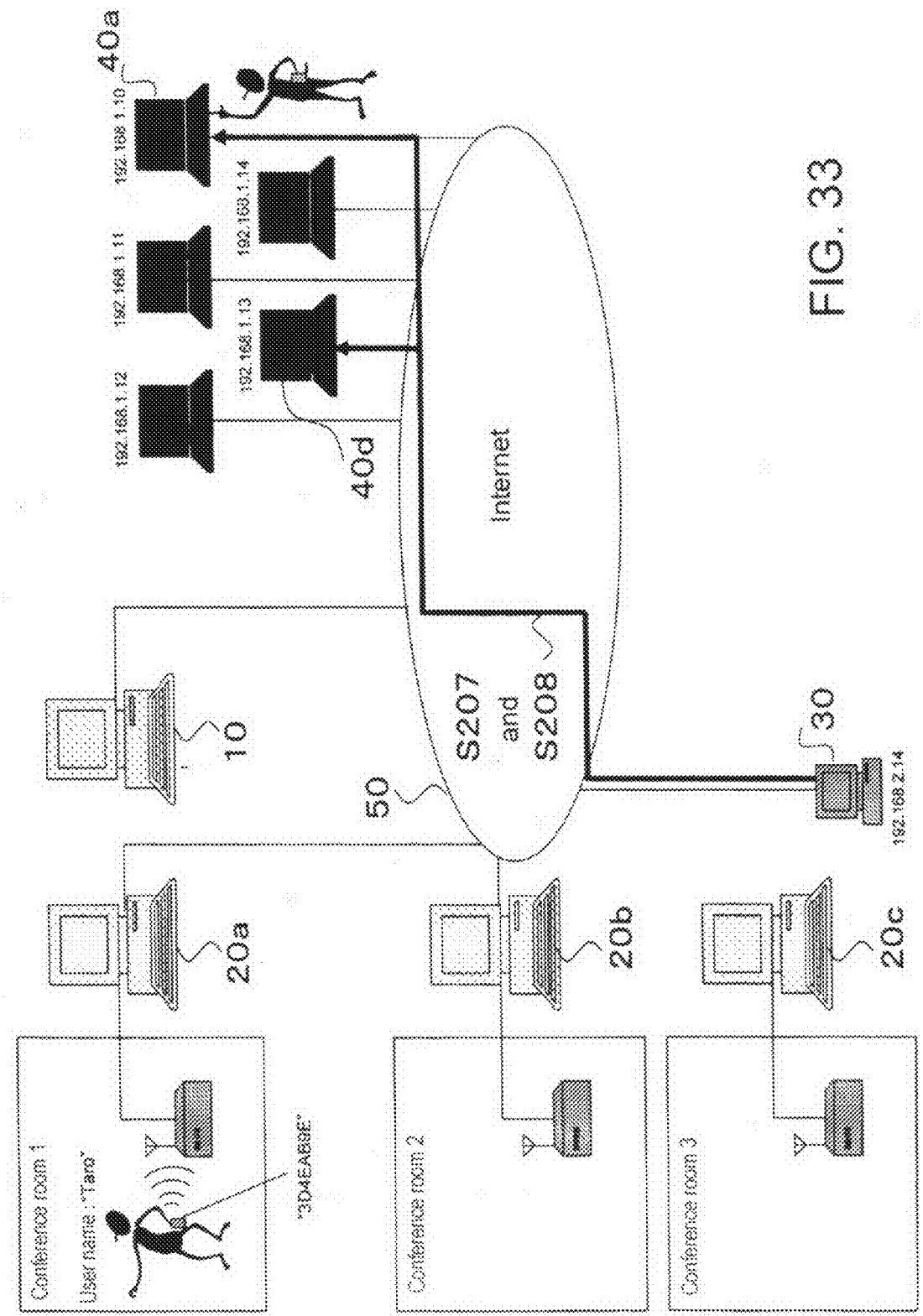
FIG. 33 is a view for explaining the delivery of time-series data.

FIG. 33 shows the delivery of time-series data by adding Steps S207 and S208 to FIG. 13. As shown in FIG. 33, the time-series data identified by "Taro:location" and "Jiro:location" can be delivered by a single multicast to data-using Terminal 40a that is assigned the IP address "192.168.1.10" and to data-using terminal 40d that is assigned the IP address "192.168.1.13". As a result, the present working example enables a reduction of the number of delivery processes in data delivery device 30 compared to a case of delivering time-series data one-by-one to each of data-using terminals 40a to 40n.

In this working example, operations other than Steps S103c, S104c, S207, and S208 are equivalent to the previously described first working example, and detailed explanation is therefore here omitted.

Thus, in the third working example, a plurality of items of time-series data can be delivered all at once to a plurality of destinations by, based on delivery history information, generating time-series data delivery information in which a plurality of items of time-series data for which simultaneous delivery to prescribed destinations is permitted and a plurality of destinations to which simultaneous delivery of prescribed time-series data is permitted are packaged together, and then using the time-series data delivery information to carry out processes for delivering the time-series data. As a result, the present working example can mitigate increase in the processing load that accompanies increase in the number of items of data that are the object of delivery and increase in the number of delivery destinations, can reduce the number of delivery processes, and thus can facilitate the process of delivering time-series data.

In the present working example, time-series data delivery information may be generated by, based on delivery history information, generating first provisional time-series data delivery information in which a plurality of items of time-series data for which simultaneous delivery to prescribed destinations is permitted are packaged together and second provisional time-series data delivery information in which a plurality of destinations to which the simultaneous delivery of prescribed time-series data is permitted are packaged together, and then deleting the overlapping portion of the first provisional time-series data delivery information and the second provisional time-series data delivery information to generate the time-series data delivery information. The first provisional time-series data delivery information is information similar to the time-series data identification information shown in, for example, FIG. 10. One example that can be offered as the second provisional time-series data delivery information is time-series data delivery information in which one item of time-series data identification information is set and a plurality of items of data-using terminal identification information are set in each line of the information shown in FIG. 10.

Fourth Working Example

Explanation next regards the fourth working example of the present invention. This working example presents an actual example of the operation in the second embodiment.

Figure 34:
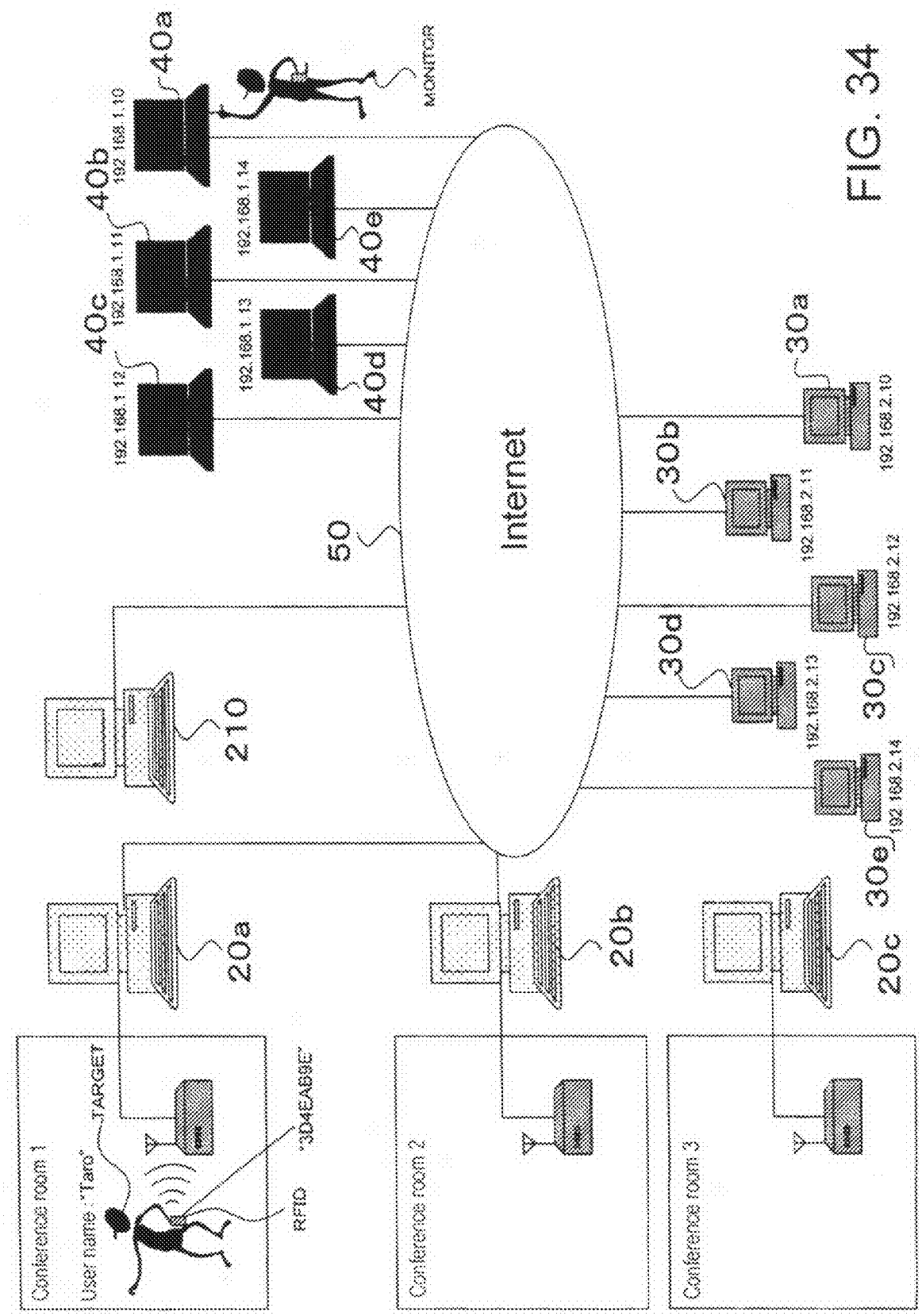
FIG. 34 is a schematic view showing the overall composition of the data delivery system in a fourth working example.

FIG. 34 shows the overall configuration of data delivery system 200 in the fourth working example. As shown in the figure, this working example differs from the first working example in that data delivery system 200 is provided with a plurality of data delivery devices 30a to 30e, and further, data allocation destination control device 210 is provided with data delivery device load information acquisition unit 16.

In addition, the operation of the present working example differs from the first working example in that, in Step S204 of the time-series data allocation process, the single data delivery device to which the time-series data are allocated is determined from a plurality of data delivery devices 30a to 30e as described hereinbelow.

At the time of the operation of allocating time-series data of Step 204, data allocator 11 in this working example refers to time-series data delivery information that is recorded in data delivery information storage unit 12. Data delivery device load information acquisition unit 16 executes processes for acquiring and storing the load information of each of data delivery devices 30a to 30n, i.e., the data delivery device load information, based on, for example, the number of storage operations in a fixed time interval or the number of delivery processes in a fixed time interval from each of data delivery devices 30a to 30n.

The time-series data delivery information in this working example is managed as data in a table format in which a plurality of items of data-using terminal identification information for identifying data-using terminals 40a to 40e that are the delivery destinations of time-series data, time-series data identification information for identifying the type of time-series data that are to be delivered, and time-series data delivery condition information that indicates the delivery conditions for delivering time-series data are described for each line (see FIG. 10).

Figure 35:
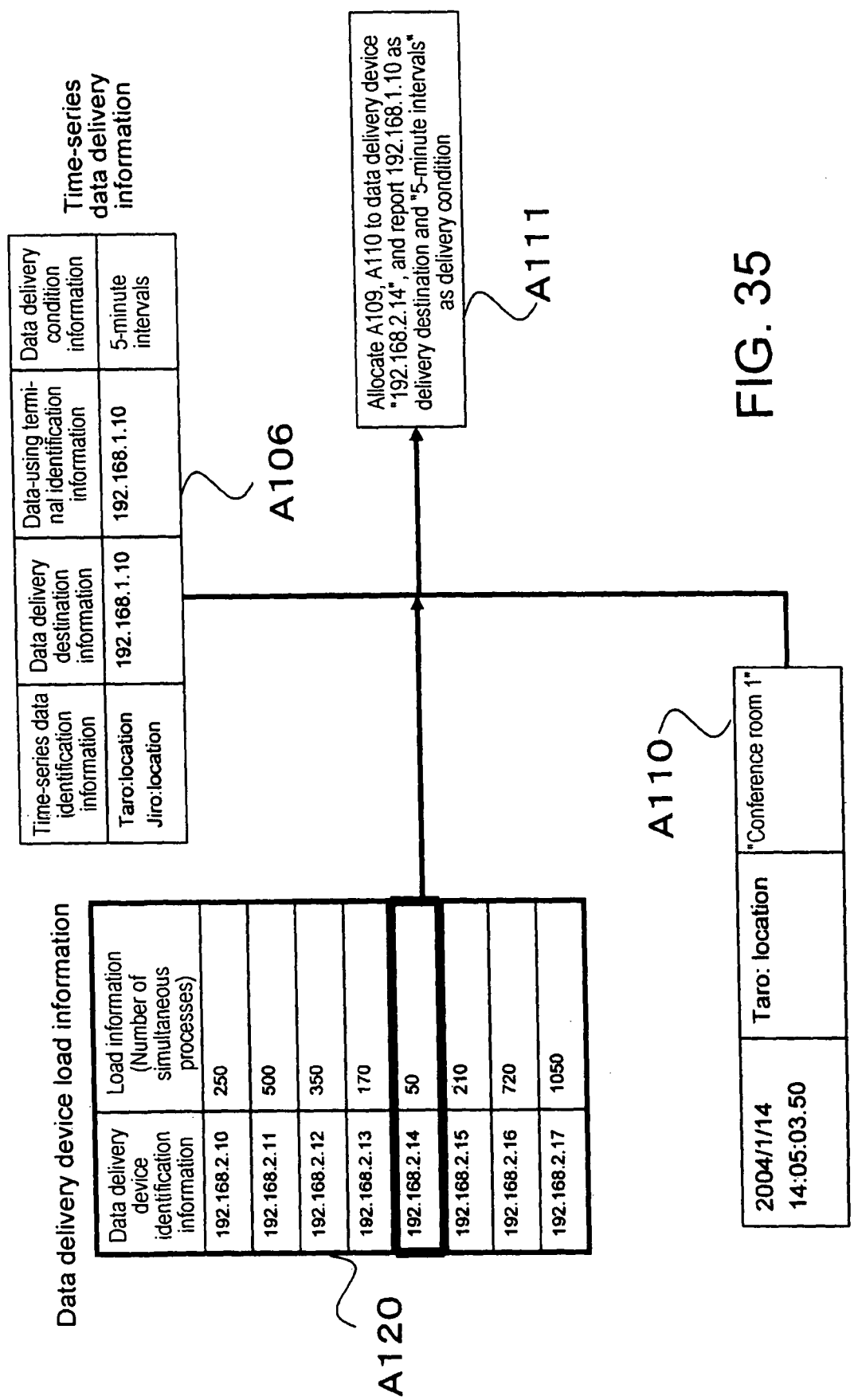
FIG. 35 is a view showing the operation of Step S204a in the fourth working example.

Data delivery information storage unit 12 next acquires the load information of data delivery devices 30a to 30e that is recorded in data delivery device load information acquisition unit 16. The data delivery device load information is managed as data in table format in which the IP addresses that identify the data delivery devices and the number of delivery processes that are being carried out simultaneously in each data delivery device are recorded in each line. Data delivery device load information A120 of FIG. 35 shows an example of this type of data delivery device load information. The data delivery device load information is acquired by data delivery device load information acquisition unit 16 at regular periods of, for example, five-minute intervals from data delivery devices 30a to 30e through the use of a protocol such as SNMP.

Based on the acquired time-series data delivery information (see FIG. 10) and number of simultaneous delivery processes for each data delivery device, which is the load information of the data delivery devices, data allocator 11 determines the data delivery device that is the delivery destination of time-series data that correspond to time-series data identification information acquired in Step S202 as shown below. The "number of simultaneous delivery processes" means the number of executions of delivery processes for time-series data in a fixed time interval.

Explanation first regards a case in which the delivery process of time-series data has not been carried out even once. In this case, data allocator 11 consults the number of simultaneous delivery processes for each data delivery device, i.e., the load information of data delivery devices 30a to 30e in Step S204a (see FIG. 12) and determines the data delivery device having the lowest number of delivery processes.

FIG. 35 shows the operation of Step S204a in the present working example. In data delivery device load information A120 in FIG. 35, data delivery device 30e that is assigned IP address "192.168.2.14" is determined as the data delivery device having the lowest number of delivery processes. FIG. 35 shows the load information for eight data delivery devices 30a to 30h.

Data allocator 11 also records the data allocation history information in data delivery information storage unit 12. In the present working example, the data allocation history information is managed as data in a table format composed of lines in which the identification information of the allocated time-series data and the identification information of the allocated data delivery device are placed in correspondence, as shown in FIG. 36.

Figure 44:
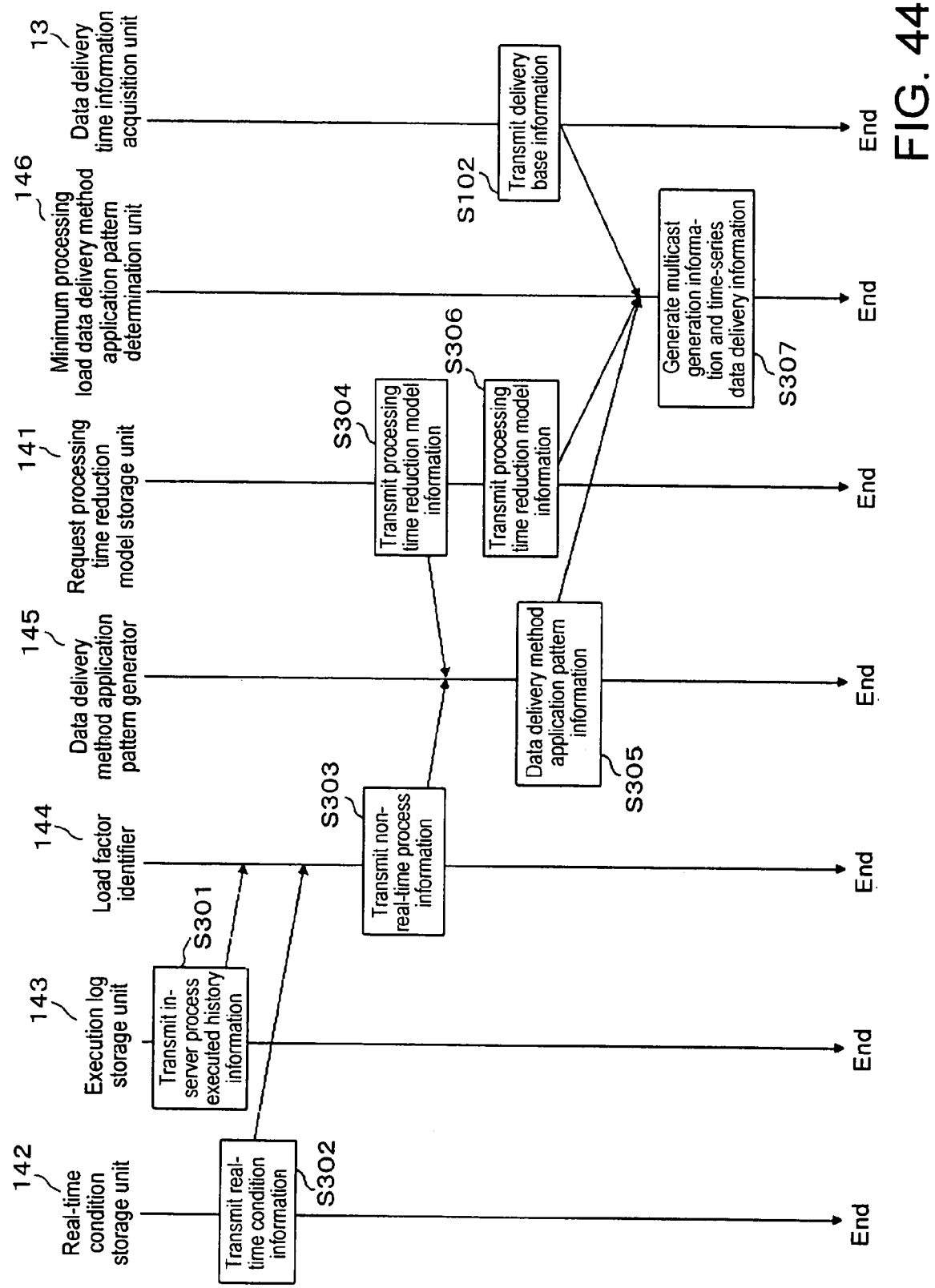
FIG. 44 is a sequence diagram showing the time-series data delivery information setting process in the fifth working example.

In the example shown in FIG. 35, when the time at which time-series data A110 are allocated to data delivery device 30e is 14:05:15.20 on Jan. 14, 2004, the first line of the table shown in FIG. 44 is added by data allocator 11.

Explanation next regards a case in which the delivery process of time-series data has already been carried out one or more times. In this case, one or more sets of the identification information of time-series data that have been allocated in the past and the identification information of the data delivery device that was allocated have been recorded as in the table shown in FIG. 36.

Figure 37:
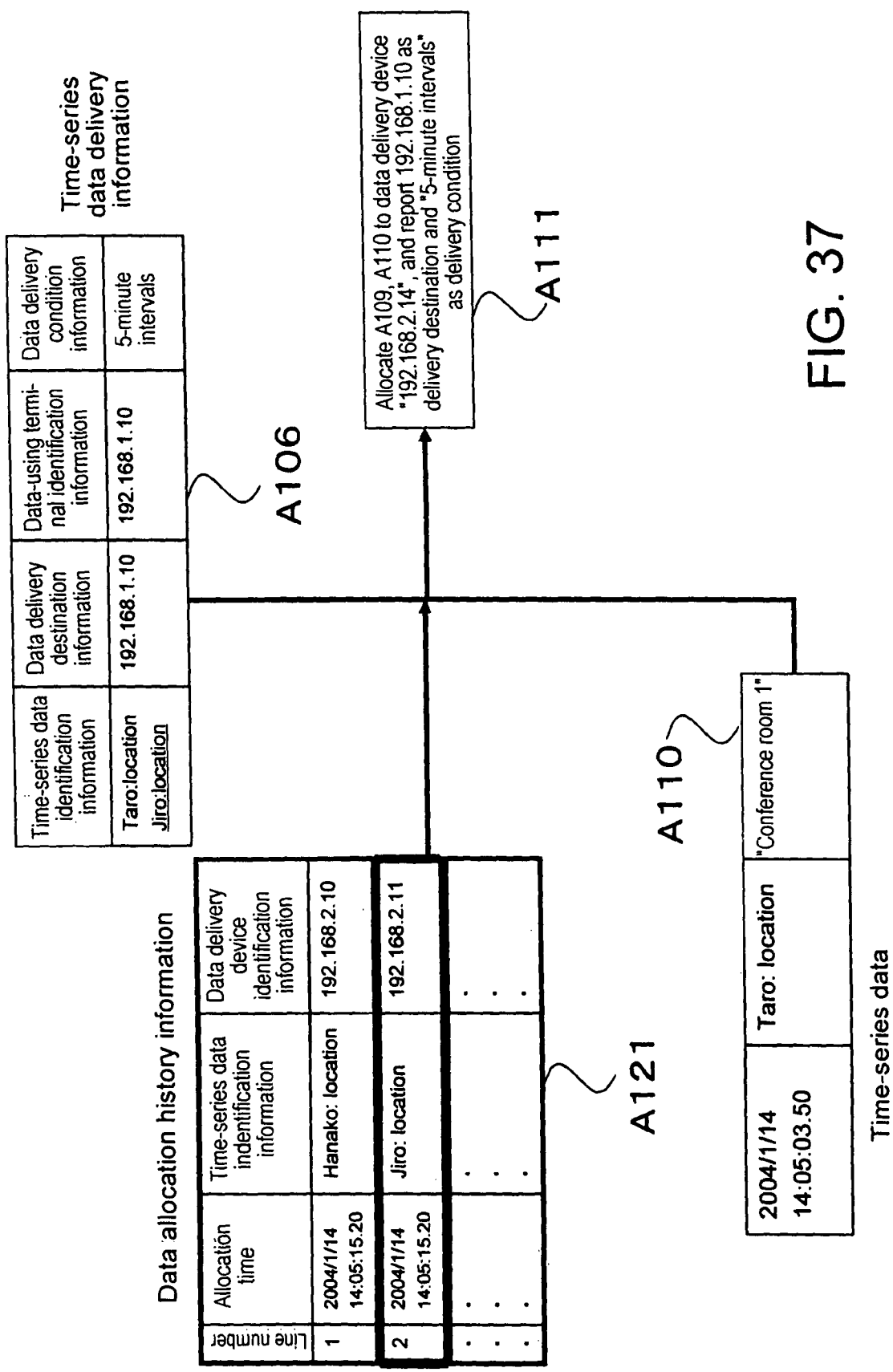
FIG. 37 is a view showing the operation of Steps S2041 to S2043 in the fourth working example.

FIG. 37 shows the process of Steps S2041 to S2043 (see FIG. 12) in the present working example.

First, in Step S2041, data allocator 11 refers to the combination for realizing a delivery method that can reduce the number of time-series data delivery processes in data delivery devices that is recorded in the time-series data delivery information and searches for the combination that includes the time-series data identification information that was extracted in Step S202. In the example shown in FIG. 37, data allocator 11 acquires line A106 in the time-series data delivery information in Step S2041.

Next, in Step S2042, data allocator 11 acquires other items of time-series data identification information in the combination that was discovered as a result of the search. In the example shown in FIG. 37, data allocator 11 acquires the time-series data identification information "Jiro:location" from line A106 in time-series data delivery information in Step S2042.

Data allocator 11 next searches for a set that contains other items of time-series data identification information from the data allocation history information in Step S2043. In the example shown in FIG. 37, the second line of A121 is retrieved as the line that contains the time-series data identification information "Jiro:location" from data allocation history information in Step S2043. When a plurality of relevant lines are discovered in Step S2043, the line in which the time that is closest to the time in data allocation destination control device 210 is recorded as the allocated time.

Data allocator 11 next acquires from the set that was discovered in Step S2043 the identification information of the data delivery device that was allocated in Step S204b. In the example shown in FIG. 37, data allocator 11 acquires the identification information of data delivery device 30b identified by the IP address "192.168.2.11" that is recorded in the second line of A121 that was discovered in Step S2043.

When the object of search is not discovered in Steps S2041 and S2043, data allocator 11 acquires the identification information of the data delivery device having the lowest load from the load information of data delivery devices in Step S204a as in the case shown in FIG. 35.

The constituent elements and operations in the fourth working example are otherwise equivalent to the first working example, and description of these points is therefore here omitted.

This fourth working example may also assume a configuration that is combined with any of the above-described first to third working examples. In other words, a configuration that is provided with a plurality of data delivery devices as in the fourth working example may also be adopted in the first to third working examples, and the data delivery device that carries out data delivery may be selected based on load information.

Fifth Working Example

Explanation next regards the fifth working example of the present invention. This working example shows an actual example of the time-series data delivery information setting process (see FIG. 4) and the like in the first embodiment.

The processes from the reception of time-series data from data generation device 20a by data delivery device 30 until the delivery to data-using terminal 40a by data delivery device 30 are expressed hereinbelow as "server process." The present working example is a case in which the present invention is applied in a system in which a maximum value for the time interval permitted for server process is determined for each item of time-series data.

A system in which the maximum value permitted for the time interval of processing is generally referred to as a real-time system. In a real-time system, the process in which the maximum value of the permitted processing time interval is determined is hereinbelow represented as the "real-time process," and the maximum value of the processing time interval determined for each real-time process is represented as the "maximum processing time interval." The expression "a certain process satisfies real-time properties" means that this process has been executed in a time interval equal to or less than the maximum processing time interval.

Real-time processing necessitates execution in a time interval equal to or less than the maximum processing time interval. For example, when the maximum processing time interval of a particular item of time-series data is 0.5 seconds, the real-time property is satisfied both when the server process is executed in 0.4 seconds and when the server process is executed in 0.3 seconds. On the other hand, when the maximum processing time interval of a particular item of time-series data is 0.5 seconds and the server process requires 0.6 seconds to complete execution, the real-time property has not been achieved.

Figure 38:
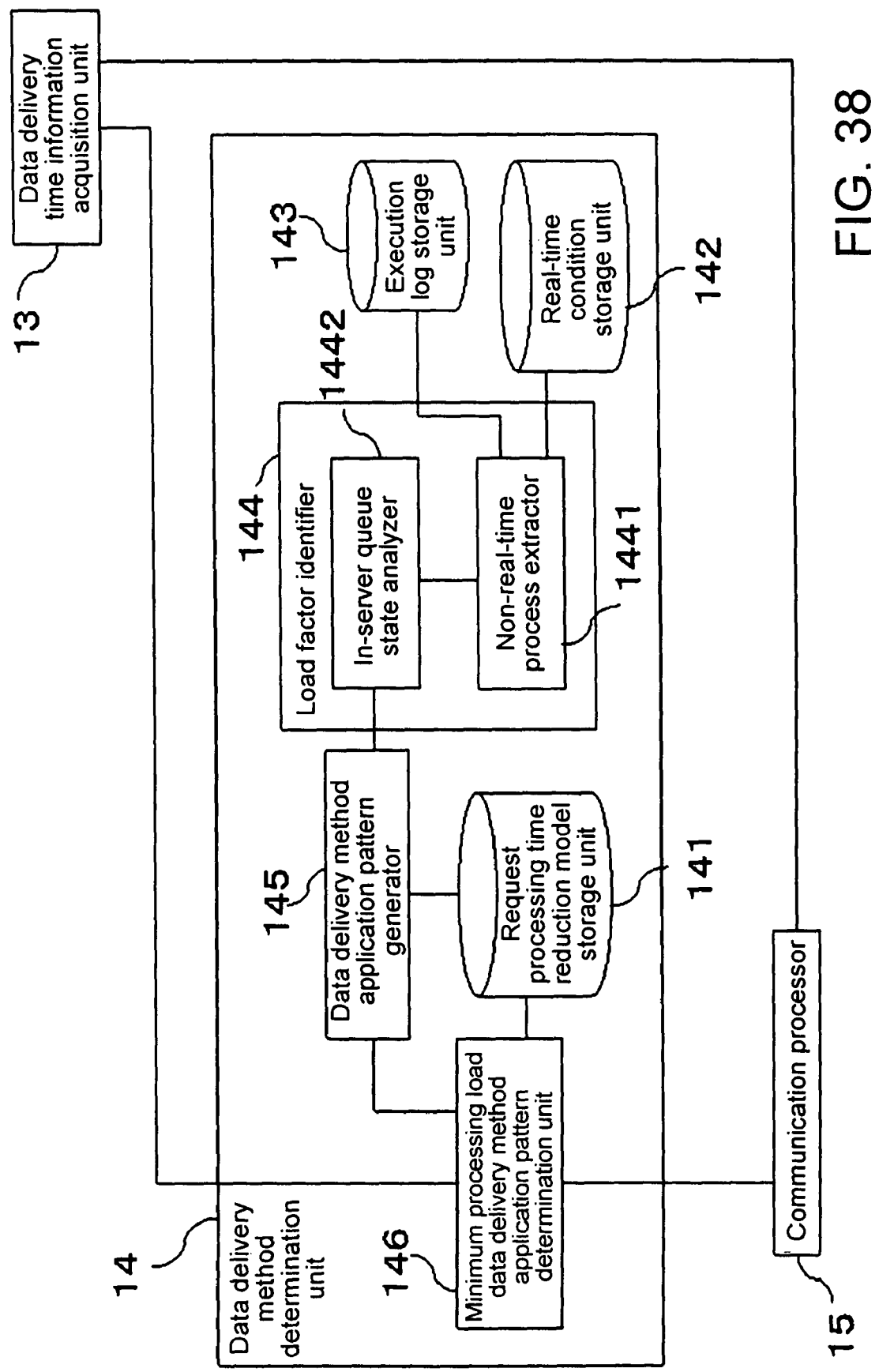
FIG. 38 is a block diagram showing an example of the configuration of the data delivery method determination unit in a fifth working example.

FIG. 38 shows the details of data delivery method determination unit 14 in the present working example. Data delivery method determination unit 14 in this working example is composed of: request processing time reduction model storage unit 141, real-time condition storage unit 142, execution log storage unit 143, load factor identifier 144, data delivery method application pattern generator 145, and minimum processing load data delivery method application pattern determination unit 146.

Request processing time reduction model storage unit 141 stores processing time reduction model information that contains information for calculating the processing time that can be reduced by a load reduction method. The processing time reduction model information contains processing load reduction method names for specifying the methods for reducing the processing load; the reducible in-server process number proportion, which is a numerical formula expressing the proportion of the number of in-server processes that can be reduced by the processing load reduction method identified by the name of the processing load reduction method; and the processing load reduction method processing load model which is a numerical formula expressing the processing load of the processing load reduction method that is identified by the processing load reduction method name. One example that can be offered of the processing load reduction method name is "multicast." FIG. 39 shows an example of processing time reduction model information.

Execution log storage unit 143 stores in-server executed process history information that contains the time information of processes executed in data delivery device 30. The in-server executed process history information includes in-server executed process history information that is composed of a set of the start time information and end time information of processes that have been executed in the past in data delivery device 30, and the in-server process names, which are the types of processes. FIG. 40 shows an example of the in-server executed process history information.

Real-time condition storage unit 142 stores real-time condition information that includes the maximum processing time of processes that are executed in data delivery device 30. Real-time condition information includes: in-server process names representing the type of processes executed by data delivery device 30, and maximum processing times that are permitted for each process identified by the in-server process names. FIG. 41 shows an example of the real-time condition information.

Load factor identifier 144 generates non-real-time process information (see FIG. 42 to be described hereinbelow) that includes information for identifying, of processes that have been executed in data delivery device 30, processes that exceeded the maximum processing time recorded in the real-time condition information.

Non-real-time process extractor 1441 in load factor identifier 144 generates, based on real-time condition information that has been stored in real-time condition storage unit 143 and in-server executed process history information that has been recorded in execution log storage unit 142: non-real-time process names that represent in-server processes that have not achieved the real-time property; the maximum processing time that processes identified by the non-real-time process names must not exceed to achieve the real-time property; and the start time information and end time information on data delivery devices of processes identified by non-real-time process names.

In-server queue state analyzer 1442 in load factor identifier 144 generates a simultaneous process group, which is a list of in-server process names of processes that were executed in the server when non-real-time processes were executed.

The non-real time process information contains information generated by non-real-time process extractor 1441 and information generated by in-server queue state analyzer 1442. FIG. 42 shows an example of non-real-time process information.

Data delivery method application pattern generator 145 generates data delivery method application pattern information that contains a combination of application patterns of a load reduction method such as multicast upon the non-real-time process to reduce the load of non-real-time processing that is recorded in the non-real-time process information such that the maximum processing time recorded in the real-time condition information is not exceeded.

The data delivery method application pattern information contains: processing load reduction method names such as multicast that, by being applied to the non-real-time process shown by the non-real-time process information extracted by load factor identifier 144, is presumed to be capable of conferring a real-time property to the non-real-time process; and processing load reduction method application group, which is a list of non-real-time processes of application. FIG. 43 shows an example of the data delivery method application pattern information.

Data delivery method application pattern generator 145 generates data delivery method application pattern information from: start time information, end time information, and the number of in-server processes in the simultaneous execution process group in the non-real-time process information, and the reducible in-server process number proportion in the processing time reduction model information.

Minimum processing load data delivery method application pattern determination unit 146, based on the processing load reduction method processing load models in the processing time reduction model information that is recorded in request processing time reduction model storage unit 141, determines the pattern that minimizes the processing load of the processing load reduction method among the processing load reduction method application pattern information that was generated by data delivery method application pattern generator 145. Based on the determined pattern, minimum processing load data delivery method application pattern determination unit 146 further generates multicast setting information A108 and time-series data delivery information A112 in FIG. 29 by means of a process similar to the process in FIG. 29 from data delivery base information acquired from data delivery time information acquisition unit 13.

FIG. 44 shows the operation of data delivery method determination unit 14 in the fifth working example.

Non-real-time process extractor 1441 in load factor identifier 144 first acquires in-server executed process history information from execution log storage unit 143 in Step S301, and then acquires real-time condition information from real-time condition information storage unit 142 in Step S302. Non-real-time process extractor 1441 next acquires the processing time of the in-server process name that is recorded in the real-time condition information acquired in Step S302 from in-server executed process history information that was acquired in Step S301.

The operation of acquiring the processing time of the in-server process name is explained by taking as an example the in-server process name of line number 1 of FIG. 41. The in-server process name in line number 1 of FIG. 41 is "Deliver Taro:location to all data-using terminals requesting delivery." Non-real-time process extractor 1441 selects one or more lines that contain "Taro:location" in the in-server process name of the in-server executed process history information shown in FIG. 40. Non-real-time process extractor 1441 next selects one or more lines in which the start times are identical in one or more of the selected lines. In the example of FIG. 40, line numbers 1 and 2 are selected.

Non-real-time process extractor 1441 next selects "2004/1/14 14:05:04.00", which is the more delayed end time of line numbers 1 and 2 in FIG. 40, and obtains 0.5 seconds, which is the difference between the first selected time and the earlier start time of line numbers 1 and 2, as the in-server processing time of "Deliver Taro:location to all data-using terminals requesting delivery." Non-real-time process extractor 1441 next compares the maximum processing time of 0.35 seconds in line number 1 of the real-time condition information shown in FIG. 41 that was acquired in Step S302 with the in-server processing time of 0.5 seconds. The maximum processing time is here exceeded, whereby non-real-time process extractor 1441 takes the in-server process name "Deliver Taro:location to all data-using terminals requesting delivery" shown in line number 1 of FIG. 41 as a non-real-time process name, takes as the start time of the non-real-time process information the earlier time of the start times shown in line numbers 1 and 2 in FIG. 40 used to obtain the in-server processing time of 0.5 seconds, and takes as the non-real-time process information end time the more delayed of the end times shown in line numbers 1 and 2 of FIG. 40 that is used for obtaining the in-server processing time of 0.5 seconds. Non-real-time process extractor 1441 further takes as the maximum processing time of the non-real-time process information the maximum processing time of 0.35 seconds in line number 1 of the real-time condition information shown in FIG. 41 that was acquired in Step S302.

In-server queue state analyzer 1442 in load factor identifier 144 next acquires the in-server process that is executed during the interval from the start time to the end time of the non-real-time process information from the in-server executed process history information that was acquired in Step S301, and takes this process as the simultaneous execution process group of the non-real-time process information. In the example of in-server executed process history information shown in FIG. 40, "Deliver Taro:location to 192.168.10", "Deliver Taro:location to 192.168.1.13", and "Deliver Jiro:location to 192.168.1.15" are selected as a simultaneous execution process group.

By means of the above-described processes, load factor identifier 144 generates the first line of non-real-time process information shown in FIG. 42. Load factor identifier 144 carries out the above-described processing for all in-server process names that are recorded in the real-time condition information and obtains non-real-time process information. Load factor identifier 144 then transmits the non-real-time process information that has been thus obtained to data delivery method application pattern generator 145 in Step S303.

Data delivery method application pattern generator 145 next acquires the processing time reduction model information from request processing time reduction model storage unit 141 in Step S304. Data delivery method application pattern generator 145 then, based on the reducible in-server process number proportion, calculates the number of simultaneously executed processes when applying the processing load reduction method that was identified by the processing load reduction method name in the processing time reduction model that was acquired in Step S304 for the simultaneous execution process group in each line of the non-real-time process information that was acquired in Step S303.

In the example shown in FIGS. 39 and 42, the two deliveries of time-series data identified by Taro:location are delivered by multicast, whereby the number of simultaneous execution process groups is reduced from 3 to 2.

Data delivery method application pattern generator 145 next determines that the application of multicast upon the two deliveries of time-series data identified by Taro:location is a pattern that can, by application, confer the real-time property when the value: [(number of simultaneous execution process groups that has been reduced by the application of the processing load reduction method)/(number of simultaneous execution process groups before reduction)] is lower than the value: [((maximum processing time) of non-real-time process information)/(end time−start time)].

In the example shown in FIGS. 39 and 42, (the number of simultaneous execution process groups that is reduced by the application of the processing load reduction method)/(number of simultaneous execution process groups before reduction)=$2/3$; and ((maximum processing time) of the non-real-time process information)/(end time−start time)=0.7.

As a result, the application of multicast to the two deliveries of time-series data identified by Taro:location is determined as a pattern that, by its application, is expected to be capable of conferring the real-time properties.

Data delivery method application pattern generator 145 next determines similarly to the first line of non-real-time process information whether, by the application of multicast to the two deliveries of time-series data identified by Taro:location, all of the other non-real-time processes indicated by other than the first line can achieve the real-time property, and if it is determined to be a pattern that is expected to be capable of conferring real-time properties by its application in all non-real-time processes, data delivery method application pattern generator 145 generates the first line of data delivery method application pattern information shown in FIG. 43 with multicast as the processing load reduction method name, and the two deliveries of the time-series data identified by Taro:location, which is the object of application of the processing load reduction method, as the processing load reduction method application process group.

In Step S305, data delivery method application pattern generator 145 transmits to minimum processing load data delivery method-application pattern determination unit 146 the data delivery method application pattern information obtained as a result of subjecting each line of the non-real-time process information acquired in Step S303 to the above-described processes.

Minimum processing load data delivery method application pattern determination unit 146 next obtains processing time reduction model information from request processing time reduction model storage unit 141 in Step S306. Minimum processing load data delivery method application pattern determination unit 146 calculates the processing load of the processing load reduction method application pattern that is shown in each line of the data delivery method application pattern information acquired in Step S307 based on the processing load reduction method processing load model in lines having the same processing load reduction method name among each of the lines of the processing time reduction model information acquired in Step S306.

In the example of the processing time reduction model information shown in FIG. 39, the processing load of the processing load reduction method "multicast" is the number of unicast delivery processes that have been changed to multicast. Minimum processing load data delivery method application pattern determination unit 146 thus obtains the calculation result of "2" for the processing load of multicast in the first line of the example of data delivery method application pattern shown in FIG. 43, and "4" for the multicast processing load in the second line.

Minimum processing load data delivery method application pattern determination unit 146 next selects the application pattern in which the processing load of the processing load reduction method is smallest among the processing load reduction method application patterns that have been calculated. In the example of the data delivery method application pattern shown in FIG. 43, minimum processing load data delivery method application pattern determination unit 146 selects the first line.

Minimum processing load data delivery method application pattern determination unit 146 next, when generating multicast generation information and time-series data delivery information by a method similar to the method shown in FIG. 29 from the delivery base information acquired in Step S102, generates only multicast generation information and data delivery information that relate to multicast that is contained in the application pattern in which the processing load of the processing load reduction method is smallest. In the example shown in FIG. 43, the multicast generation information (A108 in FIG. 29) and time-series data delivery information (A112) are generated for changing to multicast the delivery process to data-using terminals in which the data-using terminal identification information is "192.168.1.10" and "192.168.1.13" of time-series data in which the time-series data identification information is "Taro:location" that was described in the processing load reduction method application process group of the first line that is selected as the application pattern in which the processing load of the processing load reduction method is smallest.

As described in the foregoing explanation, when a processing load reduction method such as multicast is applied in a real-time system, multicast is applied and the number of unicasts is limited to a level sufficient for realizing no more than the maximum processing time of the time-series data, thus enabling mitigation of increase in the delivery processing load of a multicast system that accompanies increase in the number of items of data that are the object of delivery and increase in the types of delivered data.

The multicast system is a portion of the data delivery system, and if mitigation can be achieved for increase in the delivery processing load of the multicast system, mitigation of increase in the load of the delivery process can be achieved for the overall data delivery system.

Although an example was described in which IP multicast was used as the method of realizing multicast in the present working example, multicast can be realized by other multicast techniques such as XCAST.

In addition, operations other than those of Steps S301, S302, S303, S304, S305, and S306 are equivalent to the operations of the above-described second working example, and detailed explanation of these operations is therefore here omitted.

INDUSTRIAL APPLICABILITY

The present invention has utility for application to a data delivery system in which a plurality of types of time-series data that include detection information such as from sensors are delivered to a plurality of data-using terminals.

The invention claimed is:

1. A data delivery system which is provided with:
a delivery request information storage means for storing delivery request information in which a delivery destination indicating a data-using terminal to which delivery object data containing observation time and observation results of a prescribed object of observation are delivered by way of a communication network, a type of delivery object data that are object of delivery, and a delivery condition are placed in correspondence; and
a data delivery means for delivering said delivery object data when said delivery condition is realized, wherein said data delivery means, based on packaged delivery information which is used for selecting a delivery method for each delivery object data, delivers all types of delivery object data that have been placed in correspondence with the delivery condition that has been realized to the data-using terminals of all delivery destinations that have been placed in correspondence with the delivery condition that has been realized;
said data delivery system comprising:
a delivery history information storage means for storing delivery history information indicating history of delivery of said delivery object data by means of said data delivery means; and
a packaged delivery information generation means for, based on said delivery history information, generating said packaged delivery information.

2. The data delivery system according to claim 1, wherein said packaged delivery information comprises any one of: (a) information in which a plurality of delivery destinations to which the same delivery object data are simultaneously delivered are placed in correspondence; (b) information in which a plurality of types of delivery object data that are simultaneously delivered to the same data-using terminal are placed in correspondence; and (c) information in which a plurality of delivery destinations to which the same delivery object data are simultaneously delivered and a plurality of types of delivery object data that are simultaneously delivered to the same data-using terminal are placed in correspondence.

3. The data delivery system according to claim 1, wherein said packaged delivery information comprises information in which said delivery destination, the type of delivery object data that comprises said object of delivery, and said delivery condition are placed in correspondence; and as a minimum, comprises information in which the plurality of delivery destinations or the plurality of types of delivery object data are placed in correspondence with said delivery condition.

4. The data delivery system according to claim 1, wherein said delivery history information comprises information that contains time of delivery, type of delivery object data that was delivered, a destination of delivery, and a delivery condition at time of delivery.

5. The data delivery system according to claim 4, wherein said packaged delivery information generation means generates said packaged delivery information by packaging together a plurality of items of delivery history information in which, among said delivery history information, said delivery conditions at the time of delivery and said destinations of delivery are identical, and moreover, said types of delivery object data that have been delivered are different.

6. The data delivery system according to claim 4, wherein said packaged delivery information generation means generates said packaged delivery information by packaging a plurality of items of delivery history information in which, of said delivery history information, said delivery conditions at the time of delivery and said types of delivery object data that are delivered are the same, and moreover, said destinations of delivery are different.

7. The data delivery system according to claim 4, wherein said packaged delivery information generation means:
  generates first provisional packaged delivery information in which a plurality of items of delivery history information are packaged together in which, of said delivery history information, said delivery conditions at the time of delivery and said destinations of delivery are the same, and moreover, said types of delivery object data that are delivered are different;
  further generates second provisional packaged delivery information in which a plurality of items of delivery history information are packaged together in which, of said delivery history information, said delivery conditions at the time of delivery and said types of delivery object data that are delivered are the same, and moreover, said destinations of delivery are different; and
  deletes an overlapping portion of said first provisional packaged delivery information and said second provisional packaged delivery information to generate said packaged delivery information.

8. The data delivery system according to claim 5, wherein said packaged delivery information generation means, when packaging a plurality of items of delivery history information, packages together a plurality of items of delivery history information for which a difference in times of delivery are within a prescribed time interval.

9. The data delivery system according to claim 5, wherein said packaged delivery information generation means, when packaging together a plurality of items of delivery history information, selects a combination of delivery processes that apply a processing load reduction method for decreasing load of delivery processes that exceed a maximum value of the processing time that is set for each delivery process, said selection being carried out to minimize performance demanded of said processing load reduction method that is applied.

10. The data delivery system according to claim 1, provided with:
  a plurality of said data delivery means;
  and further provided with:
  a delivery selection means for selecting from said plurality of data delivery means a data delivery means for executing delivery process of said delivery object data; and
  a delivery object data allocation means for allocating, to the data delivery means that has been selected by said delivery selection means, said delivery object data and said packaged delivery information that has been generated by said packaged delivery information generation means;
  wherein said selected data delivery means delivers delivery object data that have been allocated by said delivery object data allocation means to a plurality of corresponding data-using terminals when said delivery conditions have been realized, and
  said delivery object data allocation means allocates delivery object data having the same delivery method which is described in said packaged delivery information to the same data delivery device based on data allocation history information constituted from a set of delivery object data which have been allocated in past and a data delivery device to which allocation was made.

11. The data delivery system according to claim 10, further comprising a processing load information acquisition means for acquiring processing load information indicating processing load of the data delivery means for each of said data delivery means;
  wherein said delivery selection means specifies the data delivery means having lowest processing load based on the processing load information of each data delivery means that has been acquired by said processing load information acquisition means, and selects said specified data delivery means as the data delivery means for executing delivery process of said delivery object data.

12. A data delivery method provided with:
  storing, in a first storage means, delivery request information in which a delivery destination indicating a data-using terminal to which delivery object data containing observation time and observation results of a prescribed object of observation are delivered by way of a communication network, a type of delivery object data that are the object of delivery, and a delivery condition are placed in correspondence; and
  executing a delivery process for delivering said delivery object data when said delivery condition is realized, wherein, in said delivery process, based on packaged delivery information used for selecting a delivery method for each delivery object data, delivery object data of all types that have been placed in correspondence with delivery condition that has been realized are delivered to the data-using terminals of all delivery destinations that have been placed in correspondence with the realized delivery condition;
  said data delivery method comprising:
  storing, in a second storage means, delivery history information indicating delivery history of said delivery object data; and
  executing, based on said delivery history information, a packaged delivery information generation process for generating said packaged delivery information.

13. The data delivery method according to claim 12, wherein said packaged delivery information comprises any one of: (a) information in which a plurality of delivery destinations to which the same delivery object data are simultaneously delivered are placed in correspondence, (b) information in which delivery object data of a plurality of types that are simultaneously delivered to the same data-using terminal are placed in correspondence, and (c) information in which a plurality of delivery destinations to which the same delivery object data are simultaneously delivered and delivery object data of a plurality of types that are simultaneously delivered to the same data-using terminal are placed in correspondence.

14. The data delivery method according to claim 12, wherein said packaged delivery information comprises information in which said delivery destination, said type of delivery object data that comprises the object of delivery, and said delivery condition are placed in correspondence, and comprises information in which at least a plurality of delivery destinations or a plurality of types of delivery object data are placed in correspondence with said delivery condition.

15. The data delivery method according to claim 12, wherein said delivery history information comprises information that includes time of delivery, type of delivery object data that was delivered, a destination of delivery, and a delivery condition at time of delivery.

16. The data delivery method according to claim 15, wherein said packaged delivery information generation process includes generating said packaged delivery information by packaging together a plurality of items of delivery history information in which, of said delivery history information, said delivery conditions at the time of delivery and said destinations of said delivery are the same, and moreover, said types of delivery object data that are delivered are different.

17. The data delivery method according to claim 15, wherein said packaged delivery information generation process includes generating packaged delivery information by packaging together a plurality of items of delivery history information in which, of said delivery history information, said delivery conditions at the time of delivery and said types of delivery object data that are delivered are the same, and moreover, said destinations of delivery are different.

18. The data delivery method according to claim 15, wherein said packaged delivery information generation process includes:
  generating first provisional packaged delivery information in which a plurality of items of delivery history information are packaged together in which, of said delivery history information, said delivery conditions at the time of delivery and said destinations of delivery are the same, and moreover, said types of delivery object data of delivery are different;
  generating second provisional packaged delivery information in which a plurality of items of delivery history information are packaged together in which, of said delivery history information, said delivery conditions at the time of delivery and said types of delivery object data that are delivered are the same, and moreover, said destinations of delivery are different; and
  generating said packaged delivery information by deleting an overlapping portion of said first provisional packaged delivery information and said second provisional packaged delivery information.

19. The data delivery method according to claim 16, wherein, in said packaged delivery information generation process, when packaging together a plurality of items of delivery history information, a plurality of items of delivery history information are packaged together for which a difference in times of delivery is within a prescribed time interval.

20. The data delivery method according to claim 16, wherein, in said packaged delivery information generation process, when packaging together a plurality of items of delivery history information, a combination is selected of delivery processes that apply a processing load reduction method that minimizes the performance demanded of said processing load reduction method, said processing load reduction method being applied for reducing the load of delivery processes that exceed the upper limit of processing time set for each delivery process.

21. A computer readable medium storing a data delivery program for causing a computer to execute:
  a process of storing, in a first storage unit, delivery request information in which a delivery destination indicating a data-using terminal to which delivery object data containing observation time and observation results of a prescribed object of observation are delivered by way of a communication network, a type of delivery object data that are the object of delivery, and a delivery condition are placed in correspondence; and a delivery process of delivering the delivery object data when the delivery condition has been met, said delivery process including a process for, based on packaged delivery information used for selecting a delivery method for each delivery object data, delivering all types of delivery object data that have been placed in correspondence with delivery condition that has been met to the data-using terminals of all delivery destinations that have been placed in correspondence with the delivery condition that has been met;
  said data delivery program causing said computer to execute:
  a process of storing, in a second storage unit, delivery history information indicating delivery history of said delivery object data; and
  a packaged delivery information generation process of, based on said delivery history information, said generating packaged delivery information.

22. The computer readable medium storing the data delivery program according to claim 21, wherein said packaged delivery information comprises any one of: (a) information in which a plurality of delivery destinations to which the same delivery object data are simultaneously delivered are placed in correspondence, (b) information in which a plurality of types of delivery object data that are simultaneously delivered to the same data-using terminal are placed in correspondence, and (c) information in which a plurality of delivery destinations to which the same delivery object data are simultaneously delivered and a plurality of types of delivery object data that are simultaneously delivered to the same data-using terminal are placed in correspondence.

23. The computer readable medium storing the data delivery program according to claim 21, wherein said packaged delivery information is information in which said delivery destination, said type of delivery object data that is the object of delivery, and said delivery condition are placed in correspondence, and is information in which at least a plurality of delivery destinations or a plurality of types of delivery object data are placed in correspondence with said delivery condition.

24. The computer readable medium storing the data delivery program according to claim 21, wherein said delivery history information comprises information that contains time of delivery, type of delivery object data that is delivered, a destination of delivery, and a delivery condition at the time of delivery.

25. The computer readable medium storing the data delivery program according to claim 24, wherein, in said packaged delivery information generation process, said data delivery program causes said computer to execute a process of generating said packaged delivery information by packaging together a plurality of items of delivery history information in which, of said delivery history information, said delivery conditions at the time of delivery and said destinations of delivery are the same, and moreover, said types of delivery object data that are delivered are different.

26. The computer readable medium storing the data delivery program according to claim 24, wherein, in said packaged delivery information generation process, said data delivery program causes said computer to execute a process of generating packaged delivery information by packaging together a plurality of items of delivery history information in which, of said delivery history information, said delivery conditions at the time of delivery and said types of delivery object data that are delivery are the same, and moreover, said destinations of delivery are different.

27. The computer readable medium storing the data delivery program according to claim 24, wherein, in said packaged delivery information generation process, said data delivery program causes said computer to execute processes of
- generating first provisional packaged delivery information in which a plurality of items of delivery history information are packaged together in which, of said delivery history information, said delivery conditions at the time of delivery and said destinations of delivery are the same, and moreover, said types of delivery object data that are delivered are different;
- generating second provisional packaged delivery information in which a plurality of items of delivery history information are packaged together in which, of said delivery history information, said delivery conditions at the time of delivery and said types of delivery object data that are delivered are the same, and moreover, said destinations of delivery are different; and
- generating said packaged delivery information by deleting an overlapping portion of said first provisional packaged delivery information and said second provisional packaged delivery information.

28. The computer readable medium storing the data delivery program according to claim 25, wherein, when a plurality of delivery history information are being packaged in said packaged delivery information generation process, said data delivery program causes said computer to execute a process of packaging together a plurality of items of delivery history information in which the difference in the times of delivery is within a prescribed time interval.

29. The computer readable medium storing the data delivery program according to claim 25, wherein, when packaging together a plurality of items of delivery history information in said packaged delivery information generation process, said data delivery program causes said computer to execute a process of selecting a combination of delivery processes that apply a processing load reduction method that minimizes the performance demanded of said processing load reduction method, said processing load reduction method being applied for reducing the load of delivery processes that exceed the upper limit of processing time set for each delivery process.

* * * * *